US012771699B2

(12) United States Patent
Azzedin et al.

(10) Patent No.: US 12,771,699 B2
(45) Date of Patent: Oct. 20, 2026

(54) SYSTEM AND METHOD TO DETECT AND COUNTERMEASURE RPL ATTACKS IN IOT NETWORK

(71) Applicant: KING FAHD UNIVERSITY OF PETROLEUM AND MINERALS, Dhahran (SA)

(72) Inventors: Farag Ahmed Azzedin, Dhahran (SA); Hussah Ali Albinali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/738,702

(22) Filed: Jun. 10, 2024

(65) Prior Publication Data

US 2025/0379873 A1 Dec. 11, 2025

(51) Int. Cl.
*H04L 9/40* (2022.01)

(52) U.S. Cl.
CPC ................................ *H04L 63/1416* (2013.01)

(58) Field of Classification Search
CPC . H04L 63/1416; H04L 63/1408; H04L 63/14; H04L 63/1458
USPC ............................................................ 726/23
See application file for complete search history.

(56) References Cited

U.S. PATENT DOCUMENTS 8,707,417 B1 * 4/2014 Liang ...................... G06F 21/53 726/22
9,083,740 B1 * 7/2015 Ma ........................ H04L 63/145
9,973,529 B1 * 5/2018 Bharrat ............... H04L 63/1416
10,498,529 B1 * 12/2019 Hashmi ................. H04L 9/0618
11,706,625 B2 * 7/2023 Zhang ..................... H04W 4/70 726/23
2017/0103213 A1 4/2017 Di Pietro et al.
(Continued)

FOREIGN PATENT DOCUMENTS

IN 202221009232 3/2022

OTHER PUBLICATIONS

Sanders ; An Effective Approach to Protecting Low-Power and Lossy IoT Networks Against Blackhole Attacks ; Arizona State University ; Dec. 2021 ; 42 Pages.
(Continued)

*Primary Examiner* — Kaylee J Huang
(74) *Attorney, Agent, or Firm* — Oblon, McClelland, Maier & Neustadt, L.L.P.

(57) ABSTRACT

A system and a method to detect an attack on an IoT network is disclosed. The IoT network includes interconnection of multiple IoT devices. The method includes receiving, by a network connection device, multiple ICMPv6 network packets from IoT devices and outputting multiple output packets; and matching, by a routing device, a network traffic pattern to attack signatures structured as a taxonomy according to which part of a packet is misused. The taxonomy includes a branch to a data plane attack and a control plane attack, respectively. When an IPv6 RPL packet is detected, the method includes checking for generating, modifying, and replaying attacks by an attacker. When a non-RPL packet is detected, the method includes checking for dropping and leaking packet attacks by the attacker. When the attack is detected, the method includes invoking a solution to the attack. The solution includes mitigation of the attack by the attacker.

20 Claims, 32 Drawing Sheets

(56) References Cited

U.S. PATENT DOCUMENTS

| | | | | |
|---|---|---|---|---|
| 2022/0006884 | A1* | 1/2022 | Browne | H04L 69/321 |
| 2022/0070672 | A1 | 3/2022 | Zhang et al. | |
| 2022/0400011 | A1* | 12/2022 | Moon | H04L 9/3236 |

OTHER PUBLICATIONS

Yang et al. ; Security Vulnerabilities and Countermeasures in the RPL-Based Internet of Things ; IEEE ; Feb. 21, 2019 ; 4 Pages.

* cited by examiner

SYSTEM AND METHOD TO DETECT AND COUNTERMEASURE RPL ATTACKS IN IOT NETWORK

BACKGROUND

Technical Field

The present disclosure is directed to detect malicious attack in an Internet of Things (IoT) network, and more particularly relates to a system and a method to detect and countermeasure RPL attacks in an IoT network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The Internet of Things (IoT) represents a network of connected devices that can exchange data with other IoT devices and the cloud. IoT devices can include consumer objects, mechanical and digital machines. For example, FIG. 1 illustrates a system diagram of a typical IoT network 100 known in the art. The IoT network 100 includes one or more digital devices 102 configured to connect and interact with one another in the form of communication packets. Each IoT device is usually embedded with technology like software and sensors.

The evolution of Internet of Things (IoT) is emerging as a result of its capabilities in connecting the virtual with the physical world in various application domains, such as energy management, environmental and health monitoring, supply chain management, and smart cities. The impact of IoT is seen by the growth in types of IoT devices and their anticipated economic impact in incoming years. These devices are capable of interacting and collaborating to exchange data and provide the ability to share information across platforms to achieve specific goals.

The limitations in storage and computation capabilities in IoT devices make it a challenge to design scalable protocols for different network sizes while minimizing network delay. As a result, the Internet Engineering Task Force (IETF) introduced an IPV6 Routing Protocol for Low-Power and Lossy Networks (RPL). The Internet Engineering Task Force (IETF) is an open standard organization that defines internet protocols like TCP/IP. FIG. 2 illustrates a general framework that includes a six-layer model for IoT architecture. The general framework 200 includes a six-layer model 202 for IoT architecture known in the art. The Internet Engineering Task Force (IETF) places RPL at a network layer with the IPv6 Routing Protocol as shown in a framework 204. The IPv6 became the standard routing protocol in IoT networks as it was designed to efficiently utilize the constraint resources while providing effective routing service. IPv6 allows messages or data to be routed between nodes in a Wireless Sensor Network. RPL is a distance-vector protocol that calculates the direction and distance to any link in a network. As there is a significant overlap between LLNs and IoT, and that the IPV6 is an essential feature in IoT environments, RPL has become a standard routing protocol for the IoT network 302. The success of RPL as an IoT standard is also witnessed by companies that are part of the ZigBee Alliance. These companies utilize industry-standard protocols, including IPv6, 6LoWPAN, RPL, and TCP/IP/UDP to deliver end-to-end IPv6 networking without the requirement of intermediary gateways. Furthermore, ZigBee IP, a wireless mesh networking solution that provides internet connections for low-power and low-cost devices, has also adopted RPL to easily plug the networks into the IP-based Internet, impeding a concrete IoT as shown in a framework 206. ZigBee IP is the first open standard for IPv6-based wireless mesh networking.

IoT raises security challenges related to ensuring authentication, data protection, as well as rogue node detection. In RPL, security is generally highlighted conceptually. In fact, many routing attacks utilize RPL vulnerabilities because of the absence of RPL security mechanisms. Several studies proposed one or more solutions to detect and classify RPL attacks. For example, IN202221009232A discloses an anomaly-based solution to classify RPL attacks. The classification relies on a machine learning technique using a conditional probability model. This approach requires training a classifier based on the traffic in normal conditions, and under each attack. In addition, the classification utilizes features that are collected from network performance metrics to classify the entire network. The classification thus helps to identify whether the traffic condition of the network is normal or belongs to a specific type of RPL attack. However, the accuracy of the machine learning model depends on the accuracy and training of the used model. For example, the machine learning based technique requires training the classifier based on the traffic in normal conditions and the pattern of the traffic flow under each attack. Moreover, the solution identifies occurrence of attack once it has already impacted the network.

US20170103213A1 also aims to classify the network traffic into normal and attack traffic based on possible attack characteristics using a machine learning model. The performance of a machine learning classifier depends on the training of the classifier and on a data set that accurately reflects the statistical behavior of the traffic. However, the accuracy of this classification also relies on the received attack traffic records to perform the classification correctly.

US20220070672 A1 describes a method for identifying only blackhole attacks based on a rating of a node. The rating of the node is calculated based on the number of dropped messages. A non patent reference discloses a taxonomy based classification of RPL attacks which classifies RPL attacks based on the objectives of the attack and its impact on the network. (See: Anthea Mayzaud, Remi Badonnel, and Isabelle Chrisment, "*A Taxonomy of Attacks in RPL-based Internet of Things*", International Journal of Network Security, 18(3): 459-473, 2016). The taxonomy divides RPL attacks to three categories namely, network resources attacks, topology modification attacks, and traffic eavesdropping attacks.

Another non patent reference describes an attack in the IoT network that targets an adaption layer and specifically 6LoWPAN protocol. (See: Sarah Alyami, Randah Alharbi, Farag Azzedin, "*Fragmentation Attacks and Countermeasures on 6LoWPAN Internet of Things Networks: Survey and Simulation*", 2022 Dec. 14; 22 (24): 9825. doi: 10.3390/s22249825).

Another non patent reference proposes to classify RPL attacks based on threats to security services and classified RPL attacks into three classes. (See: Smitesh Mangelkar, Sudhir N. Dhage, and Anant V. Nimkar, "*A comparative study on RPL attacks and security solutions", Proceedings of* 2017 International Conference on Intelligent Computing and Control, I2C2 2017, 2018-Jan. 1-6, 2018). The first class of attack is based on confidentiality. The second class is attacks on integrity, while the third class is attacks on availability.

Another non patent reference discloses classification of three types of RPL attacks, namely, selective forwarding, sinkhole, and hello flood attacks (See: Wei Yang, Yuan Wang, Zhixiang Lai, Yadong Wan and Zhuo Cheng, "*Security Vulnerabilities and Countermeasures in the RPL-Based Internet of Things*", 2018 International conference on cyber-enabled distributed computing and knowledge discovery (CyberC)). In the reference, sinkhole attacks are identified by the rank changing, selective forwarding attacks are identified by dropping certain messages, and the hello-flood attack is identified based on broadcasting a HELLO message with a preferred routing metric.

Another non patent reference describes detection and protection of the IoT network from only one type of attack i.e. a blackhole attack. (See: Kent Sanders, Stephen S. Yau, "*An Effective Approach to Protecting Low-Power and Lossy IoT network* 302*s Against Blackhole Attacks*", 2021 IEEE International conferences on internet of things (iThings) and IEEE green computing & communications (greencom) and IEEE cyber, physical & social computing (CPSCom) and IEEE smart data (smartdata) and IEEE congress on cybermatics (cybermatics)). The technique detects only blackhole attacks based on the dropping messages behavior of the attacker node.

Each of the aforementioned references has one or more drawbacks that hinder widespread adoption. For instance, some references disclose the use of a ML-based solution, which requires a large amount of training data to train the model. This, in turn, increases the computational burden on the entire detection system. Moreover, other approaches in this field can only identify two or three types of attacks.

One object of the present disclosure is to provide a system and method that do not rely on a training-based solution, eliminating the requirement for prior knowledge of normal traffic and traffic with attacks. A further object is a system or method that is capable of easily identifying and/or classifying almost all types of IoT network attacks without imposing a significant computational burden on the detection system. This addresses limitations encountered in prior art studies.

SUMMARY

In an exemplary embodiment, an intrusion detection monitoring system (IDS) is disclosed. The intrusion detection monitoring system is configured to detect an attack on an Internet of Things (IoT) network. The intrusion detection monitoring system comprises a plurality of IoT devices interconnected via the Internet of Things (IoT) network. The intrusion detection monitoring system further comprises a network connection device. The network connection device is configured for receiving a plurality of ICMPv6 network packets from IoT devices and for outputting a plurality of output packets. The intrusion detection monitoring system further comprises a routing device. The routing device includes a circuitry that is configured to match a network traffic pattern to attack signatures structured as a taxonomy according to which part of a packet of the plurality of ICMPv6 network packets is misused. The taxonomy is a tree structure having a branch to data plane attack and a branch to a control plane attack. In case, when the packet is an IPV6 Routing Protocol for Low-Power and Lossy Networks (RPL) packet, the routing device is configured to check for generating, modifying, and replaying attacks by an attacker. In case, when the packet is a non-RPL packet, the routing device is configured to check for dropping and leaking packet attacks by the attacker. In either case, when an attack is detected, the routing device is configured to invoke a solution to the attack. The solution includes mitigation of the attack by the attacker.

In another exemplary embodiment, a method to detect an attack on an Internet of Things (IoT) network is disclosed. A plurality of IoT devices are interconnected via the Internet of Things (IoT) network. The method includes receiving, by a network connection device, a plurality of ICMPv6 network packets from IoT devices and outputting a plurality of output packets. The method further includes matching, by a routing device, a network traffic pattern to attack signatures structured as a taxonomy according to which part of a packet of the plurality of ICMPv6 network packets is misused. The taxonomy is a tree structure having a branch to data plane attack and a branch to a control plane attack. In case, when the packet is an IPV6 Routing Protocol for Low-Power and Lossy Networks (RPL) packet, the method further includes checking for generating, modifying, and replaying attacks by an attacker. In case, when the packet is a non-RPL packet, the method includes checking for dropping and leaking packet attacks by the attacker. In either case, when an attack is detected, the method further includes invoking a solution to the attack. The solution includes mitigation of the attack by the attacker.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
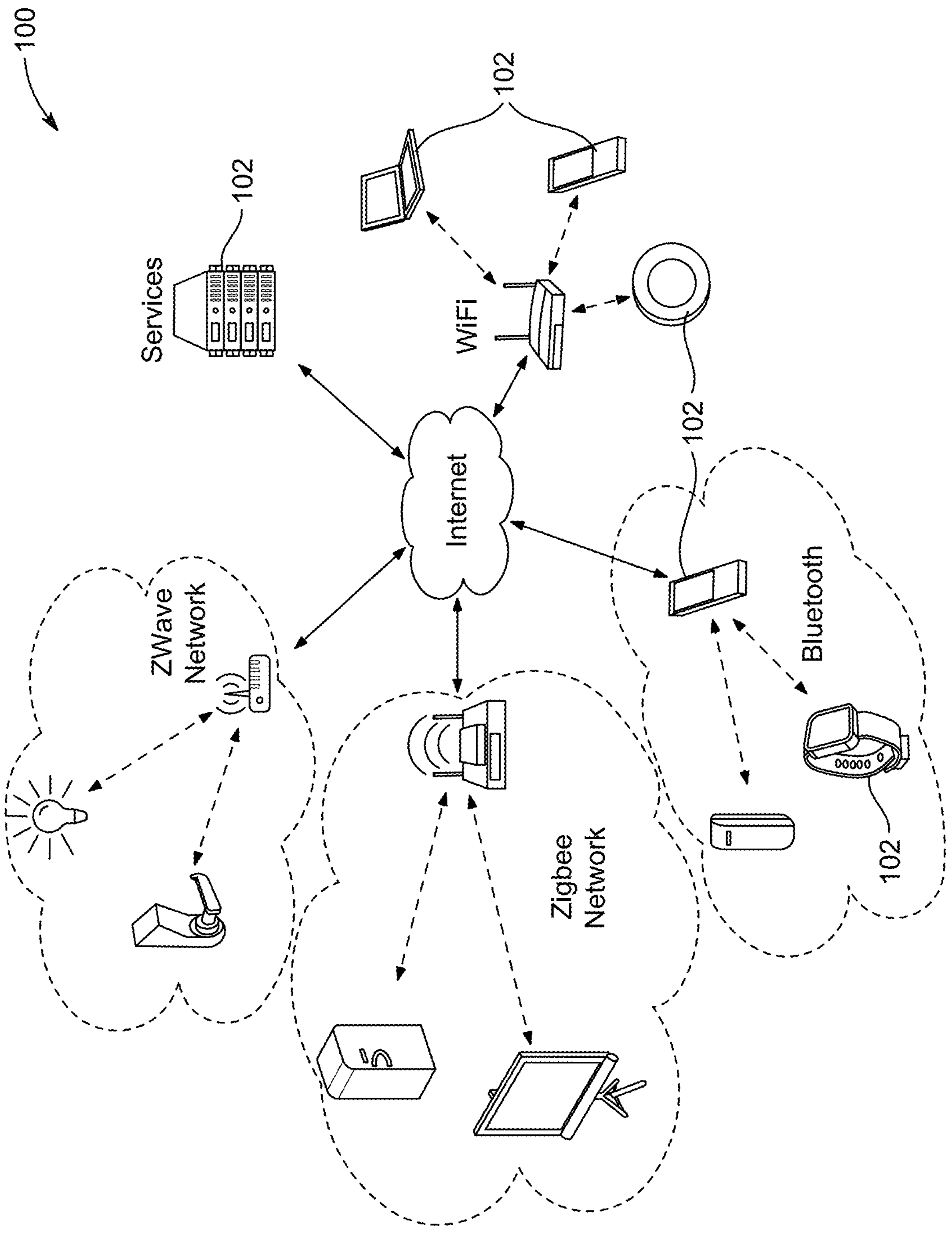
FIG. 1 is a system diagram of a typical IoT network 302 known in the art.
Figure 2:
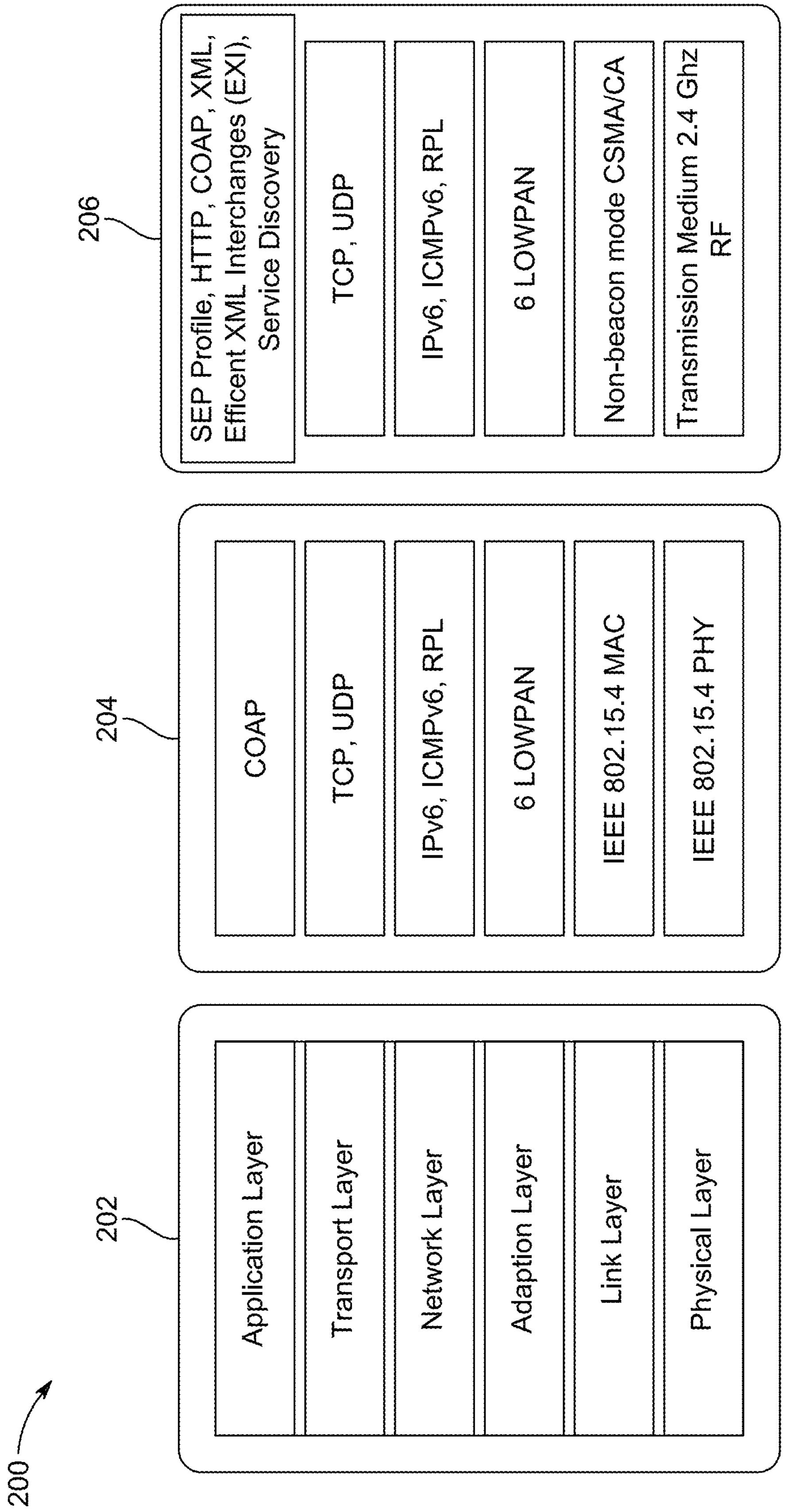
FIG. 2 illustrates a general framework that includes a six-layer model for IoT architecture known in the art.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values between.

Further, the terms "router", "routing device", "router processing device" and "router processor" represent same terms and used throughout the disclosure synonymously.

The present disclosure describes a system and a method to detect an attack on an Internet of Things (IoT) network. The system of the present disclosure is configured to monitor the network traffic without any training or prior knowledge of the normal traffic of the network. Once an unusual network traffic pattern is detected, the system is capable of using a taxonomy based categorization to identify type of RPL attacks. Detection of type of the RPL attack is further based upon the mechanism of the attack that includes identification of attack signature of an attacker node with high accuracy and low false alarm rate. The classification technique helps in accurately detecting the type of attack and identify the attacker node. Attack signatures are represented as branches in the taxonomy of the attacks in the system. In addition, the reference further discloses a taxonomy based solution to mitigate or countermeasure RPL attacks once the type of attack is identified. Therefore, by monitoring the network traffic without any training or prior knowledge of the normal traffic of the network, the taxonomy based classification can detect the attack and identify the attacker node by the signature of the attack. The operation of the system and method is now explained with respect to the system in FIG. 3.

Figure 3:
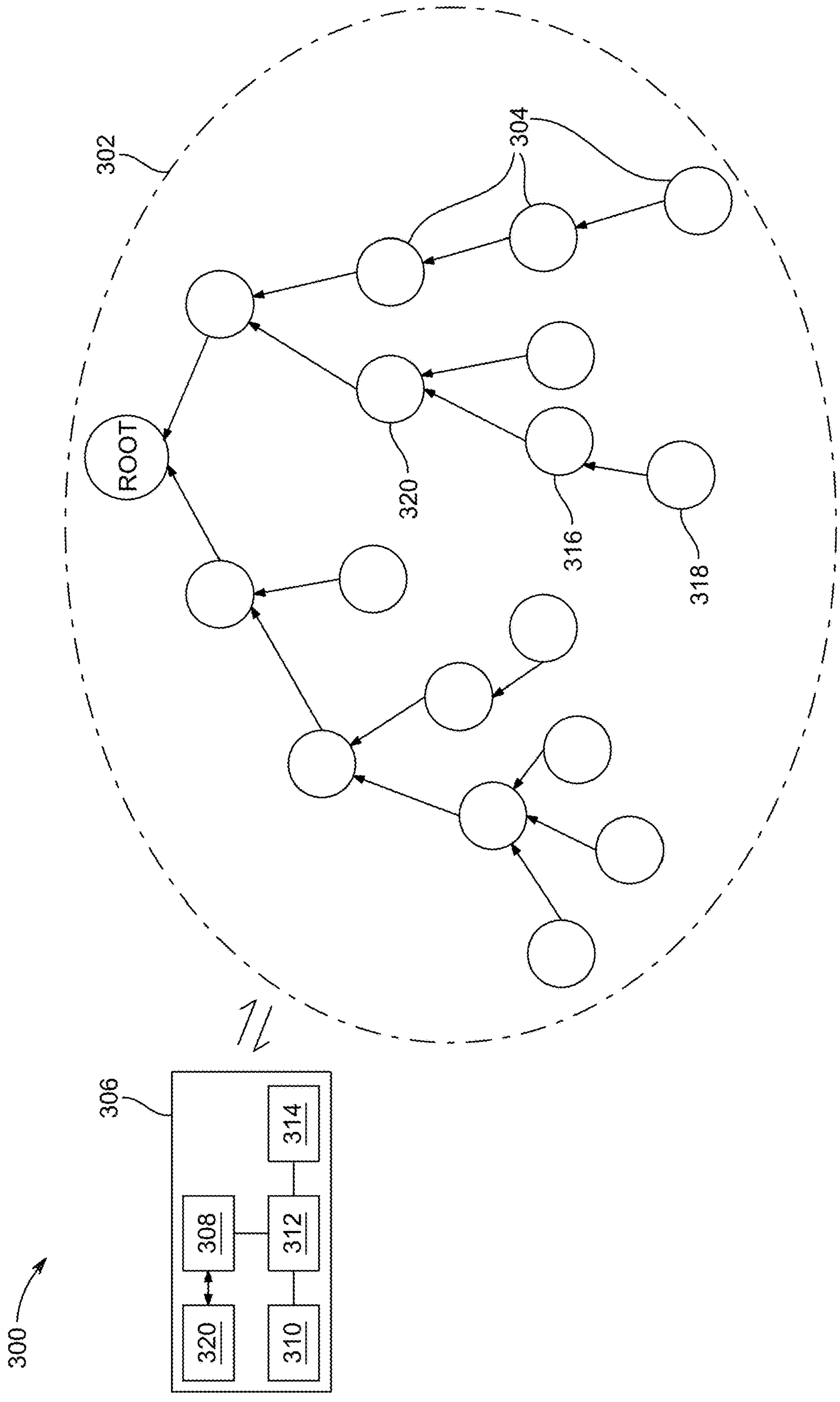
FIG. 3 illustrates an intrusion detection monitoring system (IDS), according to certain embodiments.

FIG. 3 illustrates an intrusion detection monitoring system (IDS) 300, according to an embodiment. The intrusion detection monitoring system 300 is configured to detect an attack on an Internet of Things (IoT) network 302. The Internet of Things (IoT) network 302 includes a plurality of IoT devices 304 that is representative of digital devices 102 in the IoT network 302 100 in FIG. 1. The one or more IoT devices 304 could be referred to as a 'node". Each node 304 of the plurality of nodes 304 is capable to communicate with another node 304 if the other node 304 lies within a periphery of its communication range or distance. The communication among nodes 304 could be performed using, for example, wired or wireless communication techniques. In an embodiment, the wired communication technique could include, but not limited to, an ethernet cable, a twisted pair cable, a co-axial cable, a fiber-optic based cable, or alike. Furthermore, the wireless communication technique could include, but not limited to, infrared, Bluetooth, NFC, Wi-Fi, Li-Fi, 1G, 2G, 3G, 4G, 5G, 6G, 7G, 8G, 9G, 10G based GSM communication techniques, radio communication or alike.

The intrusion detection monitoring system 300 further includes a network communication device 306. The network communication device 306 is configured to monitor the Internet of Things (IoT) network 302. For example, the network communication device 306 monitors the network traffic from each node 304 by receiving ICMPv6 network packets from the node or the IoT devices 304 using an input port 310. Therefore, the network communication device 306 monitors the incoming network packet and outgoing network packet at each node 304 to monitor the network traffic. The ICMPv6 network packet is described in detail in FIG. 6. The network communication device 306 is further configured for outputting a plurality of output packets using an output port 314. The network communication device 306 further includes a switching circuit 312 and a routing device 308. In an embodiment, the routing device 308 is referred to as a processor of the network communication device 306. As such, the routing device 308 includes processing circuitry or the processor to process one or more computer implemented methods to monitor, classify and detect one or more RPL attack in the IoT network 302.

Figure 4A:
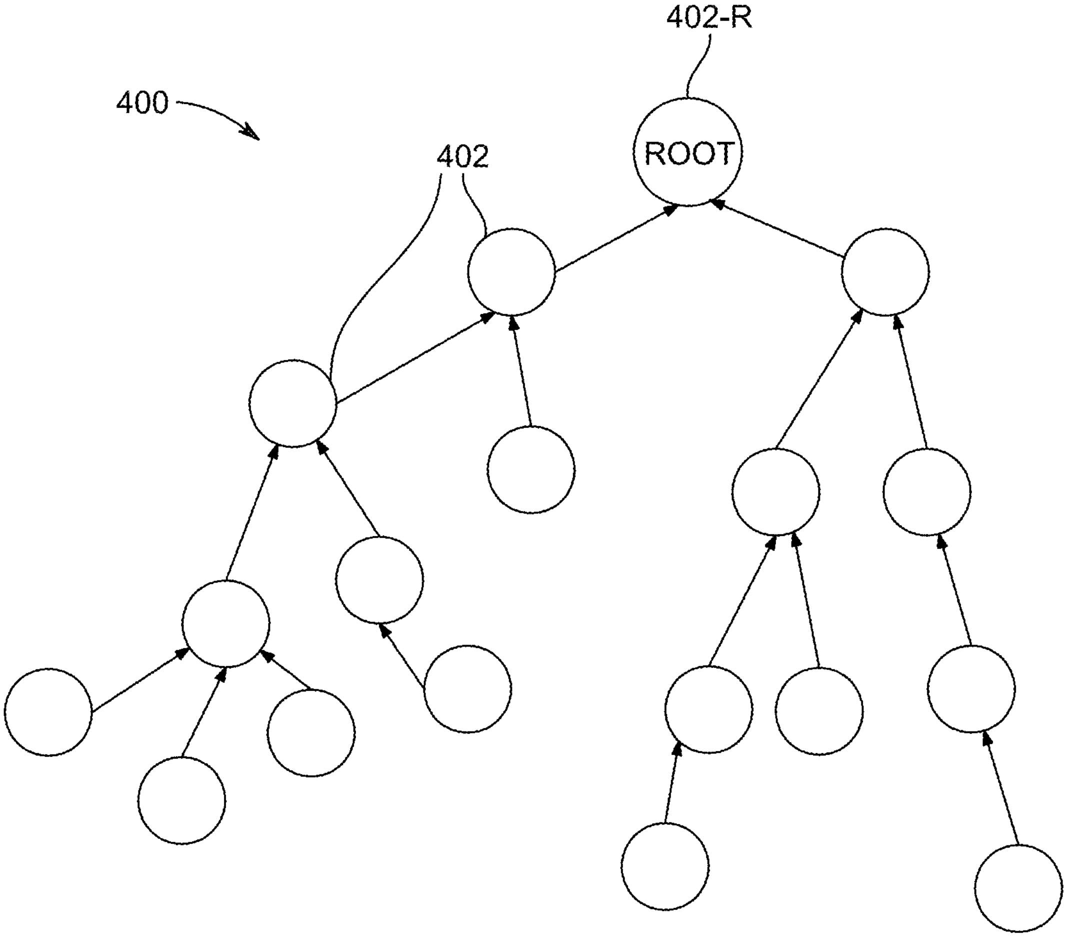
FIG. 4A is an exemplary IoT network 302 where the communication topology follows a DODAG structure, according to certain embodiments.

In order to understand the technique of monitoring and classifying RPL attacks, few basic fundamentals are necessary as a preliminary knowledge in the context of transmission and reception of data packets by plurality of nodes in IoT network 302 which is illustrated in FIG. 4A.

FIG. 4A illustrates an exemplary IoT network 302, 400 where the communication topology follows a DODAG structure, according to an embodiment. The RPL design principle basically includes constructing a tree-like topology called Directed Acyclic Graph (DAG) that has a single destination called a Destination Oriented Directed Acyclic Graph (DODAG). The DODAG is a topology that organizes network resource-constrained nodes. The DODAG structure is built using a protocol based on IPv6 RPL. The RPL centralizes traffic to one or more nodes 402 by constructing a DODAG based on a specific objective function. The DODAG construction process begins from the DODAG root, as shown by a root node 402-R. Each node 402 in the DODAG includes a specific rank that indicates a minimum hop after which the communication packet is received by the root node 402-R. Obviously, nodes 402 closer to the root node 402-R have a lower rank than nodes 402 farther away. The RPL uses an objective function to calculate the rank of network nodes 402. The objective function uses different metrics to determine the cost to reach the root node 402-R as energy consumption, hop count, or quality of the proposed paths.

The RPL supports various traffic flow directions. A first flow direction is upward routing or a Multi-point-to-point (MP2P) routing. In upward routing, the communication packets are sent by network nodes 402 toward the root node 402-R. A second flow direction is downward routing or a point-to-multi-point (P2MP). In downward routing, the communication packets are sent by the root node 402-R towards the network nodes 402. A third flow direction is a point-to-point (P2P) routing. In the P2P routing, a communication packet is transmitted from one node to another node. The flow is achieved by sending the communication packet upward to the nearest common ancestor or the root node common to both nodes and then downward to the destination node.

In order to allow a traffic from a first node, for example a node 402, to another node, for example a different node 402, a root node 402-R must be able to direct communication packets to a specific location in the network to facilitate P2P activity. To direct communication packets, a routing table is used by the network nodes that facilitates routing of the communication packets to the destination node. Each node transmits the communication packets towards the root node 304-R till the communication packets encounter a common ancestor node with a known path to the destination node. The common ancestor represents a DODAG root.

Furthermore, RPL supports two modes of operation. A first mode of operation is known as a storing mode. In this mode, RPL keeps a downward routing table at each node. The routing traffic between two different nodes travels only as far as a common parent. Nodes 402 with lower ranks have bigger routing tables. Also, in storing mode, RPL fails when the routing table is full, and a routing entry needs to be appended. A second mode of operation is known as a non-storing mode. In this mode, all traffic is sent to the root node 402-R. The root node 402-R uses source routes to send traffic to leaf nodes. The second mode of operation requires more compute cycles. A general DODAG topology and a traffic flow in the IoT network 302 400 is described in FIG. 4B.

Figure 4B:
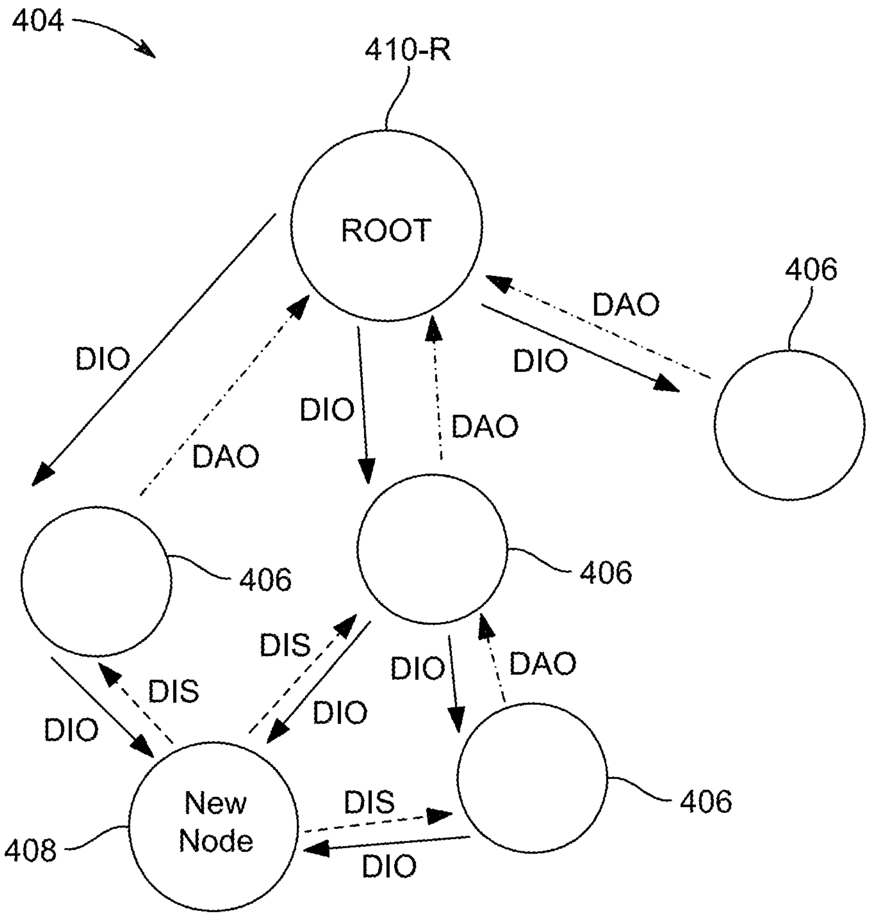
FIG. 4B illustrates an exemplary construction of a DODAG topology and transmission of various communication packets to nodes in the IoT network 302, according to certain embodiments.

FIG. 4B illustrates an exemplary construction of a DODAG topology 404 and transmission of various communication packets to nodes 406, 408 in the IoT network 302 400, according to an embodiment. Initially, a root node 410-R broadcasts its information using a DODAG Information Object message, also known as a DIO message. After broadcast, the DIO message reaches to all other nodes 406 that are located within the communication range of the root node 410-R. A DIO message received by other nodes 406 includes one or more data field that is described in FIG. 4C.

Figure 4C:
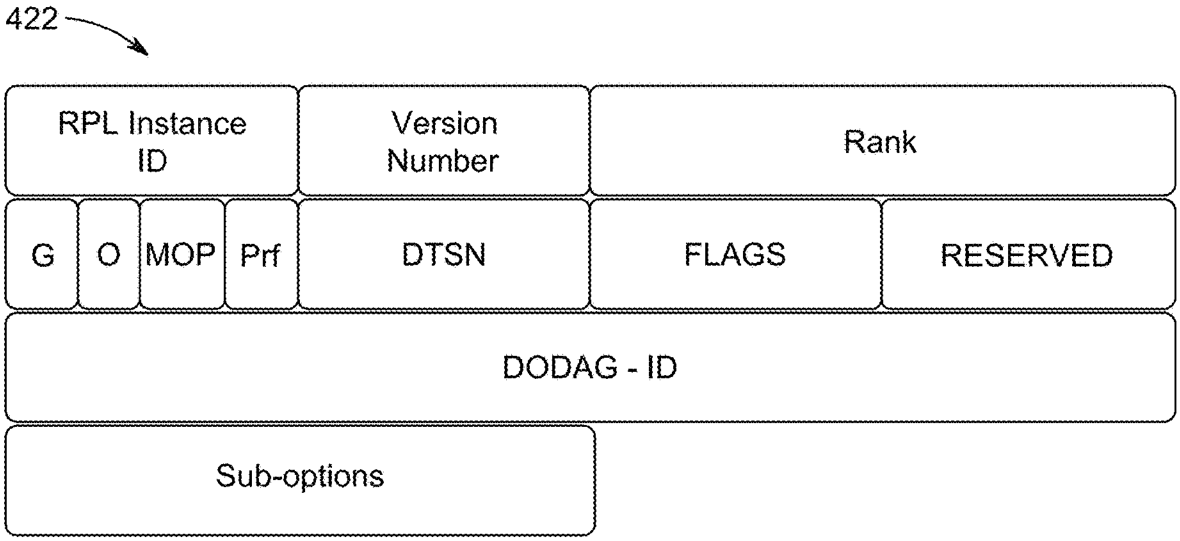
FIG. 4C illustrates a structure of a DIO message, according to certain embodiments.

FIG. 4C illustrates a structure of the DIO message 422, according to an embodiment. The DIO message 422 includes one or more data fields that enables a node, such as the node 406 in FIG. 4B, to locate an RPL Instance, learn about configuration settings, choose a DODAG parent set, and keep the DODAG up to date. The DIO packets are used to construct multi-point to point (MP2P) routing paths as well as assist new nodes in finding neighboring DODAG. One of the fields in the DIO message 422 is a DIO Version Number. The DIO version number assists in keeping all nodes 406 in sync with new updates and denotes the version number of a DODAG. The version number normally increases upon each network information update. Another field is a "Rank". The rank field provides details of a rank of the node 406 that sent the DIO message. The MOP field indicates the DODAG root that determines the mode of operation of the RPL. A DODAG-ID field represents a unique value for each DODAG. The DODAG-ID is identified specifically by a DODAG root, for example root node 410-R in FIG. 4B.

Referring back to FIG. 4B, when one or more nodes 406 receives the DIO message 422, each node 406 evaluates the routing information like RPL instance, the version number, the objective function, and the mode of operation that represents the network information. The DIO message 422 also carries information about the sender, including node ID and rank of the node. The root node 410-R adds this information in the DIO message 422 before sending the DIO message 422 to other nodes 406.

In case a new node, for example a node 408, wants to join the DODAG IoT network 302 404, the new node 408 broadcasts a DAG Information Solicitation message, also known as a DIS message. After broadcast, the DIS message reaches to all other nodes 406 that are located within the communication range of the new node 408. Received DIS message by other nodes 406 also includes one or more data field that is described in FIG. 4D.

Figure 4D:
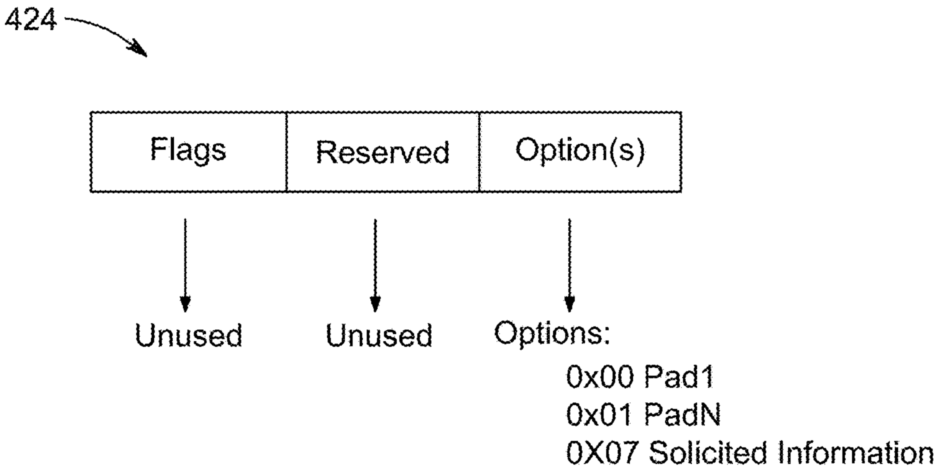
FIG. 4D illustrates a structure of a DIS message, according to certain embodiments.

FIG. 4D illustrates a structure of a DIS message 424, according to an embodiment. The DIS message 424 is employed to request the DIO message from an RPL node. For example, the new node i.e. the node 408 in FIG. 4B, requests the DIO message i.e. the DIO message 422 in FIG. 4C, from the RPL node 406. In this way, the new node 408 probes neighbor nodes 406 in nearby DODAGs using the DIS message 424. Typically, one or more fields in the DIS message 424 includes Flags, Reserved and Options(S). Flags and the reserved field are usually unreserved.

Referring back to FIG. 4B, when one or more nodes 406, that are located within the communication range of the new node 408, receives the DIS message 424, they 406 reply with another DIO message 422. Another DIO message 422 aims to reach the new node 408. The DIO message 422 carries the node ID, objective function, and node rank. Until the new node 408 receives the DIO message 422 from at least one of the neighbor nodes 406, the new node 408 continuously broadcasts the DIS messages 424 at a predefined interval. The predefined interval varies with different RPL implementations. The new node 408 stops sending the DIS messages 424 after receiving the DIO messages 422 from one or more neighbor nodes 406. The new node 408 further starts to inspect all sender nodes 406. The sender nodes 406 are considered as prospective parents for the new node 408. In some other RPL design, the new node 408 could also be configured to wait to receive the DIO messages 422 from its neighbor nodes 406 without sending the DIS message 424. Also, a time interval between the two consecutive DIO messages 422 from the prospective parent node 406 is dynamic. A trickle timer is used to determine the time interval.

When the new node 408 receives the DIO message 422, the new node 408 computes the rank of the new node 408 by considering a given objective function. The objective function aims to optimize the energy consumption, the hop count, or the quality of the proposed paths. More specifically, the objective function focuses to determine the rank of each node 406, 408 within the DODAG structure. The root node is also considered as a sink node with the minimum rank. Also, the DIO message 422 assists the new node 408 in prioritizing the nearby nodes as the prospective parents in an ordered list. Furthermore, in DODAG structure 404, each node 406, 408 selects the preferred parent which acts as a root node (for example node 406) that offers the lowest cost or the minimum rank for this node, for example the new node 408. Based on the objective function and the rank of the sending node, the nodes 406, 408 decide whether to join the DODAG network 404 or not. When the new node 408 selects its preferred parent, the new node 408 registers itself by sending a destination advertisement object message or a DAO message to its preferred parent node. The DAO message received by the preferred parent node 406 also includes one or more data field that is described in FIG. 4E.

Figure 4E:
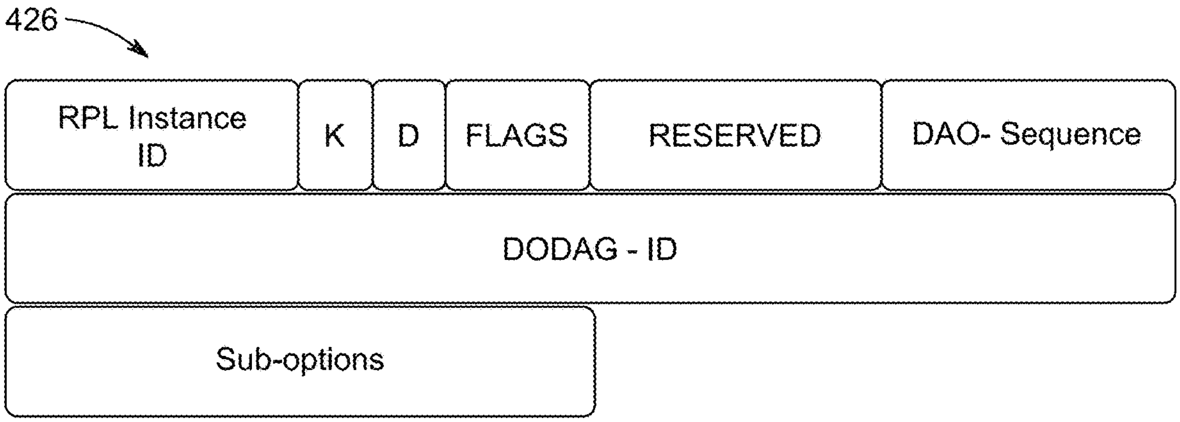
FIG. 4E illustrates a structure of a DAO message, according to certain embodiments.

FIG. 4E illustrates a structure of a DAO message 426, according to an embodiment. Along the DODAG connections, the DAO message 426 is utilized to spread the destination information upstream. The DAO message 426 is unicast to a specific parent, for example node 406 in FIG. 4B, in storing mode, whereas the DAO message 426 is unicast to the DODAG root node, for example the root node 410-R in FIG. 4B in non-storing mode. The RPL facilitates P2MP traffic by relaying on the DAO messages 426. In some cases, destination advertisements may update routing tables. When the root node 410-R sends messages to a descendant node 406 in the downward direction, the root node 410-R utilizes the routing table created based on the received DAO messages 426.

Referring again back to FIG. 4B, in storing modes, each node 406, 408 maintains a routing table. The routing table maps all reachable destinations in its sub-DODAG to their corresponding next-hop nodes, as discovered when receiving DAO messages 426. However, in non-storing mode, the DAO message 426 is delivered directly to the root node 410-R. When the root node 410-R receives the DAO message 426, the root node 410-R adds the node 406 to its routing table and stores the parent-child relationship which is utilized for source routing. Optionally, the root node 410-R may acknowledge the receipt of the DAO message 426 from the node 406 by sending a destination advertisement object-acknowledgement or DAO-ACK message back to the node 406 as a DAO sender node 406. Received DAO-ACK message by the DAO sender node 406 also includes one or more data field that is described in FIG. 4F.

Figure 4F:
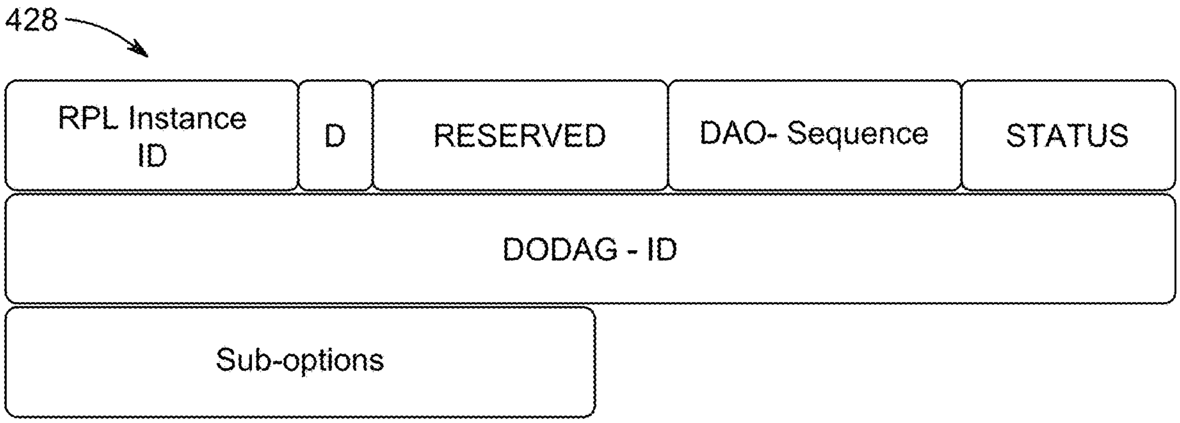
FIG. 4F illustrates a structure of a DAO-ACK message, according to certain embodiments.

FIG. 4F illustrates a structure of a DAO-ACK message 428, according to an embodiment. The DAO recipient, i.e., either the DAO parent node 406 or a DODAG root node 410-R in FIG. 4B, transmits the optional DAO-ACK message 428 as a unicast packet as a response to the received unicast DAO message 426. The DAO-ACK message 428 also includes one or more fields such as RPL instance ID, Reserved field, DAO sequence, STATUS, DODAG ID and sub-options field.

With the concepts related to DODAG network and RPL messages transmitted and received among the nodes as described in FIG. 4, reference is again made to the intrusion detection monitoring system (IDS) 300 in FIG. 3 to identify one or more RPL attacks on any node. The preliminary knowledge related to the DODAG network and RPL messages acts as an aid to understand the fundamentals involved in the identifying one or more RPL attacks using the intrusion detection monitoring system (IDS) 300.

Initially, when the Internet of Things (IoT) network 302 is established including plurality of network nodes 304 representing multiple IoT devices, the network connection device 306 communicates with the Internet of Things (IoT) network 302. In an embodiment, the communication between the network connection device 306 and the Internet of Things (IoT) network 302 could be created by wired or wirelessly techniques. The communication is established to create and store a global routing table in a memory 320 of the network connection device 306. The global routing table includes a MAC address of each node 304, along with a MAC address of every other node 304 that are located in its communication range. For example, nodes 320 and 318 are within the communication range of a node 316. As such, the global routing table includes a MAC address of the node 316 along with MAC addresses of the nodes 318 and 320 as these nodes are within the communication range of the node 316. In similar way, the global routing table is created by adding entries for each node 304 using its MAC address and adding its neighbor nodes 304 using the given MAC addresses. To execute the preparation and storage of the global routing table, the network connection device 306 is configured to execute a computer implemented method corresponding to algorithm 1 in the processor or the routing device 308 of the network connection device 306 as below:

Algorithm 1:
Preparing Global Routing Table

```
Data: Input: GlobalNeighborMap(GivenNodeMAC, GivenNeighborMAC)
  Output: GlobalRoutingTable(StoredNodeMAC, NodeID, NodeRank, ParentID,
#IncomingPackets,
  #OutgoingPackets, LastDISTime, Average_DIS_Interval, LastDIOTime,
Average_DIO_Interval, #DAO,
  NeighborMap(NeighborMAC, NeighborID, NeighborRank),
ChildrenList(ChildID))
  Define Node_Index = -1
```

-continued

```
Algorithm 1:
Preparing Global Routing Table

  for each NodeMAC in GlobalNeighborMap do
      Node_Index = find in GlobalRoutingTable(StoredNodeMAC =
      NodeMAC)
    if Node_Index = −1 then
        Add to GlobalRoutingTable(StoredNodeMAC = NodeMAC,
        NodeID = 0, NodeRank = 0, ParentID = 0, #IncomingPackets =0,
        #OutgoingPackets = 0, LastDISTime = 0,
        Average_DIS_Interval = 0, LastDIOTime = 0,
        Average_DIO_Interval = 0, #DAO = 0, NeighborMap
        (NeighborMAC = GivenNeighborMAC, NeighborID = 0,
        NeighborRank = 0), ChildrenList(Null))
      else
        Add (NeighborMAC = GivenNeighborMAC, NeighborID = 0,
        NeighborRank = 0) to
        GlobalRoutingTable[Node_Index].NeighborMap
      end
end
```

When algorithm 1 is executed in a routing device it generates a global routing table for the IoT network 302. Once the global routing table is prepared for each node 304 on the Internet of Things (IoT) network 302, the network connection device 306 stores the global routing table in the memory 320 of the network connection device 306.

The network connection device 306 now begins monitoring the network traffic. In other words, the network connection device 306 monitors the incoming and outgoing traffic flow from each node 304. In an embodiment, network connection device 306 periodically monitors the network traffic within, for example, 1 minute, 5 minutes, 10 minutes, 1 hour or alike. Periodically, the network connection device 306 inspects the traffic to identify the presence of any possible RPL attacks. In order to monitor the network traffic, the network connection device 306 is configured for receiving a plurality of ICMPv6 network packets from the IoT devices or the nodes 304.

Further, the network connection device 306 is configured to update the global routing table at periodic basis. The periodic update is necessary for multiple cases, for example, a new node joins the IoT network 302 or an old node in the IoT network 302 102 leaves the IoT network 302 or even a malicious node 318 joins the IoT network 302. As such, the network connection device 306 uses the IPV6 packets. The IPV6 packets also include IP and MAC addresses of each node 304 currently present in the IoT network 302. furthermore, the network connection device 306 stores the combination of MAC and IP of every node present in the IoT network 302 using the IPv6 packets. If it is not stored, the network connection device 306 updates the ID of a sender node 304 in the entry of the routing table and in the entry of the routing table of all neighbor nodes. This is done by executing a computer implemented method in the processing circuitry of the routing device 308 corresponding to algorithm 2 below:

```
Algorithm 2:
Updating and Maintaining Global Routing Table

  Data: ICMPV6 packet
  Define Sender ID = IPV6.Source Address
  Define Sender_MAC = Sender MAC Address
  Define Sender_Index = −1
  Sender Index = find (NodeID = Sender ID) in GlobalRoutingTable
  If Sender_Index = −1 then
    Sender_Index = find (StoredNodeMAC = Sender_MAC) in
GlobalRoutingTable
    if Sender_Index = −1 then
      print( 'Not existing Node' )
    else
      Update GlobalRoutingTable[Sender_Index] (NodeID = Sender ID)
      Define Node_Index = −1
      for each Node_Index in GlobalRoutingTable do
        If GlobalRoutingTable[Node_Index].NeighborMap
(NeighborMAC =Sender_MAC) then
          Update
GlobalRoutingTable[Node_Index].NeighborMap(NeighborID = Sender ID)
        end
      end
    end
  end
if ICMPV6. Type = 155 then
    if ICMPV6.Code = DIS then
      Define DIS_Interval = ReceivedTime -
GlobalRoutingTable[Sender_Index].LastDISTime
      Update GlobalRoutingTable[Sender_Index].Average_DIS_Interval = (
        GlobalRoutingTable[Sender_Index].Average_DIS_Interval +
DIS_Interval) / 2
```

-continued

```
Algorithm 2:
Updating and Maintaining Global Routing Table

        Update GlobalRoutingTable[Sender_Index].LastDISTime =
ReceivedTime
      else
        if ICMPV6.Code = DIO then
          Define DIO_Interval = ReceivedTime -
GlobalRoutingTable[Sender_Index].LastDIOTime
          Update
GlobalRoutingTable[Sender_Index].Average_DIO_Interval = (
            GlobalRoutingTable[Sender_Index].Average_DIO_Interval +
DIO_Interval) / 2
          Update GlobalRoutingTable[Sender_Index].LastDIOTime =
ReceivedTime
        else
          If ICMPV6.Code = DAO then
            Update GlobalRoutingTable[Sender_Index].#DA0++
          end
        end
      end
      Check Generating Packets Attacks
      Check Modifying Packets Attacks
      if ICMPV6. Code = DIO then
        Define Node_Index = −1
        for each Node_Index in GlobalRoutingTable do
          If GlobalRoutingTable[Node_Index].NeighborMap(NeighborMAC =
Sender_MAC) then
            Update
GlobalRoutingTable[Node_Index].NeighborMap(NeighborRank = DIO. Rank)
          end
        end
      end
        Check Replaying Packets Attacks
      else
        Update GlobalRoutingTable[Sender_Index].#OutgoingPackets++
        ReceiverID = IPV6.Destination Address
        Define Receiver_Index = −1
        Receiver_Index = find (NodeID = ReceiverID) in GlobalRoutingTable
        If Receiver Index = −1 then
          Print("Error! Notexisting destination")
        else
          Update GlobalRoutingTable[Receiver_Index].#IncomingPackets++
        end
        Check Leaking Packets Attacks
        Check Dropping Packets Attacks
      end
```

Furthermore, the memory 320 of the network connection device 306 stores a taxonomy of RPL attack signatures corresponding to one or more attack that has a possibility of occurring due to presence of one or more malicious or attacker nodes in the IoT network 302. The taxonomy refers to classification of one or more pattern of RPL attack signatures which is used by the routing device 308 of the network connection device 306 to match the network traffic pattern to attack signatures of one or more attacker nodes in the IoT network 302. The taxonomy is divided into two branches. Each branch represents a specific type of attack signature. A first branch indicates a branch to one or more category of a data plane attack. A second branch indicates a branch to one or more category of a control plane attack. Each type of attack signature is therefore structured in a tree structure where the first branch includes RPL attack signature pattern of the data plane attack whereas the second branch includes RPL attack signature pattern of the control plane attack. The taxonomy is described in detail in FIGS. 5A, 5B, 5C, 5D and 5E. In order to understand the taxonomy of RPL attack signatures, each diagram in FIG. 5 is described in detail as a preliminary exposure to the taxonomy used in the current invention to detect one or more attacker node using RPL attack signatures of the attacker node. Initially, the first branch indicating the data plane attack of the RPL attack signature pattern in the taxonomy is described with reference to FIG. 5A.

Figure 5A:
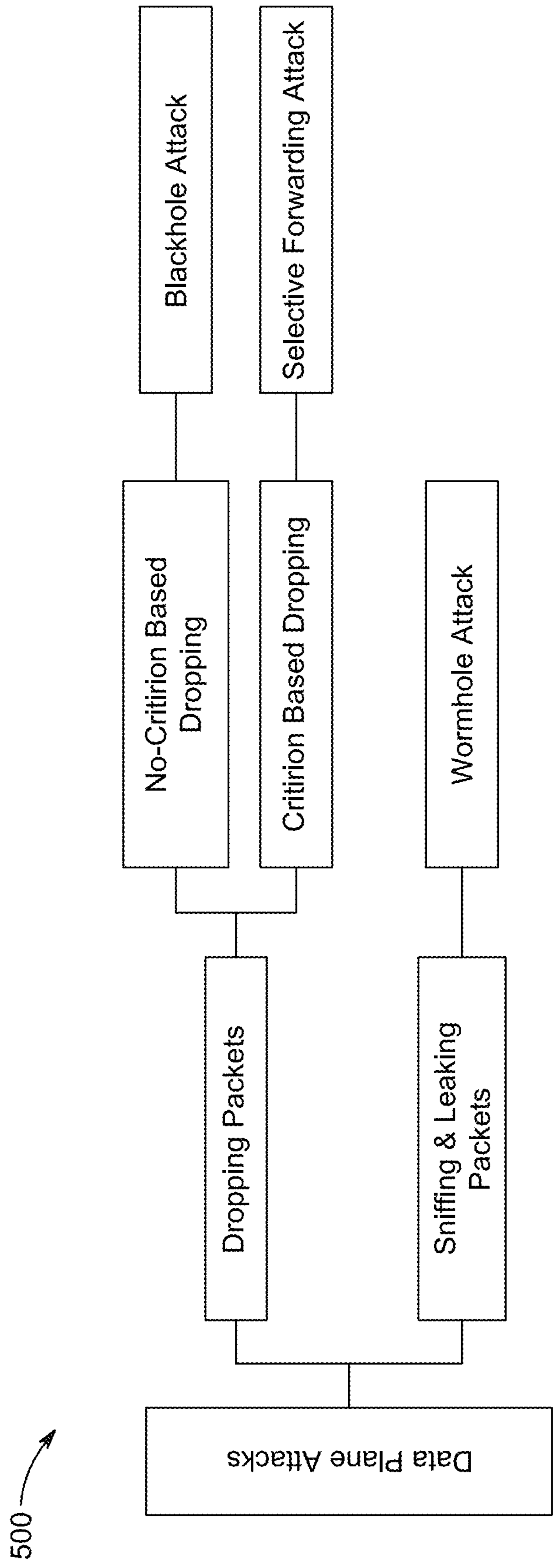
FIG. 5A illustrates a taxonomy of RPL attack signature pattern in the data plane attacks, according to certain embodiments.

Data Plane Attack:

FIG. 5A illustrates a taxonomy 500 of RPL attack signature pattern in the data plane attacks, according to an embodiment. In data plane attacks, an attacker node usually targets all IPv6 communication packets without considering RPL control messages. In this case, the attacker node may either drop, sniff, or leak the communication packets. Therefore the data plane attack is further classified into a dropping packet attack and the sniffing & leaking packet attack.

(1) Dropping Packet Attack

When the attacker node targets another node for dropping a packet attack, the attacker node may choose to perform either no-criteria based dropping or a criteria-based dropping. The no criteria-based dropping involves dropping all communication packets by the attacker node rather than sending or forwarding them to the next node. The impact of this attack appears in a noticeable drop in packet delivery ratio PDR, increase in E-2-E delay, and increase in the frequency of the DIO message exchange. Therefore, in this case, if any node in the IoT network 302 transmits the communication packet towards a parent or root node via the attacker node, the attacker node receives all the communication packets. However, the attacker node does not forward any of the communication packets towards the parent or root node. The attacker node drops all the communication packets. This type of signature pattern is referred to as a Blackhole Attack. Accordingly, the network connection device 306 stores the RPL attack signature pattern corresponding to the blackhole attack in the memory 320. As such, at the time of monitoring the traffic, the network connection device 306 could easily identify the RPL attack signature corresponding to the blackhole attack by matching the network traffic pattern corresponding to RPL attack signature as the blackhole attack that one or more attacker node creates in the IoT network 302.

On the other side, the attacker node may be configured to generate the criteria-based dropping. The criteria-based dropping involves dropping only few communication packets but not all, based on a specific criterion. Therefore, in this case, if any node in the IoT network 302 transmits the communication packet towards a parent or root node via the attacker node, the attacker node receives all the communication packets. However, the attacker node forwards only selected communication packets towards the parent or root node and drops everything else. The attacker node checks the incoming packets and then allows sending some packets and dropping others based on the class of packets. This type of signature pattern is referred to as a Selective forward Attack. The selective forward attack may lead to disruption of the routing path and destabilizes the data flow in the IoT network 302. Accordingly, the network connection device 306 stores the RPL attack signature pattern corresponding to the Selective forward Attack in the memory 320. As such, at the time of monitoring the traffic, the network connection device 306 could also easily identify the RPL attack signature corresponding to the Selective forward Attack by matching the network traffic pattern corresponding to RPL attack signature as the Selective forward Attack that the attacker node creates in the IoT network 302. Accordingly, to execute the detection process of the attacker node in the IoT network 302 in which the attacker is performing either the blackhole attack or the selective forward attack, the network connection device 306 is configured to execute a computer implemented method corresponding to algorithm 3 in the processor of the network connection device 306, as below:

Algorithm 3:
Dropping Packets Attacks

```
Data: DroppingThreshold
if GlobalRoutingTable[Receiver_Index].#IncomingPackets ÷
    GlobalRoutingTable[Receiver_Index].#OutgoingPackets >=
DroppingThreshold then
    if GlobalRoutingTable[Receiver_Index].#OutgoingPackets =
    0 then
        Mark ReceiverID as Blackhole
    else
        Mark ReceiverID as SelectiveForwarder
    end
end
```

(2) Sniffing & Leaking Packet Attack

When the attacker node targets another node for sniffing & leaking packet attack, the attacker node may be configured to collaborate to illegally reroute the network traffic. In this attack, multiple adversary nodes collaborate with each other to exploit the traffic from a specific part of the DODAG to another part of the DODAG. The sniffing & leaking packet attack may occur by a packet encapsulation process. In the packet encapsulation process, two attacker nodes collaborate to pretend that they are nearby and form a tunnel to directly exchange packets between them. As a result, other nearby legitimate neighbors transmit their packets through attacker nodes, which may cause a delay in transmission or loss of packets. The sniffing & leaking packet attack may occur by a packet relay process. In the packet relay process, one or more attacker nodes connect two legitimate nodes that are not neighbors. Therefore, the victim nodes which are unreachable by each other are connected through the attacker node by relaying the packet between two out-of-range legitimate nodes. The effect of sniffing & leaking packet attack may cause a larger end-to-end delay and/or high packet losses. This type of the RPL attack signature pattern is referred to as a Wormhole Attack. Accordingly, the network connection device 306 stores the RPL attack signature pattern corresponding to the wormhole attack in the memory 320. As such, at the time of monitoring the traffic, the network connection device 306 could easily identify the RPL attack signature corresponding to the wormhole attack by matching the network traffic pattern corresponding to RPL attack signature as the wormhole attack that one or more attacker nodes create in the IoT network 302. Accordingly, to execute the detection process of one or more attacker node in the IoT network 302 in which the one or more attacker nodes are performing the wormhole attack, the network connection device 306 is configured to execute a computer implemented method corresponding to algorithm 4 in the processor of the network connection device 306, as below:

Algorithm 4:
Leaking Packets Attacks

```
if GlobalRoutingTable[Sender_Index].ParentID != ReceiverID
then
    Mark SenderID as Wormhole
end
```

Control Plane Attacks:

The second of the two branches indicates the control plane attack of the RPL attack signature pattern. In control plane attacks, one or more attacker nodes usually target RPL control messages by either generating, modifying, or replaying the control messages. Therefore, the control plane attack of the RPL attack signature pattern is further categorized into three main categories.

(1) Generating packet attack: The first category of the control plane attack includes generating packets attack. A taxonomy of RPL attack signature pattern in the control plane attacks in generating packets is now explained in detail in FIG. 5B.

Figure 5B:
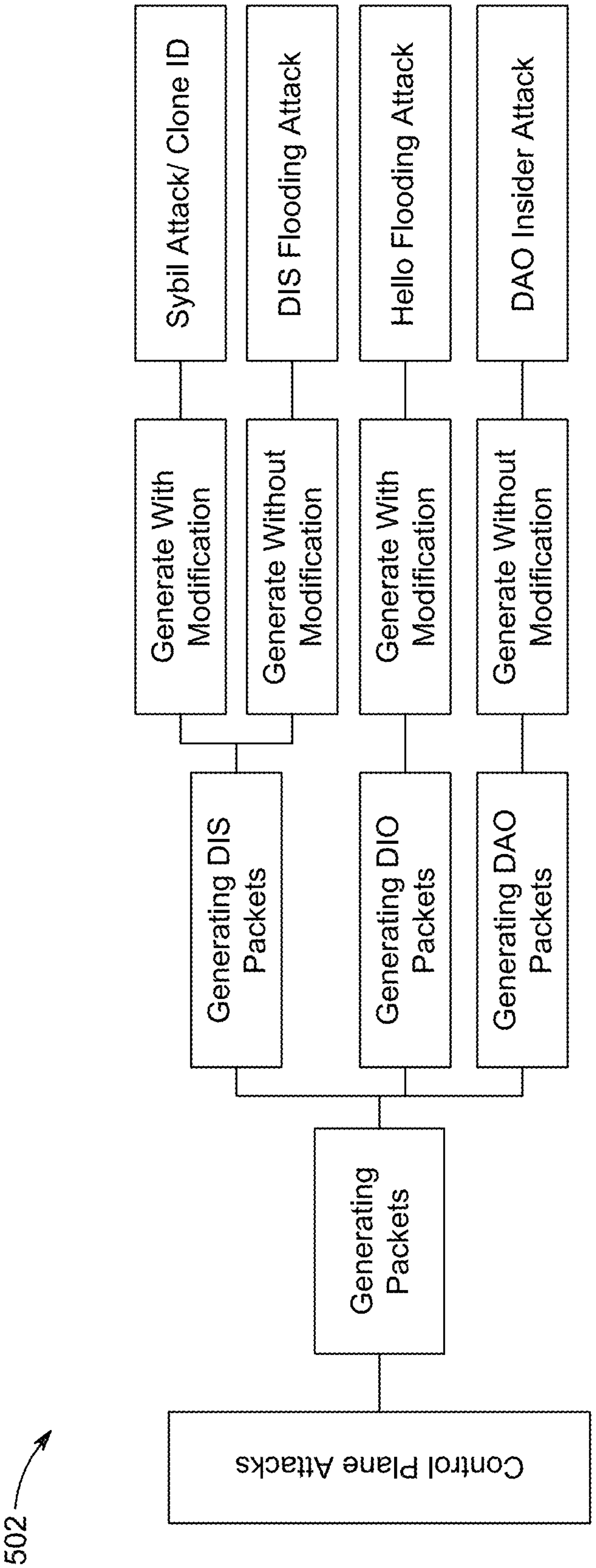
FIG. 5B illustrates a taxonomy of RPL attack signature pattern in the control plane attacks in generating packets, according to certain embodiments.

FIG. 5B illustrates a taxonomy 502 of RPL attack signature pattern in the control plane attacks in generating packets, according to an embodiment. The generating packets attack is further classified into three categories. A first generating packets attack is a generating DIS packets attack. In the generating DIS packet attack, the one or more attacker nodes misuse a first RPL control message i.e. the DIS message that is used by new nodes wish to join the IoT network 302. The generating DIS packet attack is further classified into two categories. A first category includes generating the DIS packets with modification. In this case, an attacker node generates an excessive number of DIS messages with different fake identities. More specifically, the attacker node multicasts many redundant DIS messages with different fake identities which force other legitimate nodes to reset their trickle algorithm. The impact of this attack appears in disrupting the routing topology. Moreover, the attack triggers the maintenance process which results in broadcasting a large number of control messages that quickly drain the limited energy resources. This type of the RPL attack signature pattern is referred to as a Sybil attack or clone ID attack. Accordingly, the network connection device 306 stores the RPL attack signature pattern corresponding to the Sybil attack in the memory 320. As such, at the time of monitoring the traffic, the network connection device 306 could easily identify the RPL attack signature corresponding to the Sybil attack by matching the network traffic pattern corresponding to RPL attack signature as the Sybil attack that one or more attacker nodes create in the IoT network 302.

A second category includes generating the DIS packets without modification. In this case, an attacker node generates numerous DIS messages that could initiate flooding of DIS messages. More specifically, the attacker node floods its neighbor node by either broadcasting the DIS messages in order to reset neighbor nodes' trickle timer or unicasting DIS messages to a specific neighbor node which has to reply with a DIO message. This attack increases the exchange of control packets that leads to network congestion. This attack has more impact when the attacker node broadcast DIS message which may lead to resetting the trickle timer of the receiver node. Consequently, this may also lead to flooding the network with DIO messages and to increasing the power consumption of nodes in the IoT network 302. This type of the RPL attack signature pattern is referred to as a DIS flooding attack. Accordingly, the network connection device 306 stores the RPL attack signature pattern corresponding to the DIS flooding attack in the memory 320. As such, at the time of monitoring the traffic, the network connection device 306 could easily identify the RPL attack signature corresponding to the DIS flooding attack by matching the network traffic pattern corresponding to RPL attack signature as the DIS flooding attack that one or more attacker nodes create in the IoT network 302.

A second generating packets attack is a generating DIO packet attack. In the generating DIO packets attack, the one or more attacker nodes misuse a second RPL control message, i.e. the DIO message that is used to carry information about the node and the network. The generating DIO packets attack is defined as to generate the DIS packets with modification. In this case, an attacker node generates frequent DIO messages. More specifically, the DIO generating packets attack occurs when an attacker node frequently sends the DIO message using strong routing metrics or a strong signal where DIO message is the "HELLO" message sent by the root node when it reveals its existence to create a new DODAG. The attacker node specifically performs the attack by broadcasting one or more DIO messages with usually strong routing metrics and/or strong signal. As a result, nodes in the communication range of the attacker node reset their trickle timer and might decide to join another DODAG network. Meanwhile, the attacker node might just disappear or reduce its transmission power to normal. Thereby, communication packets from other legitimate nodes would fail to deliver. The impact of this attack is a decrease in packet delivery ratio as many legitimate packets sent by other nodes will not deliver. In addition, this attack exhausts the energy of legitimate nodes in addition to increasing the control overhead to cause congestion in the network. This type of the RPL attack signature pattern is referred to as a Hello flood attack. Accordingly, the network connection device 306 stores the RPL attack signature pattern corresponding to the Hello flood attack in the memory 320. As such, at the time of monitoring the traffic, the network connection device 306 could easily identify the RPL attack signature corresponding to the Hello flood attack by matching the network traffic pattern corresponding to RPL attack signature as the Hello flood attack that one or more attacker nodes create in the IoT network 302.

A third generating packets attack is a generating DAO packets attack. In the generating DAO packets attack, the one or more attacker nodes misuse the third RPL control message, i.e. the DAO message by the joining node to disseminate its routing information to its ancestor's node. The generating DAO packets attack is defined as to generate the DAO packets without modification. In this case, one or more attacker nodes generate and send periodic DAO message packets to flood the IoT network 302 with DAO messages. More specifically, the one or more attacker nodes frequently sends one or more DAO messages to its parent nodes to force ancestor nodes to flood the network with DAO messages. As a result, the DAO packets attack harms energy resources and increases end to end latency. This type of the RPL attack signature pattern is referred to as a DAO insider attack. Accordingly, the network connection device 306 stores the RPL attack signature pattern corresponding to the DAO insider attack in the memory 320. As such, at the time of monitoring the traffic, the network connection device 306 could easily identify the RPL attack signature corresponding to the DAO insider attack by matching the network traffic pattern corresponding to RPL attack signature as the DAO insider attack that one or more attacker nodes create in the IoT network 302.

Accordingly, to execute the detection process of one or more attacker node in the IoT network 302 in which the one or more attacker nodes are performing either the Sybil attack or DIS flooding attack or the Hello Flood attack or the DAO insider attack, the network connection device 306 is configured to execute a computer implemented method corresponding to algorithm 5 in the processor of the network connection device 306, as below:

Algorithm 5:
Generating Packets Attacks

```
Data: RPL_DIS_INTERVAL, RPL_DIO_INTERVAL_MIN, Maximum_DAO_per_child
  if ICMPV6.Code = DIS then
    if GlobalRoutingTable[Sender_Index].NodeID != SenderID or
      GlobalRoutingTable[Sender_Index].StoredNodeMAC ! = Sender_MAC
then
        Define DIS_ID_Index, DIS_MAC_Index = -1
        DIS_ID_Index = find (NodeID = SenderID) in
GlobalRoutingTable
        DIS_MAC_Index = find (StoredNodeMAC = Sender_MAC) in
GlobalRoutingTable
        if GlobalRoutingTable[DIS_ID_Index].NodeMAC ! = Sender_MAC
```

-continued

Algorithm 5:
Generating Packets Attacks

```
address then
          Mark SenderID as Clone-ID
        else
          if GlobalRoutingTable[DIS_MAC_Index].NodeID != SenderID
then
            Mark SenderID as Sybil
          end
        end
    else
      if GlobalRoutingTable[Sender_Index].Average_DIS_Interval <=
RPL_DIS_INTERVAL then
        Mark SenderID as DIS Flooding
      end
    end
  else
    if ICMPV6.Code = DIO then
      if GlobalRoutingTable[Sender_Index].Average_DIO_Interval <=
RPL_DIO_INTERVAL_MIN then
        Mark SenderID as Hello Flood
      end
    else
      if ICMPV6.Code = DAO then
        if GlobalRoutingTable[Sender_Index].#DAO >=
Maximum_DAO_per_child then
            Mark SenderID as DAO Insider
          end
      end
    end
  end
```

(2) Modifying packet attack: A second category of the control plane attacks further includes a modifying packets attack. In the modifying packets attack, one or more attacker nodes usually target RPL control messages by modifying the control messages. Therefore, the control plane attack corresponding to the modifying packets as RPL attack signature pattern is further categorized into two main categories. A first category of the control plane attack corresponding to the modifying packets as RPL attack signature pattern includes modifying DIO packets attack or DIO control messages. A taxonomy of the RPL attack signature pattern in the control plane attacks in modifying packets is now explained in detail in FIG. 5C.

Figure 5C:
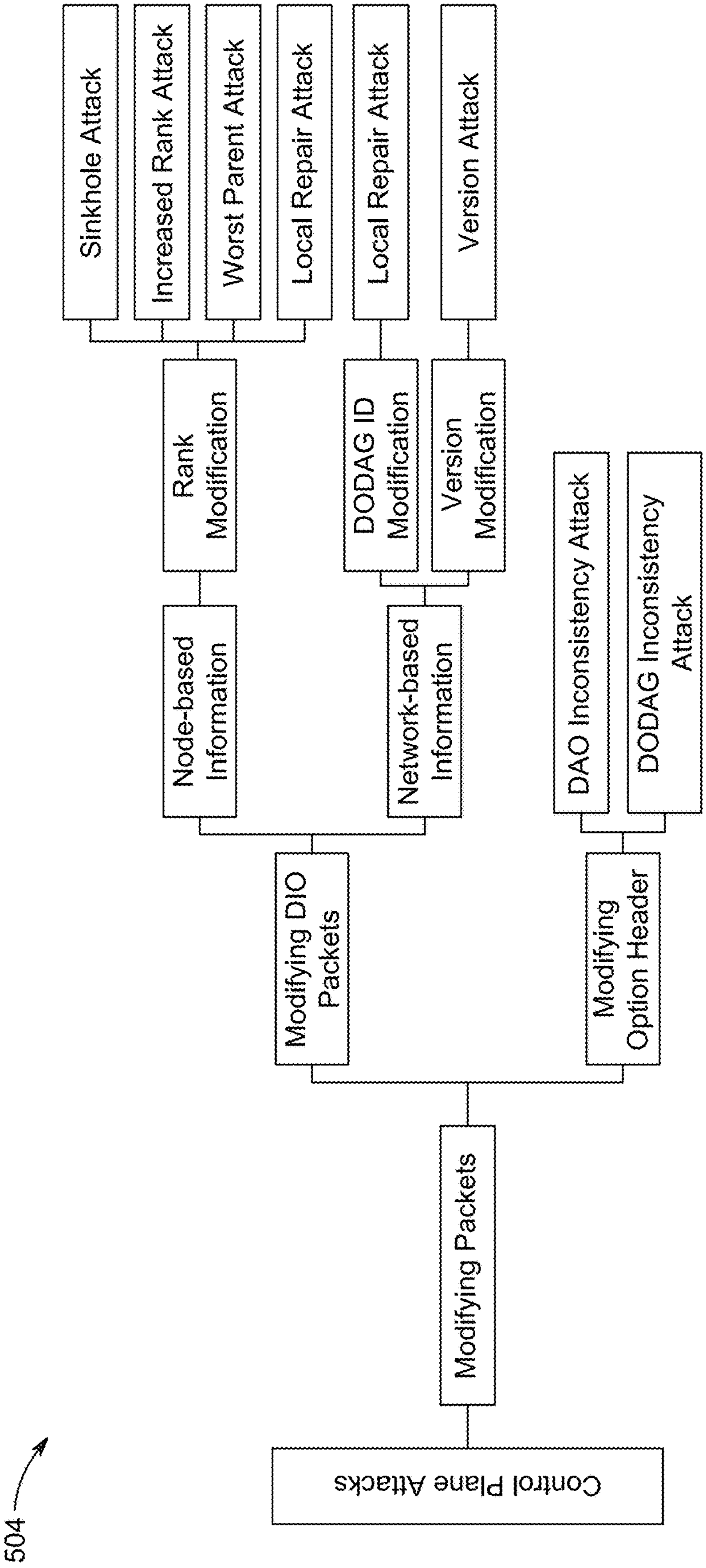
FIG. 5C illustrates a taxonomy of RPL attack signature pattern in the control plane attacks in modifying packets, according to certain embodiments.

FIG. 5C illustrates a taxonomy 504 of RPL attack signature pattern in the control plane attacks in modifying packets, according to an embodiment. The modifying packets attack is further classified into two categories. A first category of modifying packets is a Modifying DIO packets attack. The Modifying DIO packets attack is further classified into a node-based information attack and a network-based information attack. The node-based information attack of the modifying DIO packets includes a modification of the rank of a node. The rank modification could involve one or more types of attack. More specifically, the rank modification is categorized in four categories. A first category involves a sinkhole attack in the rank modification attack. More specifically, in this case, due to presence of one or more attacker node in the IoT network 302, the rank of an attacker node is changed. An attacker node displays a lower rank to other nodes compared to the legitimate rank in order to advertise the attacker node as a preferred parent. In order to advertise the attacker node as the preferred parent, the attacker node traps all traffic by advertising for a fabricated route using a different objective function (OF) to mislead legitimate nodes or by modifying the rank value in DIO message. Therefore, one or more neighbor nodes consider the attacker node as a sink. The consequence of this attack is a significant disruption to DODAG of the RPL. The impact of this attack causes a high network traffic toward the attacker node. This type of the RPL attack signature pattern is referred to as the sinkhole attack. Accordingly, the network connection device 306 stores the RPL attack signature pattern corresponding to the Sinkhole attack in the memory 320. As such, at the time of monitoring the traffic, the network connection device 306 could easily identify the RPL attack signature corresponding to the Sinkhole attack by matching the network traffic pattern corresponding to RPL attack signature as the Sinkhole attack that one or more attacker nodes create in the IoT network 302.

A second category involves an increased rank attack in the rank modification attack. More specifically, in this case an attacker node manipulates the rank value of itself to a higher value than its actual rank. This creates an impression to other legitimate nodes that the attacker node is closer to the root node. Similar to the sinkhole attack, the rank is manipulated by modifying the rank of the attacker node by a specific fake value or by using a different objective function (OF) to mislead other legitimate nodes. The impact of this attack is that this attack forces other legitimate nodes to choose further nodes as parents. This leads to consumption of more energy and causing additional latency in the IoT network 302. However, this attack has a lower impact compared to sinkhole attack. This type of the RPL attack signature pattern is referred to as the increased rank attack. Accordingly, the network connection device 306 stores the RPL attack signature pattern corresponding to the increased rank attack in the memory 320. As such, at the time of monitoring the traffic, the network connection device 306 could easily identify the RPL attack signature corresponding to the increased rank attack by matching the network traffic pattern corresponding to RPL attack signature as the increased rank attack that one or more attacker nodes create in the IoT network 302.

A third category involves a worst parent attack in the rank modification attack. More specifically, in this case an attacker node selects a parent node that maximizes its rank in the DODAG structure. The impact of this attack is that this attack leads to an increase in the projected transmission count not only for the attacker node, but also for all legitimate nodes in the sub-DODAG of the attacker node. Moreover, this type of attack further leads to additional delays in terms of the topology. The attack also creates one or more routing loops. This type of the RPL attack signature pattern is referred to as the worst parent attack. Accordingly, the network connection device 306 stores the RPL attack signature pattern corresponding to the worst parent attack in the memory 320. As such, at the time of monitoring the traffic, the network connection device 306 could easily identify the RPL attack signature corresponding to the worst parent attack by matching the network traffic pattern corresponding to RPL attack signature as the worst parent attack that one or more attacker nodes create in the IoT network 302.

A fourth category involves a local repair attack in the rank modification attack. More specifically, in this case an attacker node changes the rank of itself to infinite and broadcasts this fake rank to all legitimate neighbor nodes. The impact of this attack is that the neighbor nodes update the rank information of the attacker node and find a new preferred parent towards the root node. Moreover, this type of attack exhausts the energy resources, increases control overhead, and also causes packet dropping because of temporary loss of valid routes. This type of the RPL attack signature pattern is referred to as the local repair attack. Accordingly, the network connection device 306 stores the RPL attack signature pattern corresponding to the local repair attack in the memory 320. As such, at the time of monitoring the traffic, the network connection device 306 could easily identify the RPL attack signature corresponding to the local repair attack by matching the network traffic pattern corresponding to RPL attack signature as a local repair attack that one or more attacker nodes create in the IoT network 302.

The network-based information attack of the modifying DIO packets is further categorized into two categories. The first category is a DODAG ID modification attack of the network-based information attack that again results a local repair attack. The DODAG ID modification attack involves changing the DODAG ID field. More specifically, in this case, an attacker node changes a DODAG-ID value of itself. The DODAG-ID is the address of the root node which is unique for each DODAG. When a node, for example an attacker node, changes its DODAG-ID, it means that the referred node has left that DODAG network and now belongs to another DODAG network. Consequently, children nodes have to again perform a local repair to select a new preferred parent. According to RPL, children nodes again invoke local repair only if the links to all parents list are lost. The impact of this attack is that the neighbor nodes update the rank information of the attacker node and find a new preferred parent towards the root node. Moreover, this type of attack exhausts the energy resources, increases control overhead, and also causes packets dropping because of temporary loss of valid routes. This type of the RPL attack signature pattern is again known and referred to as the local repair attack. Accordingly, the network connection device 306 stores the RPL attack signature pattern corresponding to the local repair attack due to DODAG-ID modification attack in the memory 320. As such, at the time of monitoring the traffic, the network connection device 306 could easily identify the RPL attack signature corresponding to the local repair attack due to DODAG-ID modification attack by matching the network traffic pattern corresponding to RPL attack signature as local repair attack due to DODAG-ID modification attack that one or more attacker nodes create in the IoT network 302.

A second category is a Version modification attack of the network-based information attack that results a Version modification. In version modification attack, some fields in DIO control messages are used to perform a routing attack that generates a Version attack. In this case, an attacker node changes the version number in a DIO message to a higher number and sends the DIO message that contains a higher version number to other legitimate nodes. Other legitimate nodes receive such DIO message including a new version number. The other legitimate node would invoke the global repair mechanism which involves resetting the trickle timer, updating the version, and advertising this new version through DIO messages to their neighbor nodes. Moreover, nodes that send DIO messages with the old value of the version indicate that the node will not be preferred parents by other nodes. However, data packets from nodes with the new version are not allowed to transit through nodes with the old version to avoid loop creation. The impact of this attack leads to inconsistent topology with routing loops. It also has a negative impact on energy resources of the nodes and channel availability. Moreover, the location of the attacker node determines the impact of this attack as it critically increases when the attacker is a leaf node. This type of the RPL attack signature pattern is referred to as the Version attack. Accordingly, the network connection device 306 stores the RPL attack signature pattern corresponding to the Version attack in the memory 320. As such, at the time of monitoring the traffic, the network connection device 306 could easily identify the RPL attack signature corresponding to the Version attack by matching the network traffic pattern corresponding to RPL attack signature as the Version attack that one or more attacker nodes create in the IoT network 302.

A second category of modifying packets is a Modifying option header attack. The Modifying option header attack is further classified into a DAO inconsistency attack and a DODAG inconsistency attack. The DAO inconsistency attack in the modifying option header occurs when an attacker node sets a forwarding error flag in a packet option header to create a forwarding error packet. The attacker node then replies with this packet to mislead a parent node to discard valid downward routes in the routing table. More specifically, The DAO inconsistency attack happens when the attacker node drops incoming data packets and sets the forwarding error flag or f flag which is located in the packet option header of a control packet. The attacker node then replays the control packet. This attack aims to create an error in packet forwarding to cause the parent node to discard valid downward paths in the routing table. When a message to a downward destination address includes a forwarding error, the sender node considers the address as unreachable and sends an appropriate No-Path DAO. The impact of this attack leads a high decrement in the PDR as well as increase in the energy consumption significantly. This type of the RPL attack signature pattern is referred to as the DAO inconsistency attack. Accordingly, the network connection device 306 stores the RPL attack signature pattern corresponding to the DAO inconsistency attack in the memory 320. As such, at the time of monitoring the traffic, the network connection device 306 could easily identify the RPL attack signature corresponding to the DAO Inconsistency attack by matching the network traffic pattern corresponding to RPL attack signature as the DAO Inconsistency attack that one or more attacker nodes create in the IoT network 302.

On the other side, the DODAG inconsistency attack in the modifying option header attack occurs when an attacker node manipulates the packet option header by setting both 'O' and 'R' flags and sends this packet to the parent node. Setting 'O' flag indicates sending the packet to a descendant node whereas the attacker node sends the packet to an ancestor node. While setting 'R' flag means that an error is detected. As a result, the receiving legitimate node drops the packet because of the DODAG inconsistency forms a black-hole in a next hop. The impact of this attack is a decrease in PDR as the attacker node forces the next hop to drop all packets of the descendant node of the attacker node. It also leads to an increase in message overhead. This type of the RPL attack signature pattern is referred to as the DODAG inconsistency attack. Accordingly, the network connection device 306 stores the RPL attack signature pattern corresponding to the DODAG inconsistency attack in the memory 320. As such, at the time of monitoring the traffic, the network connection device 306 could easily identify the RPL attack signature corresponding to the DODAG inconsistency attack by matching the network traffic pattern corresponding to RPL attack signature as the DODAG inconsistency attack that one or more attacker nodes create in the IoT network 302.

Accordingly, to execute the detection process of one or more attacker node in the IoT network 302 in which the one or more attacker nodes are performing either the Sinkhole attack, increased rank attack, worst parent attack, local repair attack, version attack, DAO inconsistency attack or the DODAG inconsistency attack or combination thereof, the network connection device 306 is configured to execute a computer implemented method corresponding to algorithm 6 in the processor of the network connection device 306, as below:

Algorithm 6:
Modifying Packets Attacks

```
Data: RPL Configuration: Max_Inconsistent_Packets,
Max_Local_Repair_Requests, From Root:
                Root_DODAGID, Root_Version
  Define Inconsistent_Packets = 0
  Define Local_Repair_Requests = 0
  Define Parent_index = find (nodeID =
GlobalRoutingTable[Sender_index].ParentID) in
    GlobalRoutingTable
  if Flag F = 1 then
      Inconsistent_Packets++
      if Inconsistent_Packets >= Max_Inconsistent_Packets then
        Mark SenderID as DAO inconsistency
        Inconsistent_Packets = 0
      end
  end
  If IPV6.Destination Address != Broadcast Address then
      Define ReceiverID = IPV6.Destination Address
      Define Receiver_index = find (nodeID = ReceiverID) in
GlobalRoutingTable
      if Flag O = 1 and GlobalRoutingTable[Sender_index].Parent-
ID = ReceiverID
      or Flag O = 0 and GlobalRoutingTable[Sender_index].Node-
Rank <=
        GlobalRoutingTable[Receiver_index].NodeRank then
          Inconsistent_Packets++
          if Inconsistent_Packets >= Max_Inconsistent_Packets
then
            Mark SenderID as DODAG inconsistency
            Inconsistent_Packets = 0
```

-continued

Algorithm 6:
Modifying Packets Attacks

```
          end
        end
    end
    if ICMPV6.code = DIO then
        If DIO. Version != Root_Version then
        Mark SenderID as Version
      end
      if DIO.DODAGID != Root_DODAGID then
        then Local_Repair_Requests++
        If Local_Repair_Requests >= Max_Local_Repair_Requests
then
            Mark SenderID as Local Repair
            Local_Repair_Requests = 0
        end
      end
      if GlobalRoutingTable[Sender_index].NodeRank != DIO.rank
then
        Update GlobalRoutingTable[Sender_index].NodeRank =
DIO.rank
        If GlobalRoutingTable[Sender_index].NodeRank =
INFINITE_RANK then
          Local_Repair_Requests++
          if Local_Repair_Requests >=
Max_Local_Repair_Requests then
            Mark SenderID as Local Repair
            Local_Repair_Requests = 0
          end
      end
        If GlobalRoutingTable[Sender_index].NodeRank <=
GlobalRoutingTable[Parent_index].NodeRank
          then
            Mark SenderID as Sinkhole
        end
        for each Neighbor in
GlobalRoutingTable[Sender_index].NeighborMap do
            If Neighbor(NeighborRank) <=
GlobalRoutingTable[Sender_index].NodeRank and
              find (Neighbor(NeighborID) in
GlobalRoutingTable[Sender_index].ChildrenList != false)
              then
              Mark SenderID as Increased Rank
            end
          end
      end
    end
```

(3) Replying packet attack: A third category of the control plane attacks includes Replying Packets attack. In Replying Packets attack, one or more attacker nodes target the IoT network 302 while replaying DIO and DAO control messages. The control plane attack corresponding to the replying packets attack as RPL attack signature pattern is further categorized into two main category. A first category of the control plane attack corresponding to the replying packets as RPL attack signature pattern includes Replying DIO packets attacks. A second category of the control plane attack corresponding to the replying packets as RPL attack signature pattern includes Replying DAO packets attacks. A taxonomy of RPL attack signature pattern in the control plane attacks in replying packets is now explained in detail in FIG. 5D.

Figure 5D:
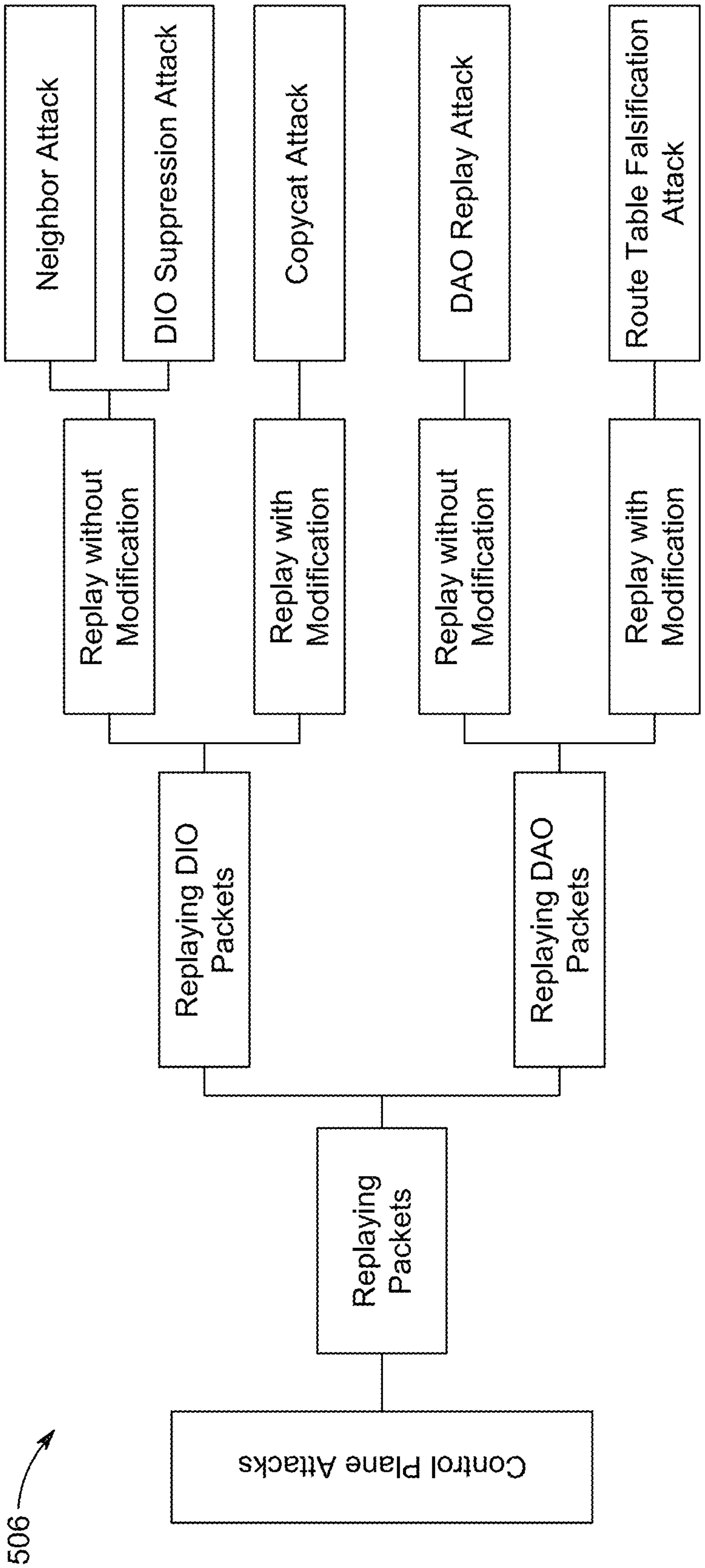
FIG. 5D illustrates a taxonomy of RPL attack signature pattern in the control plane attacks in replaying packets, according to certain embodiments.

FIG. 5D illustrates a taxonomy 506 of RPL attack signature pattern in the control plane attacks in the Replaying Packets, according to an embodiment. The replying DIO packets attack is further classified into two categories. A first category of replying DIO packets in replying packets attack is a Reply without modification. The Reply without modification is further categorized into two categories. In a first category of the Reply without modification of the replying DIO packets attack, if a DIO control message is replayed without modification, this leads to a neighbor attack. More specifically, in this attack an attacker node uses a received DIO message and forwards it without modification. Other legitimate neighbor nodes thus get misled by information in the sent DIO message. The impact of this attack increases end-to-end delay and causes more exchanged control messages. In some cases, the impact of this attack may also lead to select a non-optimized routing paths by other legitimate nodes in the IoT network 302. This type of the RPL attack signature pattern is referred to as the Neighbour attack. Accordingly, the network connection device 306 stores the RPL attack signature pattern corresponding to the Neighbour attack in the memory 320. As such, at the time of monitoring the traffic, the network connection device 306 could easily identify the RPL attack signature corresponding to the Neighbour attack by matching the network traffic pattern corresponding to RPL attack signature as the Neighbour attack that one or more attacker nodes create in the IoT network 302.

In a second category of the Reply without modification of the replying DIO packets attack, if a DIO control message is replayed without modification but within fixed frequency, this leads to a DIO suppression attack. More specifically, in this attack an attacker node eavesdrops a DIO message from one or more legitimate nodes. The attacker node replays the DIO message many times within fixed frequency. Consequently, the victim node receives a high number of consistent DIO messages. Based on a trickle algorithm and when a high number of consistent DIO messages are received, the victim node suppresses its own DIO transmission. The impact of this attack appears in degrading the quality of routing services by reducing packet delivery ratio and network path stretch as the continuous suppression can cause some nodes to be hidden and consequently some routes will be undiscovered. This type of the RPL attack signature pattern is referred to as the DIO suppression attack. Accordingly, the network connection device 306 stores the RPL attack signature pattern corresponding to the DIO suppression attack in the memory 320. As such, at the time of monitoring the traffic, the network connection device 306 could easily identify the RPL attack signature corresponding to the DIO suppression attack by matching the network traffic pattern corresponding to RPL attack signature as the DIO suppression attack that one or more attacker nodes create in the IoT network 302.

A second category of replying DIO packets in replying packets attack is a Reply with modification. The Reply without modification attack of the replying DIO packets attack, an attacker node receives or eavesdrops DIO control messages of one or more legitimate nodes. The attacker node then sends previously received DIO messages many times with fixed replay interval. This type of attack is known as a Copycat attack. There are two types of copycat attacks. A first category of the copycat attack is called a spoofed copycat attack. In spoofed copycat attack, the attacker node replaces the source IP address in the IPV6 packet with the IP address of the original DIO sender. A second category of the copycat attacks is called a non-spoofed copycat attack. In non-spoofed copycat the attacker code replays DIO messages with its own IP address. The impact of this attack on the network is observed as decreasing a packet delivery ratio and increasing end-to-end network delay. This type of the RPL attack signature pattern is broadly referred to as the Copycat attack. Accordingly, the network connection device 306 stores the RPL attack signature pattern corresponding to the Copycat attack in the memory 320. As such, at the time of monitoring the traffic, the network connection device 306 could easily identify the RPL attack signature corresponding to the Copycat attack by matching the network traffic pattern corresponding to RPL attack signature as the Copycat attack that one or more attacker nodes create in the IoT network 302.

The second category of the control plane attack corresponding to the replying packets as RPL attack signature pattern includes Replying DAO packets attacks. The replying DAO packets attack is further classified into two categories. A first category of replying DAO packets in replying packets attack is a Reply without modification. The Reply without modification results in a DAO reply attack. in DAO reply attack. If a DAO control message is replayed without modification by an attacker node, this leads to a DAO reply attack. This type of the RPL attack signature pattern is referred to as the DAO reply attack. Accordingly, the network connection device 306 stores the RPL attack signature pattern corresponding to the DAO reply attack in the memory 320. As such, at the time of monitoring the traffic, the network connection device 306 could easily identify the RPL attack signature corresponding to the DAO reply attack by matching the network traffic pattern corresponding to RPL attack signature as the DAO reply attack that one or more attacker nodes create in the IoT network 302.

A second category of replying DAO packets in replying packets attack is a Reply with modification. The Reply with modification results in a route table falsification. In this attack one or more attacker nodes forge or modifies DAO control messages in order to build false routing entries in routing tables of neighbors and to advertise fake routes to other nodes. The impact of this attack causes end to end delay, packet drops and resources depletion. This type of the RPL attack signature pattern is referred to as the Route Table Falsification attack. Accordingly, the network connection device 306 stores the RPL attack signature pattern corresponding to the Route Table Falsification attack in the memory 320. As such, at the time of monitoring the traffic, the network connection device 306 could easily identify the RPL attack signature corresponding to the Route Table Falsification attack by matching the network traffic pattern corresponding to RPL attack signature as the Route Table Falsification attack that one or more attacker nodes create in the IoT network 302.

Accordingly, to execute the detection process of one or more attacker node in the IoT network 302 in which the one or more attacker nodes are performing either the neighbor attack, DIO suppression attack, copycat attack, DAO reply attack or the route table falsification attack or combination thereof, the network connection device 306 is configured to execute a computer implemented method corresponding to algorithm 7 in the processor of the network connection device 306, as below:

Algorithm. 7:
Replaying Packets Attacks

```
if ICMPV6.code = DIO then
  if GlobalRoutingTable[Sender_index].NodeRank != DIO.rank then
    Update GlobalRoutingTable[Sender_index].NodeRank = DIO.rank
```

-continued

Algorithm. 7:
Replaying Packets Attacks

```
        Define replayID = false, replayRank = false
        if GlobalRoutingTable[Sender_index].NodeID ! = SenderID or
          GlobalRoutingTable[Sender_index].StoredNodeMAC ! = Sender MAC
then
          replayID = true
          for each Neighbor in
GlobalRoutingTable[Sender_index].NeighborMap do
            if Neighbor(NeighborRank) =
GlobalRoutingTable[Sender_index].NodeRank then
              replayRank = true
            end
          end
        end
        if replayID = false and replayRank = true and
          GlobalRoutingTable[Sender_index].Average_DIO_Interval <=
RPL_DIO_INTERVAL MIN then
          Mark SenderID as Copycat
        else
          if replayID = true and replayRank = true and
            GlobalRoutingTable[Sender_index].Average_DIO_Interval <=
RPL_DIO_INTERVAL_MIN then
            Mark SenderID as DIO suppression
        else
            if replayID = true and replayRank = true and
              GlobalRoutingTable[Sender_index].Average_DIO_Interval >=
RPL_DIO_INTERVAL_MIN then
              Mark SenderID as Neighbor
            end
          end
        end
      end
    else
      if ICMPV6. code = DAO then
        if GlobalRoutingTable[Sender_index].ParentID != ReceiverID or
          GlobalRoutingTable[Sender_index].NodeID ! = SenderID or
          GlobalRoutingTable[Sender_index].StoredNodeMAC ! = Sender MAC
then
          Mark SenderID as Route Table Falsification
        end
      end
    end
```

Figure 5E:
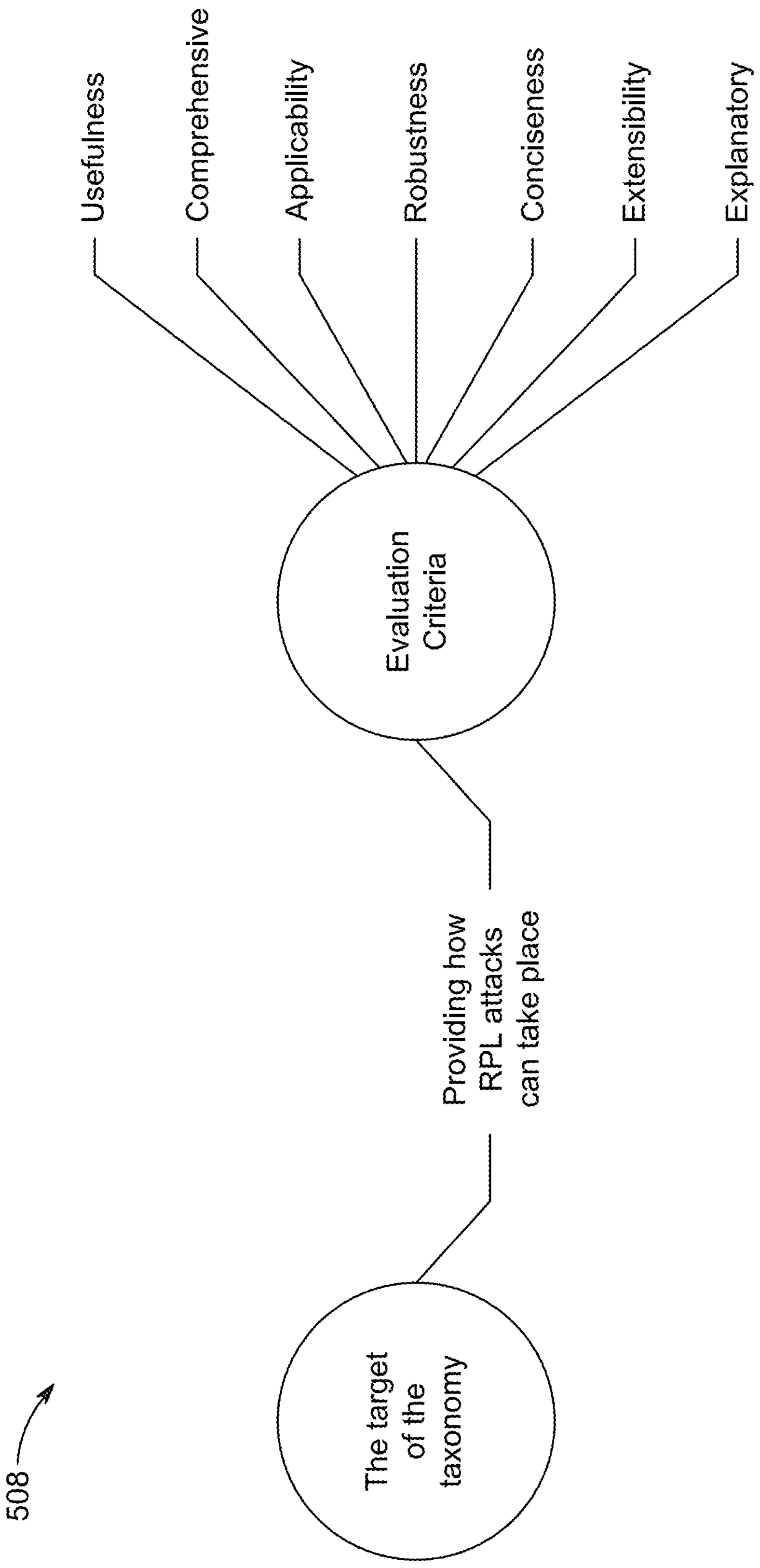
FIG. 5E illustrates a general layout for an evaluation criteria of the taxonomy of RPL attacks signature pattern in the data and control plane attacks, according to certain embodiments.

FIG. 5E illustrates a general layout 508 for an evaluation criteria of the taxonomy of RPL attacks signature pattern in the data and control plane attacks, according to an embodiment. The layout 508 introduces the RPL taxonomy stored in the memory 320 of the network connection device 308 (in FIG. 3) for data plane attack and the control plane attack that provide a classification of the possibly RPL attacks in a way that can be easily identified by only knowing how the attack is designed. As such, the RPL taxonomy focuses to classify RPL attacks based on one or more attacking mechanism that one or more attacker nodes may use to disrupt the network. The RPL taxonomy organizes attacks based on the affected fields of the IP packet as well as the type of performed operation on this field.

Referring back to FIG. 3 after having the preliminary exposure to the taxonomy to detect one or more attacker node using RPL attack signatures of the attacker node. Therefore, the taxonomy includes attack signature of all types of RPL attack as described in plurality of FIG. 5. The taxonomy is stored in the memory 320 of the network connection device 306. The network connection device 306 periodically receives ICMPv6 network packets from the IoT devices or the nodes 304 to passively monitor the network traffic due to each node 304 in the IoT network 302. The network connection device 306 forwards the ICMPv6 to the routing device 308. The routing device 308 inspects the ICMPv6 packet received from each node 304.

Figure 6:
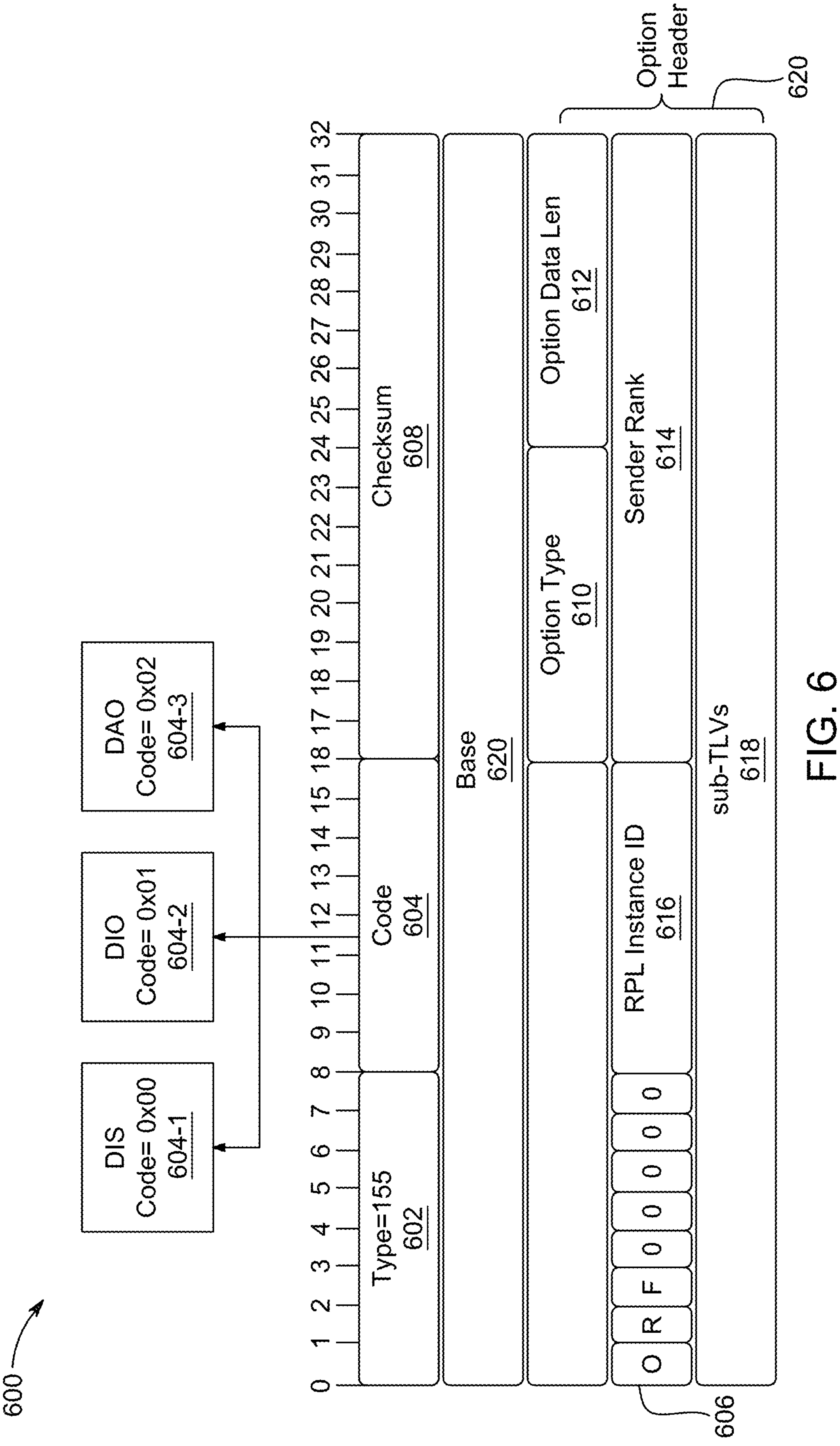
FIG. 6 illustrates an ICMPv6 packet, according to certain embodiments.

The ICMPv6 packet 600 is illustrated in FIG. 6 according to an embodiment. The ICMPv6 packet 600 includes one or more fields. One of the field is a Type field 602. The Type field 602 determines whether the ICMPv6 packet is an RPL packet or a non-RPL packet. When the type field 602 equals to value 155, it indicates that the ICMPv6 packet is an RPL packet. Another field is a code field 604. The code field 604 could be a DIS code 604-1, a DIO code 604-2, or a DAO code 604-3. Other fields includes checksum field 608, option type filed 610, option data Len field 612, Sender Rank field 614, RPL instance ID field 616, sub-TLVs field 618 and flag filed 606.

Accordingly, the routing device 308 inspects the ICMPv6 packet 600 received from each node 304 to identify which part of the ICMPv6 packet 600 of the ICMPv6 network packets 600 is misused in case any attacker node is present in the IoT network 302. This is done by matching the network traffic pattern to attack signatures stored in the taxonomy for each ICMPv6 packet 600 from each node 304. Each case is described now by considering a suitable example.

FIG. 7 illustrates an attack detection flowchart 700 using taxonomies of RPL data plane attacks and RPL control plane attacks, according to an embodiment. The flowchart 700 is implemented as a computer implemented method for matching a network traffic pattern to attack signatures to identify which part of the packet 600 of the ICMPv6 network packets 600 is misused. The method is performed in the processor or the routing device 308 of the network connection device 306 as described in FIG. 3. Also, the method 700 is described in conjugation with the data packet 600 in FIG. 6.

At step 702, the method 700 includes, identifying the type of ICMPv6 network packets 600. At this time, the routing device 308 monitors the type of the packet 600 by analyzing the type field 602. When the type field is not equal to 155, this confirms to the routing device 308 that the packet 600 is a non-RPL packet 600. This further confirms to the routing device 308 that the non-RPL packet needs to be inspected for data packet attack only. At this time, the method 700 proceeds to the step 704 to further identify whether the data packet attack belongs to the type of a dropping packets attack or whether the data packet attack belongs to a type of leaking packet attack. The type of data packet attack could be further examined by the routing device 308 in step 706 to identify if the data packet attack belongs to a dropping packet attack. Also, the type of data packet attack could be further examined by the routing device 308 in step 708 to identify if the data packet attack belongs to a leaking packet attacks. As such, if the packet 600 is the non-RPL packet, the routing device 308 checks for dropping and leaking packet attacks only. On the other side, when the type field is equal to 155, this confirms to the routing device 308 that the packet 600 is an IPV6 Routing Protocol for Low-Power and Lossy Networks (RPL) packet or an RPL packet 600. This further confirms the routing device 308 that the RPL packet 600 needs to be inspected for control packet attack only. At this time the method 700 proceeds to the step 710 to further identify the type of control packet attack. The type of control packet attack could be further examined by the routing device 308 in step 712 to identify if the control packet attack belongs to generating dropping packet attacks. Also, the type of control packet attack could be further examined by the routing device 308 in step 714 to identify if the control packet attack belongs to a Modifying packet attack. Also, the type of control packet attack could be further examined by the routing device 308 in step 716 to identify if the control packet attack belongs to a replying packet attack. As such, if the packet 600 is the RPL packet, the routing device 308 checks for generating, modifying, and replaying packet attacks only.

Example 1: Detection of Dropping Packet Attacks

Figure 7A:
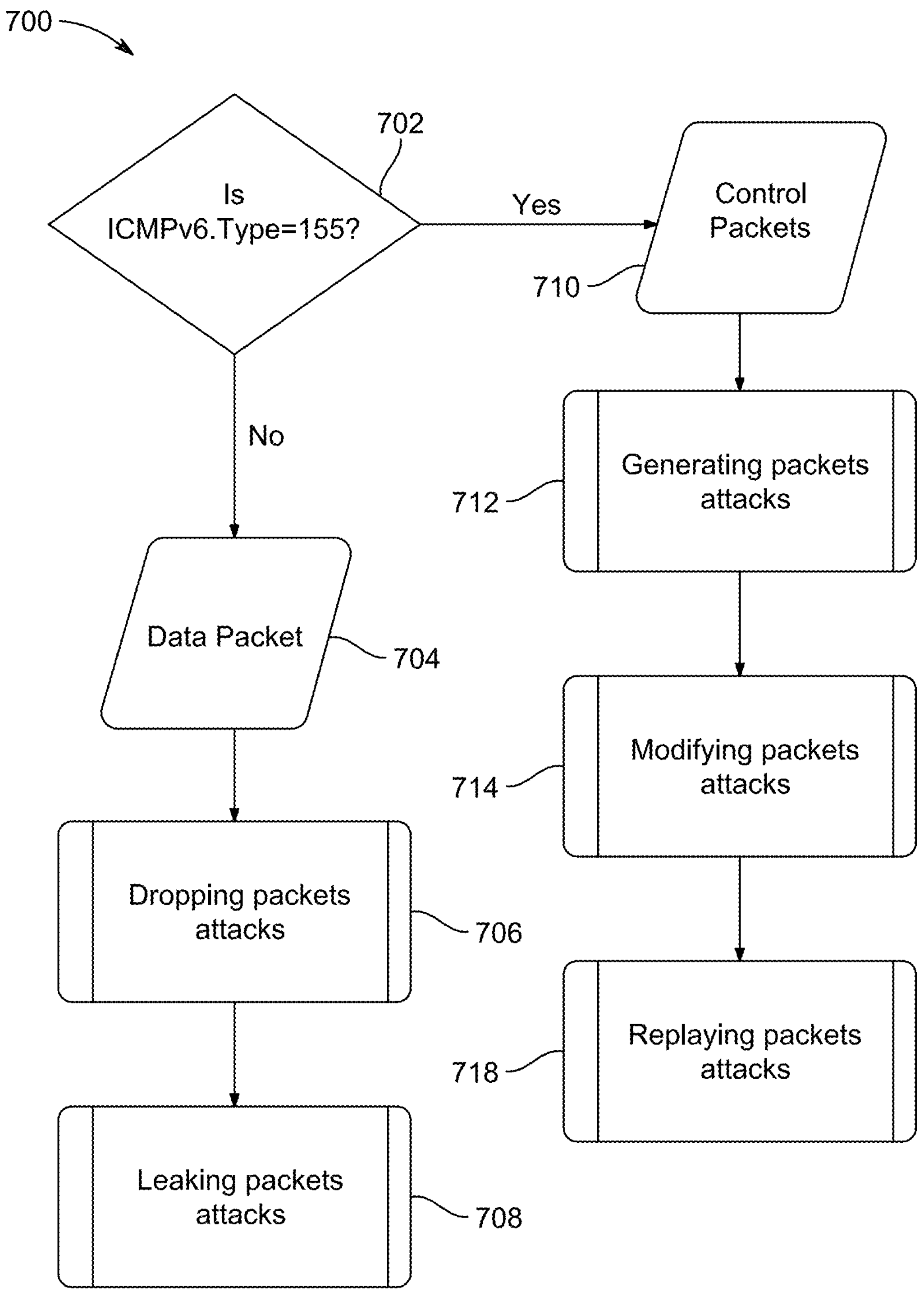
FIG. 7A illustrates an attack detection flowchart using taxonomies of RPL data plane attacks and RPL control plane attacks.

When detecting the modifying packet attack, referring to FIG. 7A.

At step 702, the method 700 includes, identifying the type of ICMPv6 network packets 600. At this time, the routing device 308 monitors the type of the packet 600 by analyzing the type field 602 from the sender node 304 to analyze the traffic pattern from the sender node 304. In the current case, the type field is not equal to 155. This confirms to the routing device 308 that the packet 600 is a non-RPL packet. This further confirms to the routing device 308 that the non-RPL packet needs to be inspected for data packet attack only. At this time the method 700 proceeds to the step 704 to further identify the type of data packet attack. The type of data packet attack could be either dropping packets attack or leaking packets attack. Since the Packet 600 is a non-RPL packet, the routing device 308 proceeds to check for dropping packets attack as in step 706. Now the routing device 308 is configured to match a network traffic pattern from the sender node 304 to attack signatures structured as the taxonomy in the memory 320 of the network connection device 306. Here the sender node 304 could be an attacker node trying to disrupt the IoT network 302 using dropping packets attack.

Figure 7B:
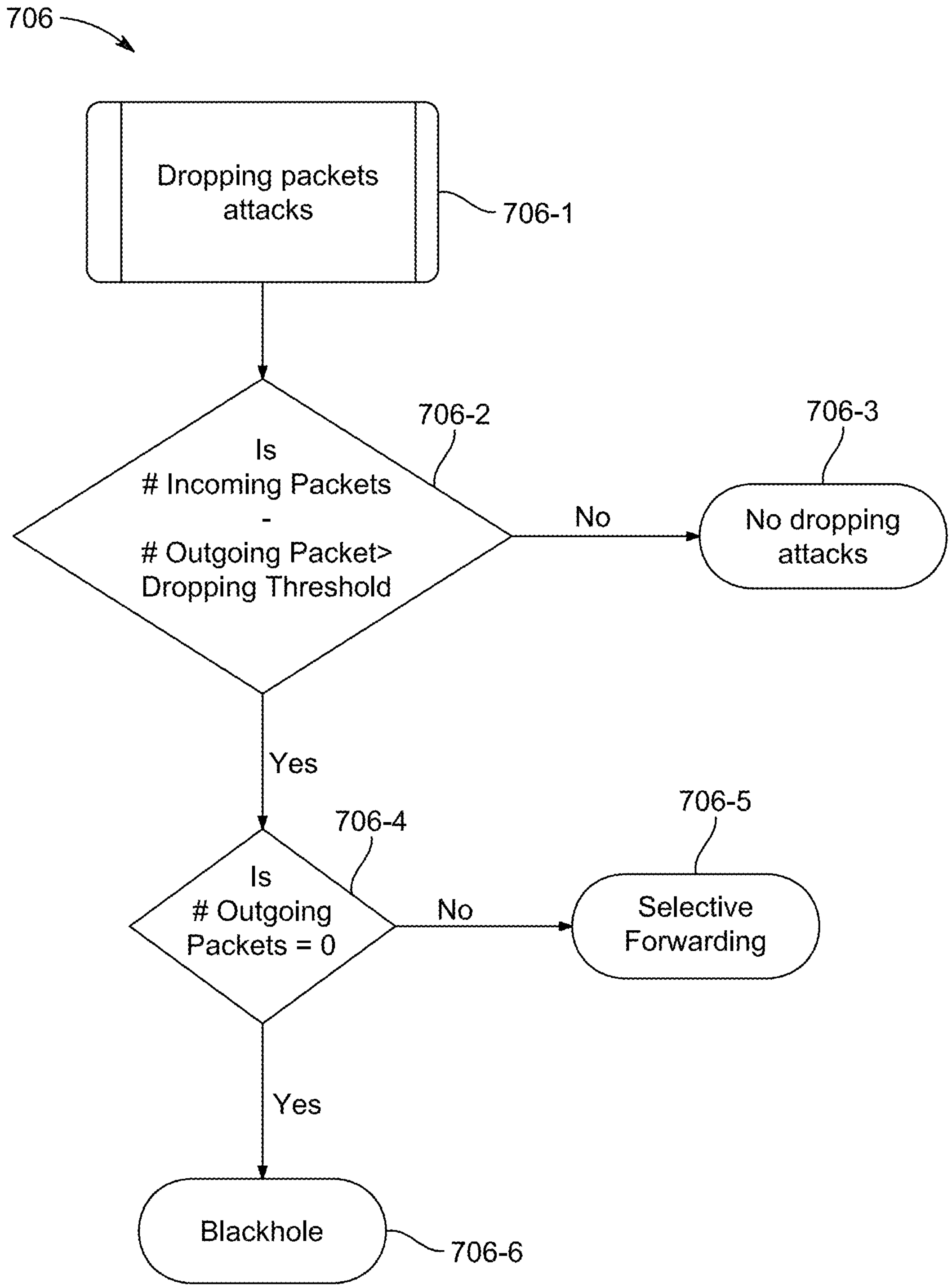
FIG. 7B illustrates an attack detection flowchart to detect dropping packets attacks, according to certain embodiments.

To match a network traffic pattern from the attacker node to attack signatures structured as the taxonomy in the memory 320 of the network connection device 306, the routing device 308 initially executes a computer implemented method for an attack detection flowchart 706 to detect one or more dropping packets attacks, according to an embodiment. The method for the dropping packets attacks detection flowchart 706 is illustrated in FIG. 7B. Also, the method 706 is described in conjugation with the data packet 600 in FIG. 6. An attack detection flowchart 706 including a method of detecting the dropping packets attacks is now described in detail in FIG. 7B. The dropping packets attacks could be a blackhole attack, a selective forwarding attack or combination thereof. Also, for data packets, the routing device 308 updates outgoing packets of the sender node 304. The routing device 308 than locates the receiver node 304 to update the incoming packets of receiver node 304.

FIG. 7B illustrates an attack detection flowchart 706 to detect dropping packet attacks, according to an embodiment. The attack detection flowchart 706 is described as a method 706. The method 706 now executes in the routing device 308. At step 706-1, the method 706 includes, executing algorithm 3 to identify one or more dropping packets attacks in the non-RPL packets 600.

Algorithm 3:
Dropping Packets Attacks

```
Data: DroppingThreshold
if GlobalRoutingTable[Receiver_Index].#IncomingPackets ÷
    GlobalRoutingTable[Receiver_Index].#OutgoingPackets >=
DroppingThreshold then
    if GlobalRoutingTable[Receiver_Index].#OutgoingPackets =
0
then
        Mark ReceiverID as Blackhole
    else
        Mark ReceiverID as SelectiveForwarder
    end
end
```

At step 706-2, the method 706 includes checking a difference between incoming packets with respect to outgoing packet from the sender node 304 or the receiver node 304. The routing device 308 determines the difference of incoming packets with respect to the outgoing packet at the sender node 304 or the receiver node 304. If the difference of incoming packets with respect to the outgoing packet is found to be above a predefined threshold by the routing device 308, the step 706-2 in the method 706 proceeds to step 706-4. Otherwise, if the difference of incoming packets with respect to the outgoing packet is found to be below the predefined threshold by the routing device 308, the step 706-2 in the method 706 proceeds to step 706-3. The predefined threshold is defined in the memory 320 of the network connection device 306. In another embodiment, the routing device 308 could also use a ratio of incoming packets to the outgoing packets.

At step 706-3, the method 706 includes notifying, by the routing device 308, absence of dropping packet attacks in the IoT network 302. In an embodiment, as an additional step in 706-2, if the routing device 308 identifies that there is a significant loss of packets above the dropping threshold, the method 706 proceeds to step 706-3 where the routing device 308 notifies presence of dropping attack by the attacker node. After step 706-3, the method 706 ends.

At step 706-4, the method 706 includes determining, by the routing device 308, whether the outgoing packets from the sender node 304 are zero or not. If the routing device 308, identifies that the number of outgoing packets is not zero but the ratio of incoming packets to the outgoing packets exceeds a dropping threshold, the step 706-4 in the method 706 proceeds to step 706-5. On the other side, if the routing device 308 identifies that the ratio of incoming packets to outgoing packets exceeds the dropping threshold and that the number of outgoing packets is zero, the step 706-4 in the method 706 proceeds to step 706-6. In an embodiment, the dropping threshold is defined in the memory 320 of the network connection device 306.

At step 706-5, the method 706 includes marking, by the routing device 308, the sender node 304 or the receiver node 304 as an attacker node that is launching a selective forwarding attack. Since, the sender node or the receiver node 304 seems to have forwarded only a selection of packets and dropped everything else. At this time, it is confirmed by the RPL signature of the sender or receiver node 304 that the sender or receiver node 304 appear to act like an attacker node. Therefore, the routing device 308 marks the sender or receiver node 304 as the attacker node 304 which is launching the selective forwarding attack which clearly matches or resembles the RPL attack signature for the selective forwarding attack stored in the taxonomy under the category of dropping packets attack. The routing device 308, at this time, indicates the presence of a selective forwarding attack in the IoT network 302 and invokes a solution as how to mitigate the selective forwarding attack by the attacker node. This indication can be provided by the output device. After the step 706-5, the method 706 stops.

At step 706-6, the method 706 includes marking, by the routing device 308, the sender node 304 or the receiver node 304 as an attacker node that is launching a blackhole attack. Since, the sender node or the receiver node 304 seems to have dropped all packets rather than sending or forwarding them to other nodes. At this time, it is confirmed by the RPL signature of the sender or the receiver node 304 that the sender or receiver node 304 appear to act like an attacker node. Therefore, the routing device 308 marks the sender or receiver node 304 as the attacker node 304 which is launching the blackhole attack which clearly matches or resembles the RPL attack signature for the blackhole attack stored in the taxonomy under the category of dropping packets attack. The routing device 308, at this time, indicates the presence of a blackhole attack in the IoT network 302 and invokes a solution as to how to mitigate the blackhole attack by the attacker node. This indication can be provided by the output device. After the step 706-6, the method 706 stops.

Example 2: Detection of Leaking Packet Attacks

A description of an example of detecting leaking packet attacks is made with reference to FIG. 7A.

At step 702, the method 700 includes, identifying the type of ICMPv6 network packets 600. At this time, the routing device 308 monitors the type of the packet 600 by analyzing the type field 602 from the sender node 304 to analyze the traffic pattern from the sender node 304. In the current case, the type field is not equal to 155. This confirms to the routing device 308 that the packet 600 is a non-RPL packet. This further confirms to the routing device 308 that the non-RPL packet needs to be inspected for data packet attack only. At this time, the method 700 proceeds to the step 704 to further identify the type of data packet attack. The type of data packet attack could be either dropping packets attack or leaking packets attack. Since the Packet 600 is a non-RPL packet, the routing device 308 proceeds to check for leaking packets attack as in step 708. Now the routing device 308 is configured to match a network traffic pattern from the sender node 304 to attack signatures structured as the taxonomy in the memory 320 of the network connection device 306. Here the sender node 304 could be an attacker node trying to disrupt the IoT network 302 using leaking packets attacks.

Figure 7C:
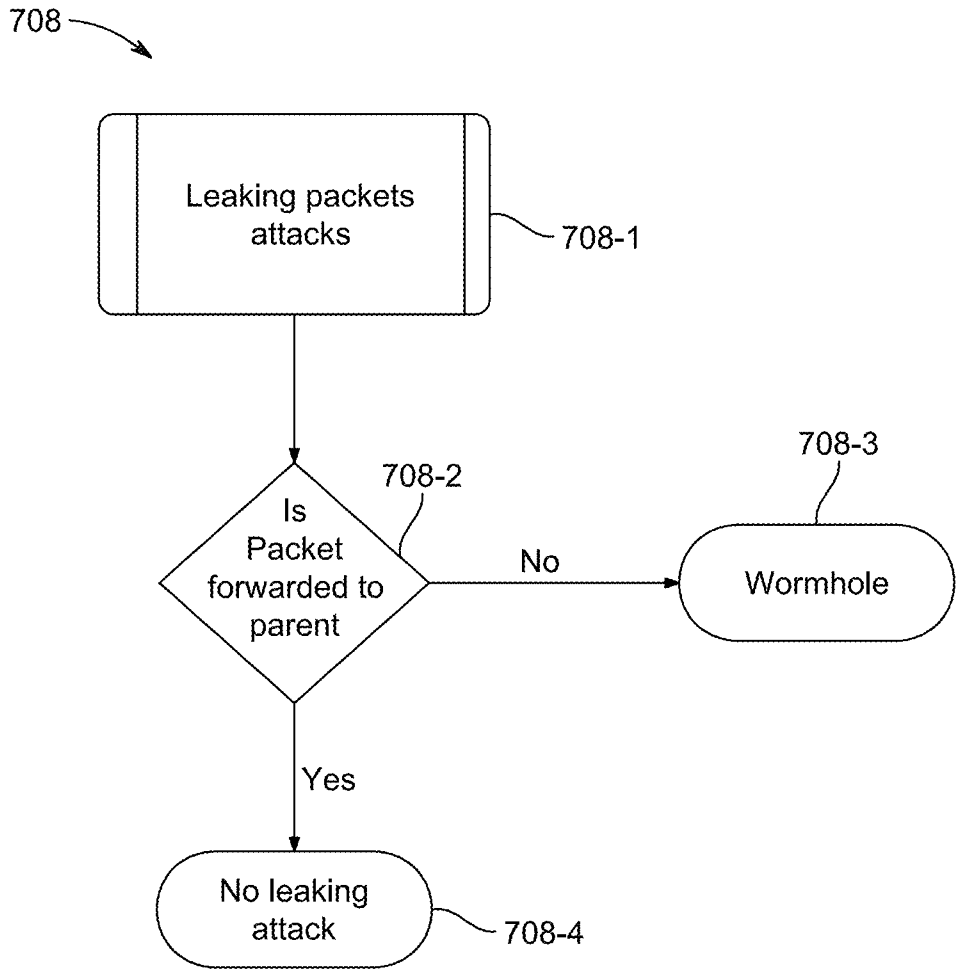
FIG. 7C illustrates an attack detection flowchart to detect leaking packets attacks, according to certain embodiments.

To match a network traffic pattern from the attacker node to attack signatures structured as the taxonomy in the memory 320 of the network connection device 306, the routing device 308 initially executes a computer implemented method for an attack detection flowchart 708 to detect one or more leaking packets attacks, according to an embodiment. The method for the leaking packet attack detection flowchart 708 is illustrated in FIG. 7C. Also, the method 708 is described in conjugation with the data packet 600 in FIG. 6. An attack detection flowchart 708 including a method of detecting the leaking packet attack is now described in detail in FIG. 7C. The leaking packet attack could be a wormhole attack.

FIG. 7C illustrates an attack detection flowchart 708 to detect leaking packets attacks, according to an embodiment. The attack detection flowchart 708 is described as a method 708. The method 708 now executes in the routing device 308. At step 708-1, the method 708 includes, executing algorithm 4 to identify leaking packet attacks in the non-RPL packets 600.

Algorithm 4:
Leaking Packets Attacks

```
if GlobalRoutingTable[Sender_Index].ParentID != ReceiverID
then
    Mark SenderID as Wormhole
end
```

At step 708-2, the method 708 includes checking, by the routing device 308, if the data packet is forwarded to a node that is not a parent node 304. At this time, the routing device 308 checks the entry of the sender node 316 in the global routing table and identifies whether the address of the receiving legitimate node 304 is not the parent address of the sender node 304. If the routing device 308 identifies that the data packet is forwarded to the node that is not a parent node 304, the method 708 proceeds to step 708-3. On the other side, if the routing device 308 identifies that the data packet is forwarded to the node that is indeed the parent node 304, the method 708 proceeds to step 708-4.

At step 708-3, the method 706 includes marking, by the routing device 308, the sender node 304 as an attacker node that is launching a wormhole. Since, the sender node seems to have collaborated with one or more suspicious node to exploit the traffic from a specific part of the DODAG to another part of the DODAG and vice versa, within the IoT network 302. At this time, it is confirmed by the RPL signature of the sender node 304 that the sender node 304 appears to act like an attacker node. Therefore, the routing device 308 marks the sender node 304 as the attacker node which is launching the wormhole attack which clearly matches or resembles the RPL attack signature for the wormhole attack stored in the taxonomy under the category of leaking packets attack. The routing device 308 at this time indicates the presence of wormhole attack in the IoT network 302 and invokes a solution as to how to mitigate the wormhole attack by the attacker node. This indication can be provided by the output device. After the step 708-3, the method 708 stops.

On the other hand, at step 708-4, the method 706 includes notifying, by the routing device 308, the absence of leaking packet attacks in the IoT network 302. After the step 708-4, the method 708 stops.

Example 3: Detection of Generating Packet Attacks

A description of an example of detecting the Generating packet attacks makes reference to FIG. 7A.

At step 702, the method 700 includes, identifying the type of ICMPv6 network packets 600. At this time, the routing device 308 analyzes the type field 602 from the sender node 304 to analyze the traffic pattern in the IoT network 302. In the current case, the type field is equal to 155. This confirms to the routing device 308 that the packet 600 is an RPL packet. This further confirms to the routing device 308 that the RPL packet needs to be inspected for control packet attack only. At this time, the method 700 proceeds to the step 710 to further identify the type of the control packet attack. The type of control packet attack could be either generating packet attack, modifying packet attack, or replying packet attack. Since the Packet 600 is an RPL packet, the routing device 308 proceeds to checks for generating packet attack.

Figure 7D:
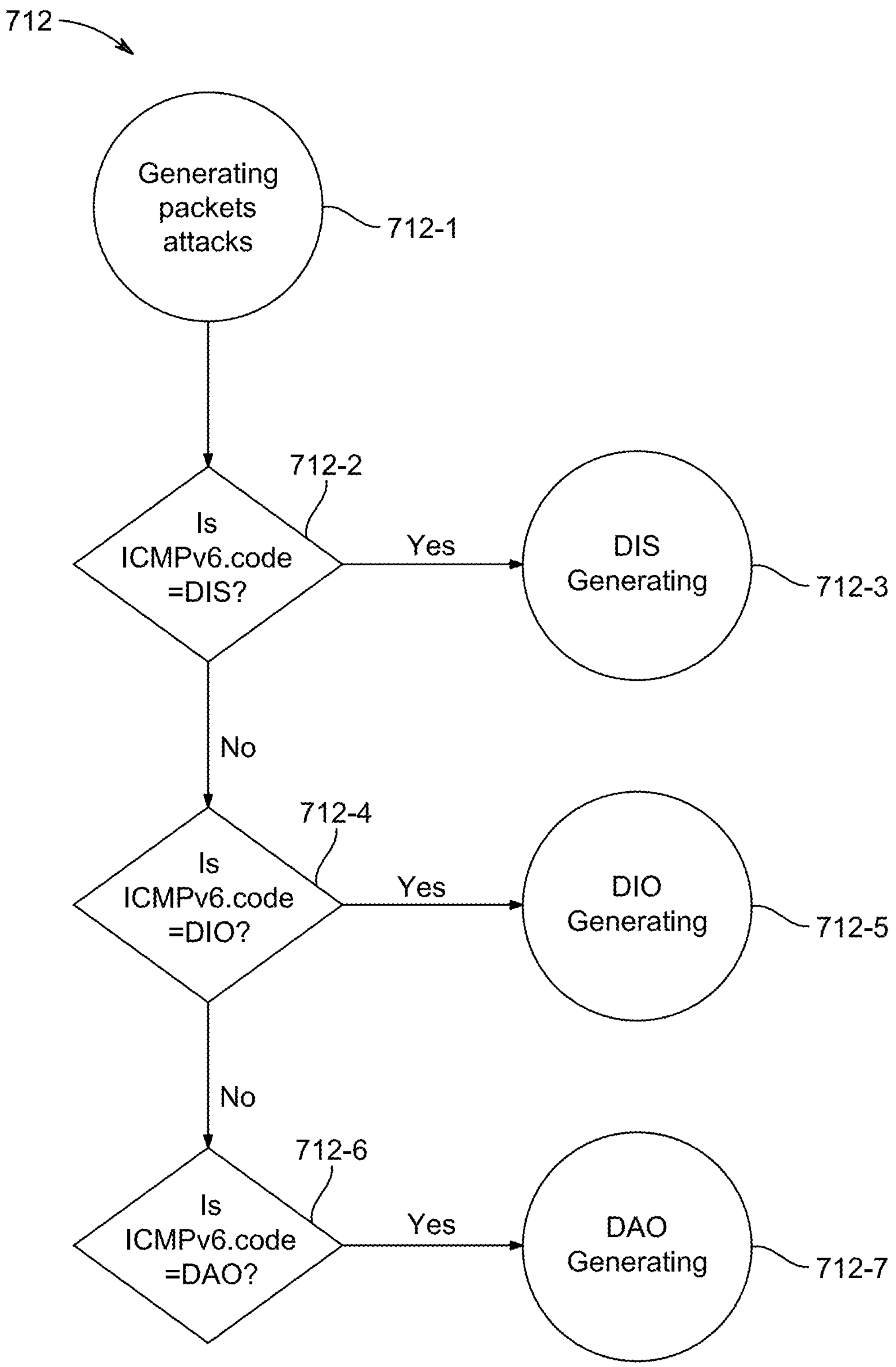
FIG. 7D illustrates an attack detection flowchart to detect plurality of generating packets attacks, according to certain embodiments.

To match a network traffic pattern from the sender node 304 to attack signatures structured as the taxonomy in the memory 320 of the network connection device 306, the routing device 308 initially executes a computer implemented method for an attack detection flowchart 712 to detect one or more generating packet attacks, according to an embodiment. The method for the Generating packet attack detection flowchart 712 is illustrated in FIG. 7D. Also, the method 714 is described in conjugation with the data packet 600 in FIG. 6. An attack detection flowchart 714 including a method of detecting the generating packet attack is now described in detail in FIG. 7D. The Generating packet attacks could be a Clone ID attack, Sybil attack, DIS flooding attack, Hello Flood attack, DAO insider attack or combination thereof.

FIG. 7D illustrates an attack detection flowchart 712 to detect generating packet attacks, according to an embodiment. The generating packet attack detection flowchart 712 is described as a method 712. The method 718 now executes in the routing device 308. At step 718-1, the method 718 includes, executing Algorithm 5 to identify replying packets attack in the RPL packets 600.

Algorithm 5:
Generating Packets Attacks

```
Data: RPL_DIS_INTERVAL, RPL_DIO_INTERVAL_MIN, Maximum_DAO_per_child
  if ICMPV6.Code = DIS then
    if GlobalRoutingTable[Sender_Index].NodeID != SenderID or
      GlobalRoutingTable[Sender_Index].StoredNodeMAC != Sender MAC
then
        Define DIS_ID_Index; DIS_MAC_Index = −1
        DIS_ID_Index = find (NodeID = SenderID) in
GlobalRoutingTable
        DIS_MAC_Index = find (StoredNodeMAC = Sender_MAC) in
GlobalRoutingTable
        if GlobalRoutingTable[DIS_ID_Index].NodeMAC != Sender_MAC
address then
          Mark SenderID as Clone-ID
        else
          if GlobalRoutingTable[DIS_MAC_Index].NodeID ! = SenderID
then
            Mark SenderID as Sybil
          end
        end
    else
      if GlobalRoutingTable[Sender_Index].Average_DIS_Interval <=
RPL_DIS_INTERVAL then
        Mark SenderID as DIS Flooding
      end
    end
  else
    if ICMPV6.Code = DIO then
      if GlobalRoutingTable[Sender_Index].Average_DIO_Interval <=
RPL_DIO_INTERVAL_MIN then
        Mark SenderID as Hello Flood
      end
    else
      if ICMPV6.Code = DAO then
        if GlobalRoutingTable[Sender_Index].#DAO >=
Maximum_DAO_per_child then
          Mark SenderID as DAO Insider
        end
      end
    end
  end
```

At step 712-2, the method 712 includes, checking a code field 604 of the packet 600 of the plurality of ICMPv6 network packets 600. The code field 604 is checked to determine the type of the control packet 600. If, the routing device 308 identifies that the code filed 604 matches with 0x00, the method 712 proceeds to step 712-3, otherwise the method 712 proceeds to step 712-4.

At step 712-3, the routing device 308 identifies that the received RPL packet is a DIS packet and the DIS packet/RPL packet needs to be inspected for DIS generating attacks only. The step 712-3 in method 712 proceeds to 712-3-1 (in FIG. 7E) for identifying one or more DIS generating attacks.

Otherwise, at step 712-4, the method 712 includes, checking a code field 604 of the packet 600 of the plurality of ICMPv6 network packets 600. If, the routing device 308 identifies that the code filed 604 matches with 0x01, the method 712 proceeds to step 712-5, otherwise the method 712 proceeds to step 712-6.

At step 712-5, the routing device 308 identifies that the received RPL packet is a DIO packet and the DIO packet/RPL packet needs to be inspected for DIO generating attacks only. The step 712-5 in method 712 proceeds to 712-5-1 (in FIG. 7F) for identifying one or more DIO generating attacks.

Otherwise, at step 712-6, the method 712 includes, checking a code field 604 of the packet 600 of the plurality of ICMPv6 network packets 600. If, the routing device 308 identifies that the code filed 604 matches with 0x02, the method 712 proceeds to step 712-7, otherwise the method 712 stops.

At step 712-7, the routing device 308 identifies that the received RPL packet is a DAO packet and the DAO packet/RPL packet needs to be inspected for DAO generating attacks only. The step 712-7 in method 712 proceeds to 712-7-1 (in FIG. 7G) for identifying one or more DIO generating attacks.

DIS Generating Attacks

Figure 7E:
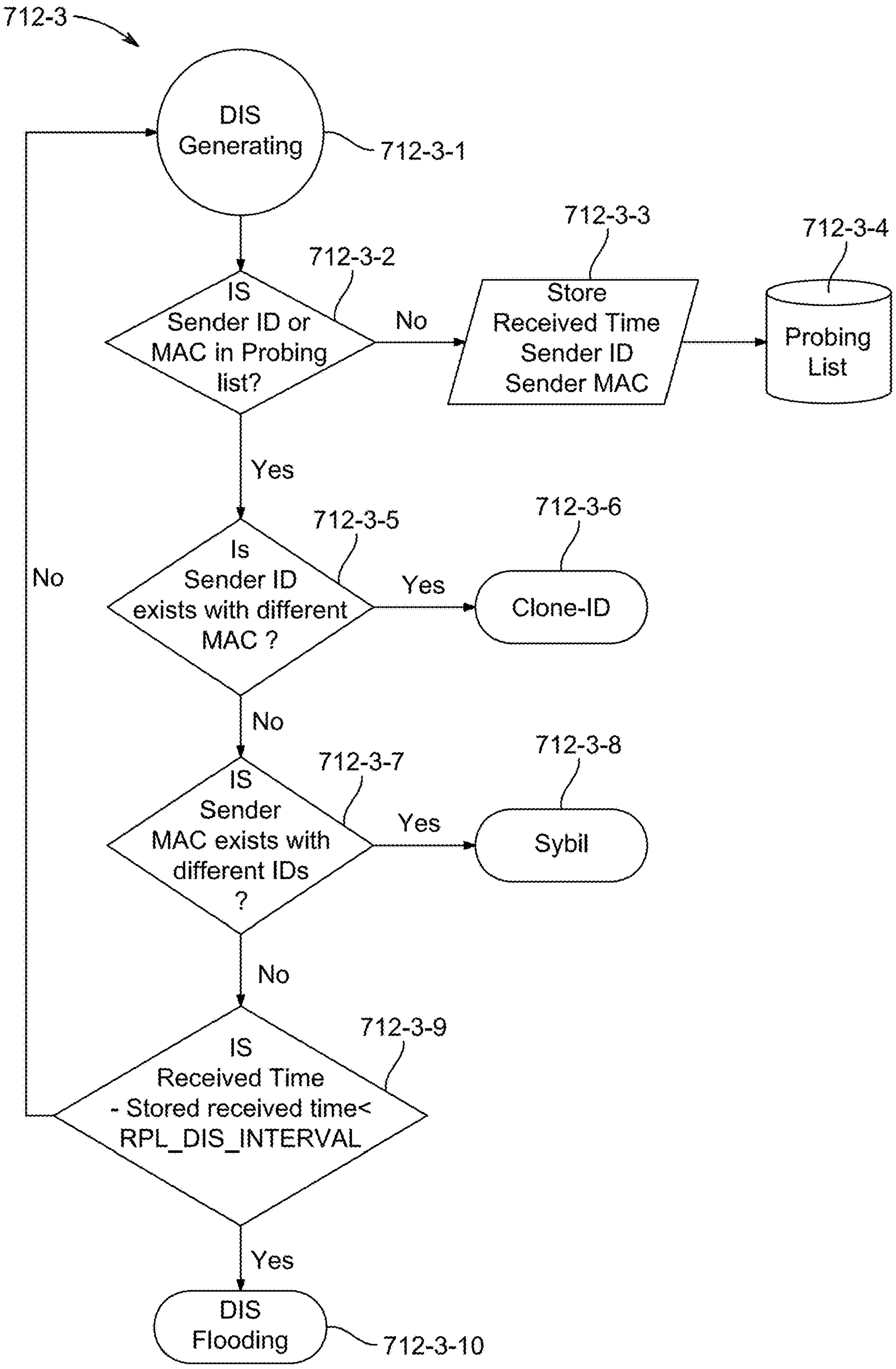
FIG. 7E illustrates an attack detection flowchart to detect DIS generating attacks based generating packets attacks, according to certain embodiments.

FIG. 7E illustrates an attack detection flowchart 712-3 to detect DIS generating attacks 712-3 based generating packets attacks, according to an embodiment.

At step 712-3-1, the method 712-3 includes initializing detection of DIS generating attack.

At step 712-3-2, the method 712-3 includes, checking whether an ID or MAC of a sender node 304 is previously stored in the global routing table, also known as a probing list, as already stored in the memory 320, as the type filed indicates that the sender node 304 sends DIS message. At this time, the routing device 308 match the ID and MAC address of the node 304 as stored in the global routing table. If the routing device 308 identifies that the ID or MAC of the sender node 304 is previously stored in the global routing table, the method 712-3 proceeds to step 713-3-3. On the other hand, if the routing device 308 identifies that the ID or MAC of the sender node 304 is previously not stored in the global routing table, the method 712-3 proceeds to step 713-3-5.

At step 712-3-3, the method 712-3 includes storing, by the routing device 308, the received time, sender ID and the sender node MAC address in the global routing table. At step 712-3-3 the method 712-3 further proceeds to step 712-3-4 to update the probing list or the global routing table. After the step 712-3-4, the method 712-3 stops.

On the other hand, if the routing device 308 identifies that the ID or MAC of the sender node 304 is previously not stored in the global routing table, this indicates a possibility of an attack. Therefore, at step 712-3-5 the method 712-3 includes checking, by the routing device 308, if the DIS sender ID exists in the global routing table but with a different MAC address. If the routing device 308 identifies that the DIS sender ID exists in the global routing table but with a different MAC address, the step 712-3-5 in method 712-3 proceeds to step 7123-6. On the other hand, if the routing device 308 identifies that the DIS sender ID exist in the global routing table with same MAC address, the step 712-3-5 in method 712-3 proceeds to step 7123-7.

At step 712-3-6, thee method 712-3 includes, marking the sender node 304 as an attacker node that is launching a Clone-ID attack which clearly matches or resembles the RPL attack signature for the Clone-ID attack stored in the taxonomy under the category of generating packet attacks. The routing device 308 at this time indicates the presence of the Clone-ID attack in the IoT network 302 and invokes a solution as how to mitigate the Clone-ID attack by the attacker node 304. This indication can be provided by the output device. After the step 712-3-6, the method 712-3 stop.

At step 712-3-7, the method includes identifying, by the routing device 308, if the MAC address of the sender node was previously stored with another ID in the global routing table or not. If the routing device 308 identifies that the MAC address of the sender node was previously stored with another ID in the global routing table, the step 712-3-7 in the method 712-3 proceeds to step 712-3-8. On the other hand, if the routing device 308 identifies that the MAC address of the sender node was previously not stored with another ID in the global routing table, the step 712-3-7 in the method 712-3 proceeds to step 712-3-9.

At step 712-3-8, the method includes, marking the sender node 304 as an attacker node that is launching a Sybil attack. Since, the sender node 304 seems to have multicast many redundant DIS messages with different fake identities which is forcing other legitimate nodes to reset their trickle algorithm. At this time, it is confirmed by the RPL signature of the sender node 304 that the sender node 304 appear to act like an attacker node. Therefore, the routing device 308 marks the sender node 304 as the attacker node which is launching the Sybil attack which clearly matches or resembles the RPL attack signature for the Sybil attack as stored in the taxonomy under the category of Generating packet attacks. The routing device 308 at this time indicates the presence of Sybil attack in the IoT network 302 and invokes a solution as how to mitigate the Sybil attack by the attacker node. This indication can be provided by the output device. After the step 708-3-8, the method 712-3 stops.

At step 712-3-9, the method 712-3 includes, checking, by the routing device 308, if the sender node 304 keeps sending DIS messages within short time periods less than a predefined RPL_DIS_INTERVAL. The average DIS interval is predefined in the memory 320 of the network connection device 306. If the routing device 308 identifies that the sender node 304 keeps sending DIS messages within short time periods less than a predefined RPL_DIS_INTERVAL, the step 712-3-9 in the method 712-3 proceeds to 712-3-10. Otherwise, if the routing device 308 identifies that the sender node 304 does not send the DIS messages within short time periods less than a predefined RPL_DIS_INTERVAL, the step 712-3-9 in the method 712-3 loops back to step 712-3-1 by simultaneously indicating the absence of any attack in the IoT network 302.

At step 712-3-10, the method includes, marking the sender node 304 as an attacker node that is launching a DIS flooding attack. Since, the sender node 304 seems to have flooded its neighbor nodes by either broadcasting DIS messages in order to reset trickle timer of neighbor nodes 304 or unicasted DIS messages to a specific neighbor node which has to reply with a DIO message. At this time, it is confirmed by the RPL signature of the sender node 304 that the sender node 304 appear to act like an attacker node. Therefore, the routing device 308 marks the sender node 304 as the attacker node which is launching the DIS flooding attack which clearly matches or resembles the RPL attack signature for the DIS flooding attack as stored in the taxonomy under the category of Generating packet attacks.

The routing device 308 at this time indicates the presence of DIS flooding attack in the IoT network 302 and invokes a solution as how to mitigate the DIS flooding attack by the attacker node. This indication can be provided by the output device. After the step 708-3-10, the method 712-3 stops.

DIO Generating Attacks

Figure 7F:
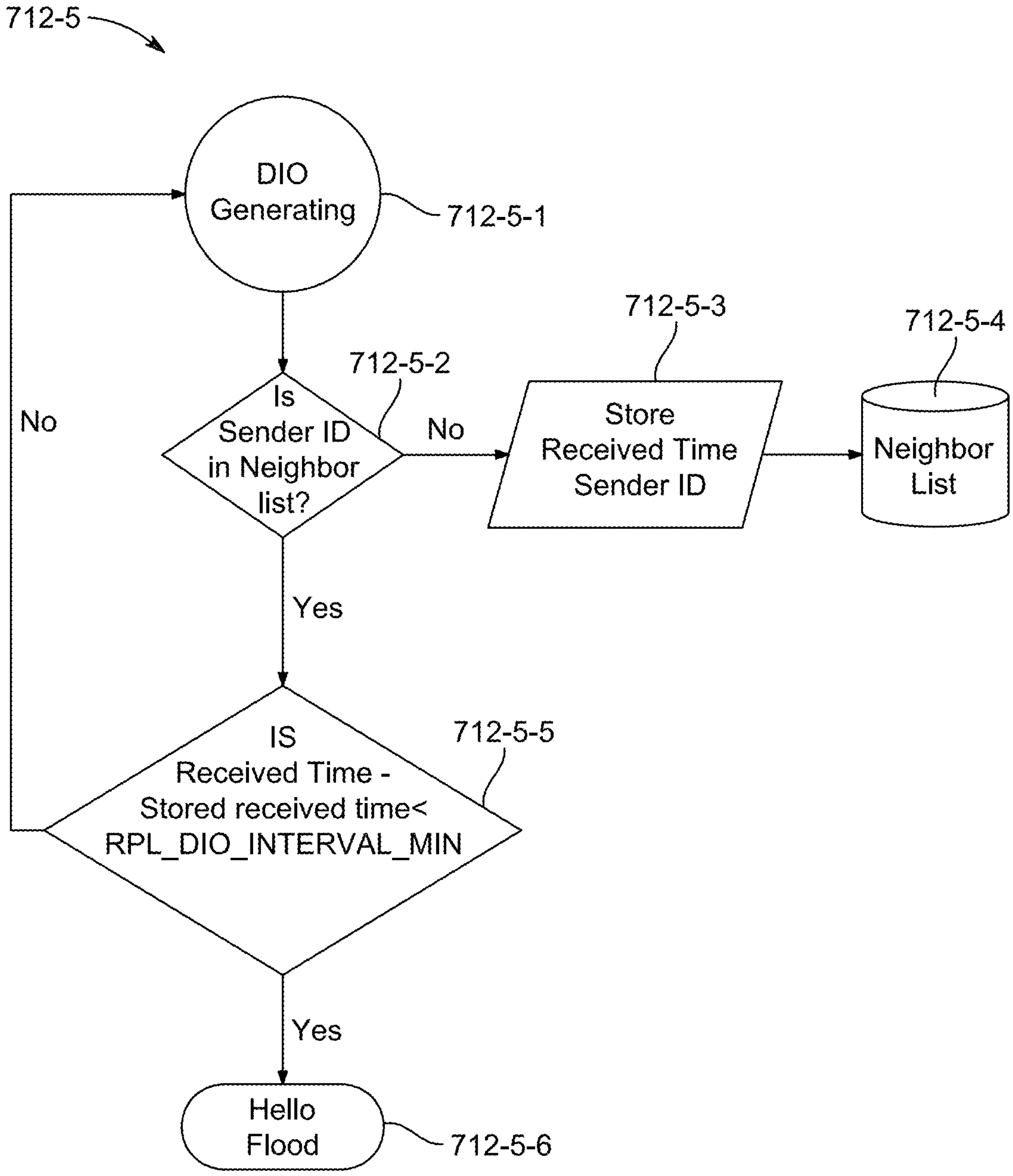
FIG. 7F illustrates an attack detection flowchart to detect DIO generating attacks based generating packets attacks, according to certain embodiments.

FIG. 7F illustrates an attack detection flowchart 712-5 to detect DIO generating attacks 712-5 based generating packets attacks, according to an embodiment.

At step 712-5-1, the method 712-3 includes initializing detection of DIO generating attack. At this step 712-5-1, the routing device 308 stores a list of Neighbor node 304 for each node 304 to store a sender ID and a receiving time. The method further proceeds to step 712-5-2.

At step 712-5-2, the method 712-5 includes, checking, by the routing device 308, if the ID of the sender node 304 is previously stored when the sender node 304 sends DIO message. If the routing device 308 identifies that the ID of the sender node 304 is previously stored when the sender node 304 sends DIO message, the step 712-5-2 in the method 712-5 proceeds to step 712-5-3. Otherwise, if the routing device 308 identifies that the ID of the sender node 304 is not previously stored when the sender node 304 sends DIO message, the step 712-5-2 in the method 712-5 proceeds to step 712-5-5.

At step 712-5-3, the method 712-5 includes storing the received time and sender ID in the global routing table. The step 712-5-3 in the method 712-5 further proceeds towards the step 712-5-4 for storing the sender ID in the neighbor list. After the step 712-5-4, the method 712-5 stops.

At step, 712-5-5, the method 712-5 includes checking a time difference between a received time and a stored time, when the sender ID exists in the neighbor list. At this step 712-5-5, the routing device 308 checks the time difference between the received time and the stored time. If the routing device 308 identifies, after checking the time difference, that the time difference is smaller than a predefined RPL_DIO_INTERVAL_MIN time stored in the memory 320 of the network monitoring device 306, the step 712-5-5 in the method 712-5 proceeds to step 712-5-6. Otherwise, the step 712-5-5 in the method 712-5 loops back to step 712-5-1 by simultaneously indicating the absence of any attack in the IoT network 302.

At step 712-5-6, the method 712-5 includes marking, by the routing device 308, the sender node 304 as an attacker node that is launching a Hello flood attack. Since, the sender node 304 seems to have frequently sent a DIO message using strong routing metrics or a strong signal where DIO message is the "HELLO" message sent by the root node 304. At this time, it is confirmed by the RPL signature of the sender node 304 that the sender node 304 appears to act like an attacker node. Therefore, the routing device 308 marks the sender node 304 as the attacker node which is launching the Hello flood attack which clearly matches or resembles the RPL attack signature for the Hello flood attack as stored in the taxonomy under the category of Generating packet attacks. The routing device 308 at this time indicates the presence of Hello flooding attack in the IoT network 302 and invokes a solution as how to mitigate the Hello flood attack by the attacker node. This indication can be provided by the output device. After the step 712-5-6, the method 712-5 stops.

DAO Generating Attacks

Figure 7G:
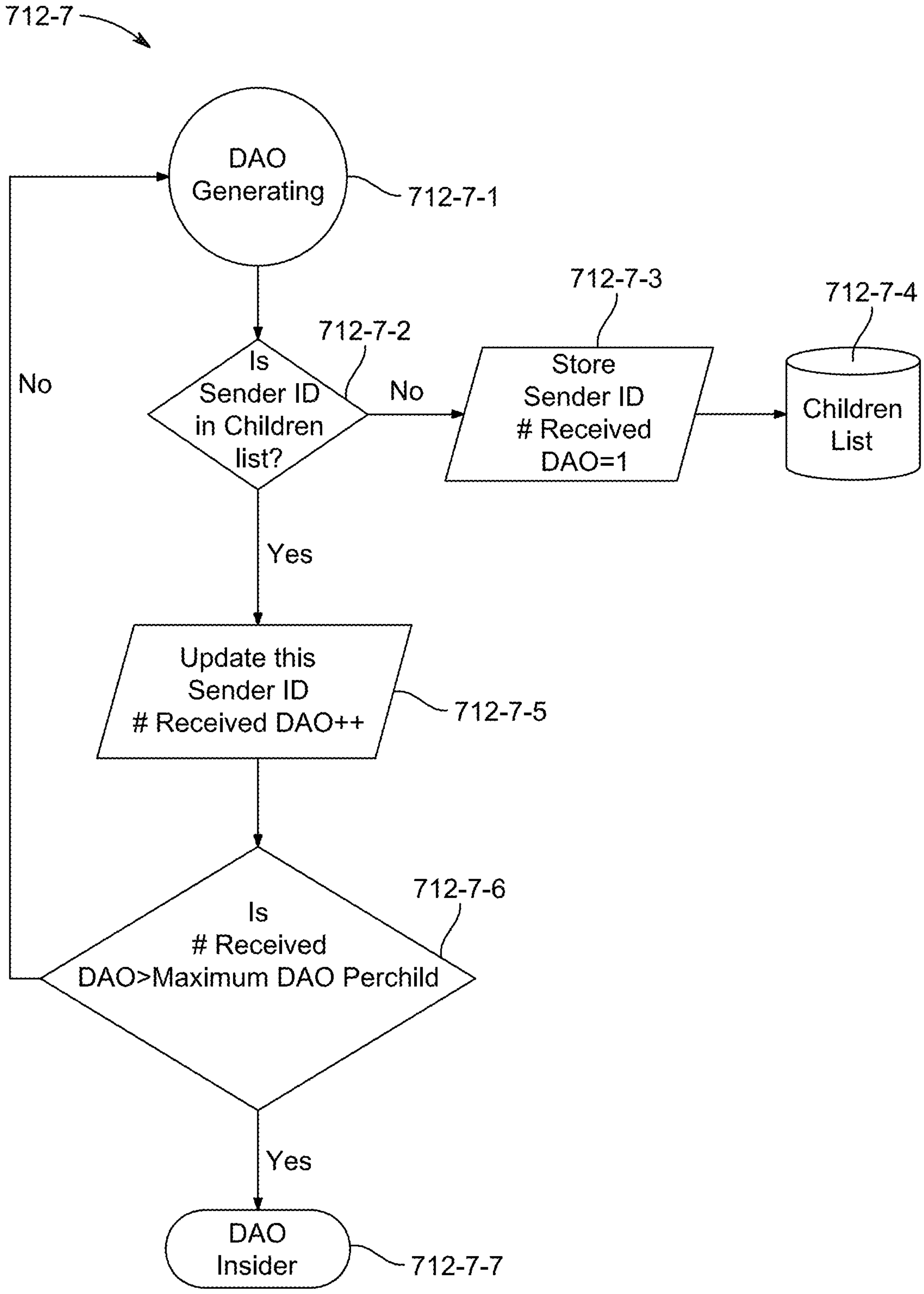
FIG. 7G illustrates an attack detection flowchart to detect DAO generating attacks based generating packets attacks, according to certain embodiments.

FIG. 7G illustrates an attack detection flowchart 712-7 to detect DAO generating attacks 712-7 based generating packets attacks, according to an embodiment.

At step 712-7-1, the method 712-7 includes initializing detection of DAO generating attack. At this step 712-7-1, the routing device 308 create a list of children nodes 304 for each node 304 to store a sender ID and a number of received DAO messages.

At step 712-7-2, the method 712-7 includes checking, by the routing device 308, whether the sender ID is previously stored, when a node 304 sends DAO message or not. If the routing device 308 identifies that the sender ID was not previously stored when the node 304 sends DAO message, the step 712-7-2 in the method 712-7 proceeds to step 712-7-3 where the routing device 308 stores the sender ID and the receiver DAO value=1 and updates the list of children list in the global routing table at step 712-7-4. After the step 712-7-4, the method 712-7 stops. On the other side, if the routing device 308 identifies that the sender ID was indeed previously stored when the node 304 sends DAO message, the step 712-7-2 in the method 712-7 proceeds to step 712-7-5.

At step 712-7-5, the method 712-7 include updating, by the routing device 308, the total number of received DAO messages from the sender node 304 when the ID of the sender node 304 exists in the children node list. After this step 712-7-5, the method 712-7 proceeds to step 712-7-6.

At step 712-7-6, the method 712-7 includes, identifying, by the routing device 308, if the number of received DAO messages from the sender node 304 exceeds a predetermined maximum DAO messages per child or not. If the routing device 308 identifies that the sender node 304 frequently sends DAO messages that exceed the predetermined maximum DAO messages per child node 304, it provides an indication of a possible attack. At this time, the step 712-7-6 in the method 712-7-6 proceeds to step 712-7-7. Otherwise, if the routing device 308 identifies that the sender node 304 does not frequently send DAO messages and which is below the predetermined maximum DAO messages per child node 304, it provides no indication of any attack in the IoT network 302 and the method 712-7 loops beck to step 712-7-1 by simultaneously indicating the absence of any attack in the IoT network 302.

At step 712-7-7, the method 712-7 includes marking, by the routing device 308, the sender node 304 as an attacker node that is launching a DAO insider attack. Since, the sender node 304 seems to have frequently sent DAO messages to its parent nodes 304 to force ancestor nodes 304 to flood the network with DAO messages. At this time, it is confirmed by the RPL signature of the sender node 304 that the sender node 304 appears to act like an attacker node. Therefore, the routing device 308 marks the sender node 304 as the attacker node which is launching the DAO insider attack which clearly matches or resembles the RPL attack signature for the DAO insider attack as stored in the taxonomy under the category of Generating packet attacks. The routing device 308 at this time indicates the presence of DAO insider attack in the IoT network 302 and invokes a solution as how to mitigate the DAO insider attack by the attacker node. This indication can be provided by the output device. After the step 712-7-7, the method 712-7 stops.

Example 4: Detection of Modifying Packet Attacks

When detecting the modifying packet attack, referring to FIG. 7A.

At step 702, the method 700 includes, identifying the type of ICMPv6 network packets 600. At this time, the routing device 308 analyzes the type field 602 from the sender node 304 to analyse the traffic pattern in the IoT network 302. In the current case, the type field is equal to 155. This confirms the routing device 308 that the packet 600 is an RPL packet. This further confirms the routing device 308 that the RPL packet needs to be inspected for control packet attack only. At this time the method 700 proceeds to the step 710 to further identify the type of the control packet attack. The type of control packet attack could be either generating packet attack, modifying packet attack, or replying packet attack. Since the Packet 600 is an RPL packet, the routing device 308 proceeds to check for modifying packet attack as in step 714. Now the routing device 308 is configured to match a network traffic pattern from the sender node 304 to attack signatures structured as the taxonomy in the memory 320 of the network connection device 306. Here the sender node 304 could be an attacker node trying to disrupt the IoT network 302 using modifying packet attack.

Figure 7H:
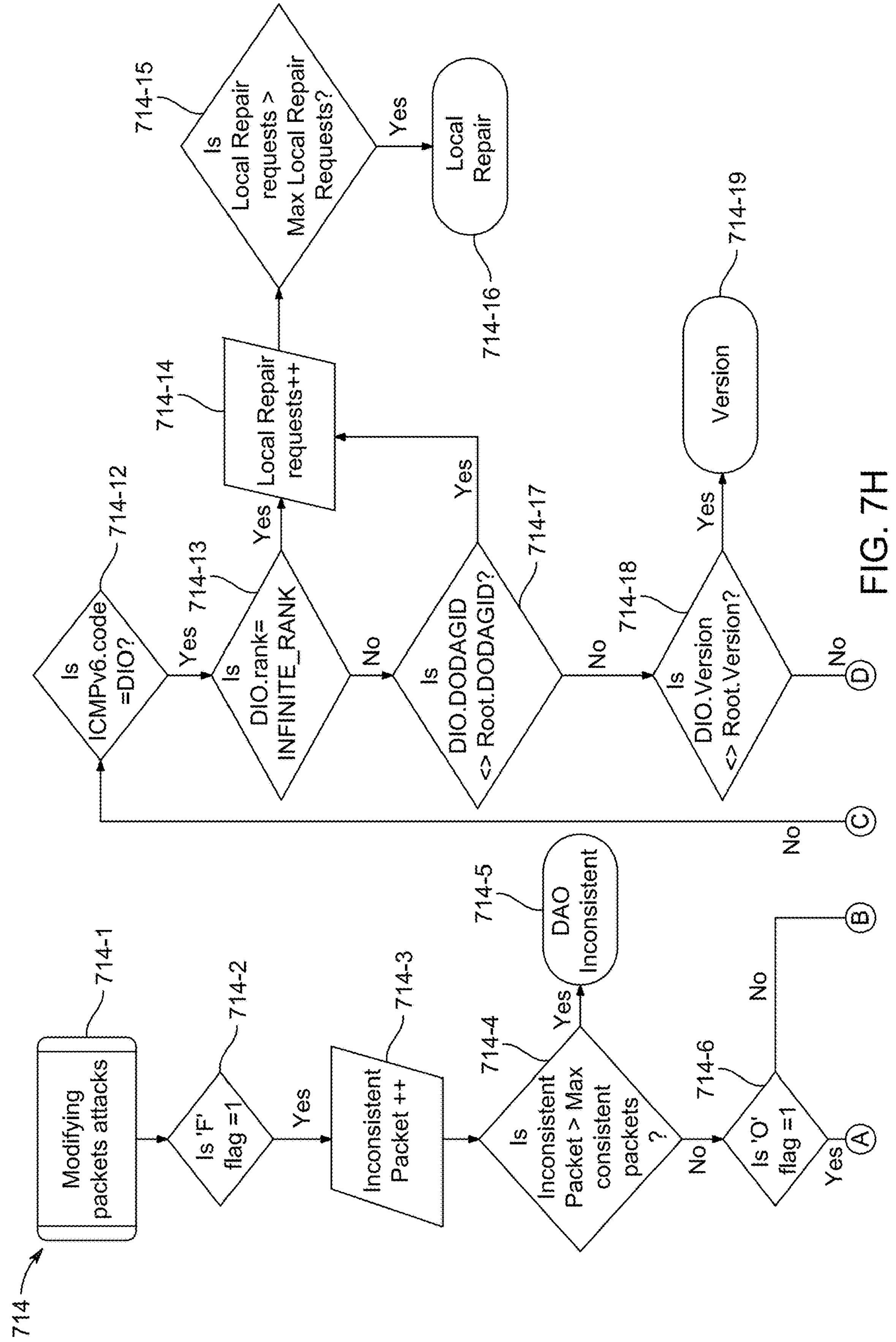
FIG. 7H illustrates an attack detection flowchart to detect modifying packet attacks, according to certain embodiments.
Figure 7H:
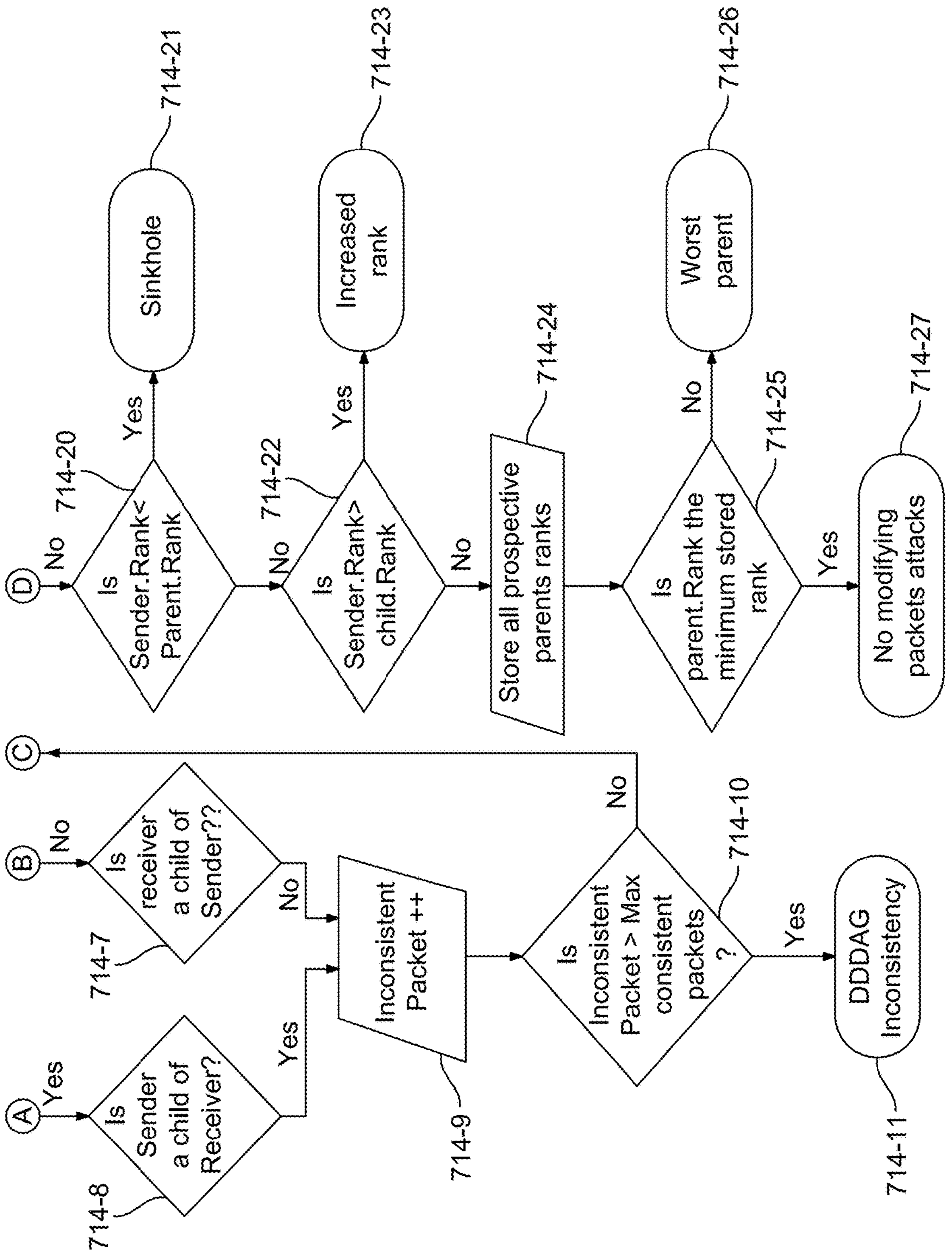

To match a network traffic pattern from the sender node 304 to attack signatures structured as the taxonomy in the memory 320 of the network connection device 306, the routing device 308 initially executes a computer implemented method for an attack detection flowchart 714 to detect one or more modifying packet attack, according to an embodiment. The method for the modifying packer attack detection flowchart 714 is illustrated in FIG. 7H. Also, the method 714 is described in conjunction with the data packet 600 in FIG. 6. An attack detection flowchart 714 including a method of detecting the modifying packet attack is now described in detail in FIG. 7H. The modifying packet attack could be a sinkhole attack, increased rank attack, worst parent attack, local repair attack, version attack, DAO inconsistency attack or DODAG inconsistency attack or combination thereof.

FIG. 7H illustrates an attack detection flowchart 714 to detect modifying packet attacks, according to an embodiment. The attack detection flowchart 714 is described as a method 714. The method 714 now executes in the routing device 308. At step 714-1, the method 714 includes, executing Algorithm 6 to identify modifying packet attack in the RPL packets 600. Moreover, the routing device 308 points Parent_index to the parent node 304 in the global routing table.

At step, 714-2, the method 714 includes checking flag fields FFF in an option header 606 of sent packets. The received packet from a node 304 is examined to identify if the ‘F’ Flag in the option header is set at 0 or 1. If the ‘F’ flag is set the step 714-2 proceeds to step 714-3. Otherwise, if the ‘F’ flag is set at 0, the method 714 stops by indicating, by the routing device 308, the absence of modifying packet attack and absence of any attacker node.

At step 714-3, the method 714 further includes increasing an inconstant packet counter if the ‘F’ flag is set. The step 714-3 proceeds to step 714-4.

At step 714-4, the method 715 includes comparing if the number of inconsistent packet counter is above an allowed predefined threshold or not. The allowable predefined threshold is defined in the memory 320 of the network connection device 306. If the number of inconsistent packet counter is found to be above the predefined threshold by the routing device 308, the step 714-4 in the method 714 proceeds to step 714-5.

At step 714-5, the method 714 includes, marking a sender node 304 as an attacker node that is launching a DAO inconsistency attack. Since, the sender node 304 seems to have dropped incoming data packets and sets the forwarding error flag (f flag) which locates in the packet option header of the control packet. At this time, the sender node 304 appears to replays the control packet. At this time, it is confirmed by the RPL signature of the sender node 304 that the sender node 304 appears to act like an attacker node because of exceeding the number of inconsistent packet counter. Therefore, the routing device 308 marks the sender node 304 as the attacker node which is launching the DAO inconsistency attack which clearly matches or resembles the RPL attack signature for the DAO inconsistency attack stored in the taxonomy under the category of modifying data packet attack. The routing device 308 at this time indicates the presence of DAO inconsistency attack in the IoT network 302 and invokes a solution as how to mitigate the DAO inconsistency attack by the attacker node. This indication can be provided by the output device. After this step, the method 714 stop.

On the other side, if the number of the inconsistent packet counter is found to be below the predefined threshold by the routing device 308, the step 714-4 in the method 714 proceeds to step 714-6. At this time, the routing device 308 simultaneously checks if the RPL message is not a broadcast message, and then points the Receiver_index to the receiver node in the global routing table.

At step 714-6, the method 714 includes, checking, by the routing device 308 that whether the ‘O’ is set or not in the packet 600. If the ‘O’ flag is not set i.e. 0, the method 714 proceeds to step 714-7. On the other side, if the ‘O’ flag is set i.e. 1, the method 714 proceeds to step 714-8.

At step 714-7, the method 714 includes, checking, if the receiver node 304 is a child of the sender node 304 or not. If the receiver node 304 is found to be the child of the sender node 302, the method 714 proceeds to step 714-9 where the routing device 308 increases the inconsistent packet counter. The relation between the sender node and the receiver node as the child is confirmed by checking the global routing table for each node. After step 714-9, the method proceeds to step 714-10.

At step 714-8, the method 714 includes, checking, if the sender node 304 is a child of the receiver node 304 or not. If the sender node 304 is found to be the child of the receiver node 304, the method 714 proceeds to step 714-9 where the routing device 308 increases the inconsistent counter. After step 714-9, the method proceeds to step 714-10.

At step 714-10, the method 714 includes, checking if the inconsistency counter is above the maximum allowable inconsistency counter or not. If the inconsistency counter is again found to be above maximum allowable inconsistency counter by the routing device 308, the method 714 proceeds to step 714-11 where the routing device 308 marks the sender node 304 as the attacker node that is launching the DODAG inconsistency attack. Since the sender node 304 appears to manipulate the packet option header by setting ‘O’ flag. Setting ‘O’ flag indicates that the sender node 304 is sending the packet to a descendant node hence the attacker sends the packet to an ancestor node. While setting ‘R’ flag means that an error is detected. Therefore, the routing device 308 marks the sender node 304 as the attacker node which is launching the DODAG inconsistency attack which clearly matches or resembles the RPL attack signature for the DODAG inconsistency attack stored in the taxonomy under the category of modifying data packet attack. The routing device 308 at this time indicates the presence of DODAG inconsistency attack in the IoT network 302 and invoke a solution as how to mitigate the DODAG inconsistency attack by the attacker node 304. This indication can be provided by the output device. After this step, the method 714 stop.

On the other side, if the number of the inconsistent packet counter is again found to be below the maximum allowable inconsistency counter, the step 714-10 in the method 714 proceeds to step 714-12. At this time, the routing device 308 identifies that the DODAG inconsistency attack does not appear to have occurred and thus DIO packet in the RPL packet needs to be examined for additional modifying packet.

At step 714-12, the method 714 includes, checking if the ICMv6 code equal to DIO code or not. At this time, the routing device 308 detects that if the code filed 604 matches with 0x01. When the code filed 604 matches with 0x01, it indicates to the routing device 308 that the received RPL packet is a DIO packet. The method 714 then proceeds to step 714-13.

On the other side, if, at step 714-12, the routing device 308 detects that the code field 604 does not matches with 0x01, it indicates to the routing device 308 that the received RPL packet is not DIO packet. This further indicates to the routing device that the absence of any attack in the IoT network 302. After this step, the method 714 stop.

At step 714-13, the method 714 includes checking, by the routing device 308, if the DIO rank of the node 304 is set at INFINITVE_RANK. If the DIO rank of the node 304 is set at INFINITVE_RANK, the step 714-13 in the method 714 proceeds to step 714-14.

On the other side if, at step 714-13, the routing device 308 detects that the DIO rank of the node 304 is not set at INFINITVE_RANK, the step 714-13 in the method 714 proceeds to step 714-17.

At step 714-17, the method includes checking, by the routing device 308, if the sender node 304 sends DIO packets with a different DODAGID field. If the DODAGID in the DIO packet is not equal to the DODAGID of the root node 304 as confirmed by checking the global routing table, the step 714-17 in the method 714 proceeds to step 714-14. Otherwise, the method 714 proceeds to step 714-18.

At step 714, the method 714 includes increasing, by the routing device 308, the local repair request counter. The method 714 then proceeds to step 714-15.

At step 714-15, the method 714 includes comparing, by the routing device 308, if the local repair counter request is greater than the maximum local repair counter request. If the routing device 308 identifies that the local repair counter request is greater than the maximum local repair counter request, the method 714 proceeds to step 714-16 where the routing device 308 marks the sender node 304 as the attacker node that is launching a local repair attack. Since the sender node 304 seems to either have changed its rank to infinitive and broadcasted this rank to all its neighbors or the sender node 304 seems to have changing DODAG-ID value of the node. In both cases, all children nodes are forced to perform the local repair. That is why, based upon the number of local repair counter request, the routing device 308 marks the sender node 304 as the attacker node which is launching the local repair attack which clearly matches or resembles the RPL attack signature for the local repair attack stored in the taxonomy under the category of modifying data packet attack. The routing device 308 at this time indicates the presence of local repair attack in the IoT network 302 and invokes a solution as how to mitigate the local repair attack by the attacker node 304. This indication can be provided by the output device. After this step, the method 714 stop. On the other side, if the routing device 308, at step 714-15, identifies that the local repair counter request is not greater than the maximum local repair counter request, the routing device 308 confirms the absence of any attacker node in the IoT network 302.

At step 714-18, the method 714 includes checking the DIO version in the packet 600 from the sender node 304. If the routing device 308 identifies that the DIO version in the DIO packet sent by the sender node 304 is not equal to the DIO version value of the root node 304, the method 714 proceeds to step 714-19 where the routing device 308 marks the sender node 304 as the attacker node that is launching a version attack. Since, the routing device 308 identifies that the sender node 304 seems to have changed the version number in the DIO message to a higher number. As such, the routing device 308 marks the sender node 304 as the attacker node which is launching the version attack which clearly matches or resembles the RPL attack signature for the version attack stored in the taxonomy under the category of modifying data packet attack. The routing device 308 at this time indicates the presence of version attack in the IoT network 302 and invokes a solution as how to mitigate the version attack by the attacker node. This indication can be provided by the output device. After the step 714-19, the method 714 stops. On the other side, if the routing device 308, at step 714-18, identifies that the DIO version in the DIO packet sent by the sender node 304 is equal to the DIO version value of the root node 304, the method 714 proceeds to step 714-20.

At step 714-20, the method 714 includes checking, by the routing device 308, if the rank of the sender node 304 is less than the rank of the parent node 304. If the rank of the sender node 304 is found to be less than the rank of the parent node 304, the method 714 proceeds to step 714-21 where the routing device 308 marks the sender node 304 as the attacker node that is launching a Sinkhole attack. Since, the routing device 308 identifies that the sender node 304 seems to have displayed a lower rank to other legitimate nodes 304 in order to mark the sender node 304 as a preferred parent. To achieve this, the sender node 304 has trapped all traffic by possibly advertising for a fabricated route using a different objective function (OF) to mislead legitimate nodes 304 or by modifying the rank value in DIO message of the sender node 304. As such, the routing device 308 marks the sender node 304 as the attacker node which is launching the Sinkhole attack which clearly matches or resembles the RPL attack signature for the Sinkhole attack. The RPL attack signature for the Sinkhole attack is stored in the taxonomy under the category of modifying data packet attack. The routing device 308 at this time indicates the presence of Sinkhole attack in the IoT network 302 and invokes a solution as how to mitigate the Sinkhole attack by the attacker node. This indication can be provided by the output device. After the step 714-21, the method 714 stops. On the other side, if the routing device 308, at step 714-20, identifies that the rank of the sender node 304 is found to be greater than the rank of the parent node 304, the method 714 proceeds to step 714-22.

At step 714-22, the method 714 includes checking, by the routing device 308 if the rank of the sender node 304 is greater than the rank of the child node 304. If the rank of the sender node 304 is found to be greater than the rank of the child node 304, the method 714 proceeds to step 714-23 where the routing device 308 marks the sender node 304 as the attacker node that is launching an Increased rank attack. Since, the routing device 308 identifies that the sender node 304 seems to have manipulated its rank to a greater value than its true rank and trying to impose an impression on other legitimate node 304 that the sender node 304 is a legitimate node and is close to the root node 304. To achieve this, the sender node 304 might have manipulated the rank by a specific fake value or by using a different objective function (OF) to mislead legitimate nodes 304. As such, the routing device 308 marks the sender node 304 as the attacker node which is launching the Increased rank attack which clearly matches or resembles the RPL attack signature for the Increased rank attack stored in the taxonomy under the category of modifying data packet attack. The routing device 308 at this time indicates the presence of Increased rank attack in the IoT network 302 and invokes a solution as how to mitigate the Increased rank attack by the attacker node. This indication can be provided by the output device. After the step 714-23, the method 714 stops. On the other side, if the routing device 308, at step 714-22, identifies that the rank of the sender node 304 is found to be less than the rank of the child node 304, the method 714 proceeds to step 714-24.

At step 714-24, the method 714 includes storing the rank of all prospective parents in the global routing table. At this step, the routing device 308 is also configured to execute a computer implemented method for an algorithm 8 as below to detect a worst parent attacks. The routing device 308 also examines the DAO control packet to verify if there has been a change in the parent node, which could indicate an attack. If there is a change, routing device 308 stores the ID of the new parent in the sender's entry and removes the sender from the children list of its previous parent.

```
if ICMPV6.code = DAO then
  if [Sender_index].ParentID != IPV6.DestinationAddress then
    Remove SenderID from GlobalRoutingTable[Parent_index].ChildrenList
      Update GlobalRoutingTable[Sender_index].ParentID =
IPV6.DestinationAddress
      for each Neighbor in GlobalRoutingTable[Sender_index].NeighborMap
do
        if Neighbor (NeighborRank) <=
GlobalRoutingTable[Parent_index].NodeRank and
            Neighbor(NeighborID) !=
GlobalRoutingTable[Parent_index].NodeID then
            Mark SenderID as Worst Parent
        end
      end
      Define Parent_index = find(nodeID =
GlobalRoutingTable[Sender_index].ParentID) in
        GlobalRoutingTable
      Add SenderID to GlobalRoutingTable[Parent_index].ChildrenList
  end
end
```

After executing the step 714-24, the method 714 proceeds to step 714-25.

At step 714-25, the method 714 includes, checking, by the routing device 308 if the rank of the parent node 304 is a minimum rank as stored in the global routing table. At this time, the routing device 308 identifies that if the sender node 304 selects a parent with a rank that is not a minimum rank among the prospective parents. If the routing device 308 determines the rank of each of the sender's neighbors has a rank lower than the parent's rank or, in other words, if the rank of the parent node 304 is found to be not the minimum rank as stored in the global routing table, the method 714 proceeds to step 714-26 where the routing device 308 marks the sender node 304 as the attacker node that is launching a worst parent attack. Since, the routing device 308 identifies that the sender node 304 seems to have selected a node (different node then the node 304) as a parent that maximizes its rank. As such, the routing device 308 marks the sender node 304 as the attacker node which is launching the worst parent attack which clearly matches or resembles the RPL attack signature for the worst parent attack stored in the taxonomy under the category of modifying data packet attack. The routing device 308 at this time indicates the presence of worst parent attack in the IoT network 302 and invokes a solution as how to mitigate the worst parent attack by the attacker node. This indication can be provided by the output device. After the step 714-26, the method 714 stops. On the other side, if the routing device 308, at step 714-25, identifies that the rank of each of the sender's neighbors has a rank that is not lower than the parent's rank or, in other words, if the rank of the parent node 304 is found to be the minimum rank as stored in the global routing table, the method 714 proceeds to step 714-27.

At step 714-27, the method 714 includes notifying that the absence of modifying packet attack in the RPL packet 600 in the IoT network 302. At this step, the routing device 308 updates the Parent index to point to the new parent entry and add the sender ID to the new parent's children's list. After the step 714-27, the method 714 stops.

Example 5: Detection of Replying Packet Attacks

When detecting the replying packet attacks, referring to FIG. 7A.

At step 702, the method 700 includes, identifying the type of ICMPv6 network packets 600. At this time, the routing device 308 analyzes the type field 602 from the sender node 304 to analyse the traffic pattern in the IoT network 302. In the current case, the type field is equal to 155. This confirms the routing device 308 that the packet 600 is an RPL packet. This further confirms the routing device 308 that the RPL packet needs to be inspected for control packet attack only. At this time the method 700 proceeds to the step 710 to further identify the type of the control packet attack. The type of control packet attack could be either generating packet attack, modifying packet attack, or replying packet attack. Since the Packet 600 is an RPL packet, the routing device 308 proceeds to checks for replying packet attack. Now the routing device 308 is configured to match a network traffic pattern from the sender node 304 to attack signatures structured as the taxonomy in the memory 320 of the network connection device 306. Here the sender node 304 could be an attacker node trying to disrupt the IoT network 302 using replying packet attack.

Figure 7I:
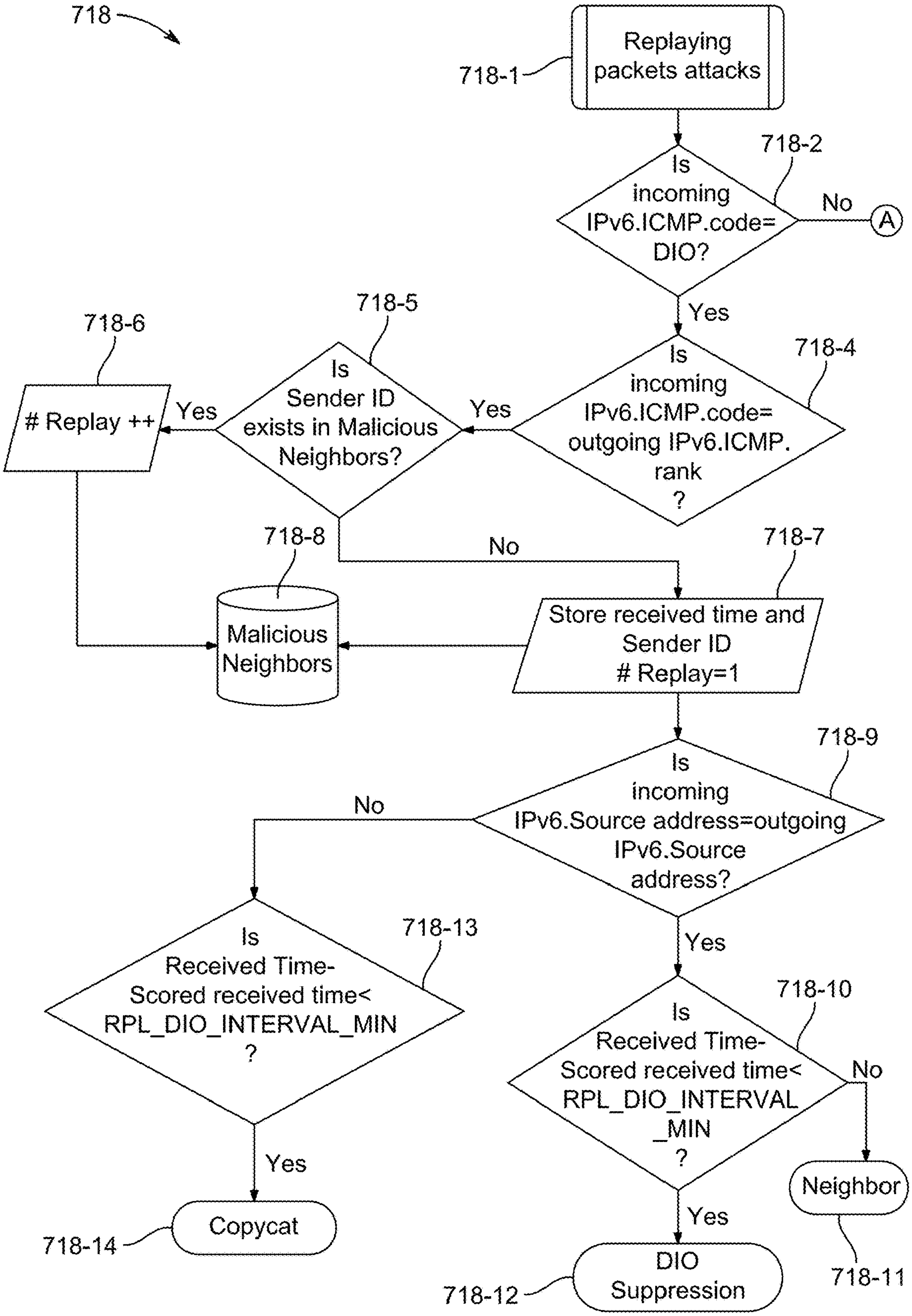
FIG. 7I illustrates an attack detection flowchart to detect replaying packet attacks, according to certain embodiments.
Figure 7I:
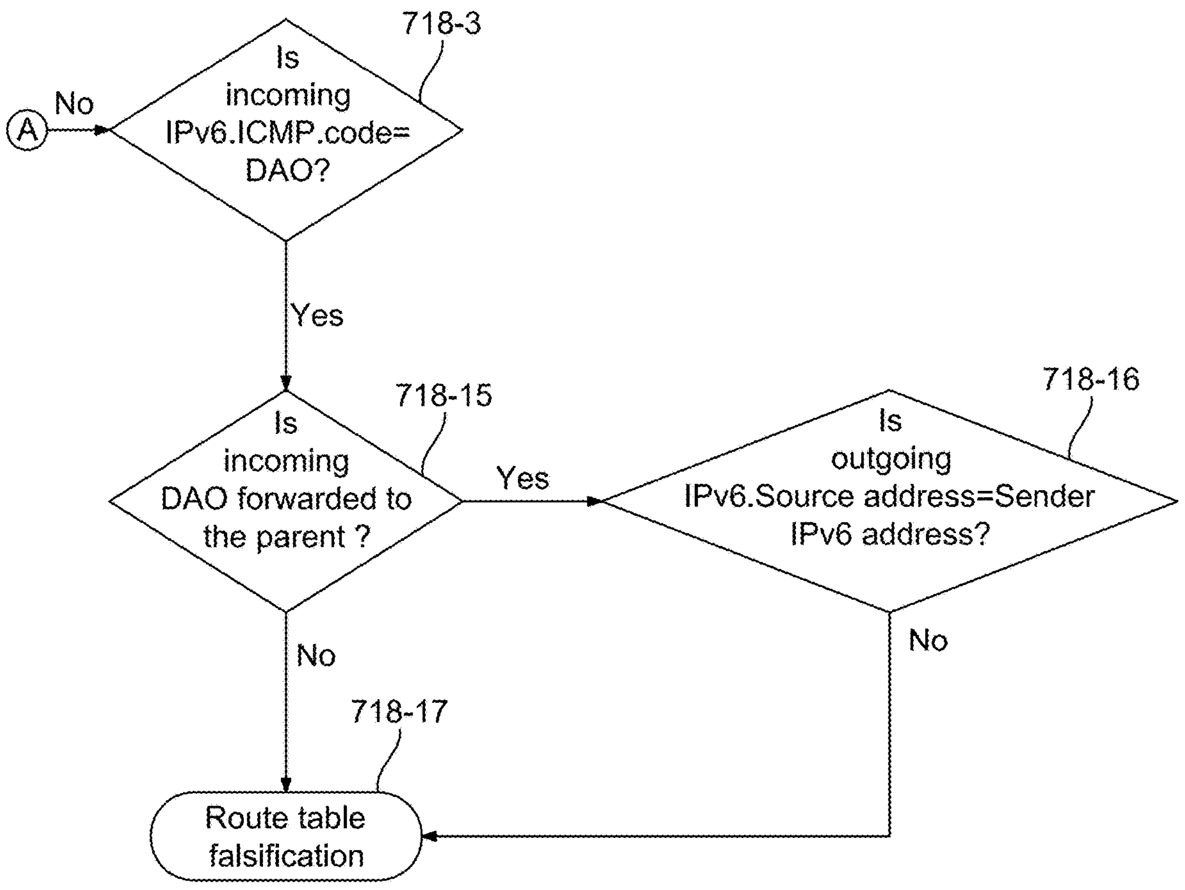

To match a network traffic pattern from the sender node 304 to attack signatures structured as the taxonomy in the memory 320 of the network connection device 306, the routing device 308 initially executes a computer implemented method for an attack detection flowchart 718 to detect one or more replying packet attacks, according to an embodiment. The method for the replying packet attack detection flowchart 718 is illustrated in FIG. 7I. Also, the method 714 is described in conjugation with the data packet 600 in FIG. 6. An attack detection flowchart 714 including a method of detecting the replying packet attack is now described in detail in FIG. 7I. The replying packet attacks could be a neighbor attack, DIO suppression attack, Copycat attack, DAO reply attack, a route table falsification attack or combination thereof.

FIG. 7I illustrates an attack detection flowchart 718 to detect replying packet attacks, according to certain embodiments. The reply packet attack detection flowchart 718 is described as a method 718. The method 718 now executes in the routing device 308. At step 718-1, the method 718 includes, executing Algorithm 7 to identify replying packets attack in the RPL packets 600.

Algorithm 7:
Replaying Packets Attacks

```
    if ICMPV6.code = DIO then
      if GlobalRoutingTable[Sender_index].NodeRank != DIO.rank then
        Update GlobalRoutingTable[Sender_index].NodeRank = DIO.rank
        Define replayID = false, replayRank = false
        if GlobalRoutingTable[Sender_index].NodeID != SenderID or
          GlobalRoutingTable[Sender_index].StoredNodeMAC ! = Sender_MAC
then
          replayID = true
          for each Neighbor in
GlobalRoutingTable[Sender_index].NeighborMap do
            if Neighbor(NeighborRank) =
GlobalRoutingTable[Sender_index].NodeRank then
              replayRank = true
            end
        end
      end
      if replayID = false and replayRank = true and
        GlobalRoutingTable[Sender_index].Average_DIO_Interval <=
RPL_DIO_INTERVAL_MIN then
        Mark SenderID as Copycat
      else
        if replayID = true and replayRank = true and
          GlobalRoutingTable[Sender_index].Average_DIO_Interval <=
RPL_DIO_INTERVAL_MIN then
          Mark SenderID as DIO suppression
        else
            if replayID = true and replayRank = true and
              GlobalRoutingTable[Sender_index].Average_DIO_Interval >=
RPL_DIO_INTERVAL_MIN then
              Mark SenderID as Neighbor
            end
          end
        end
      end
    else
      if ICMPV6. code = DAO then
        if GlobalRoutingTable[Sender_index].ParentID != ReceiverID or
          GlobalRoutingTable[Sender_index].NodeID != SenderID or
          GlobalRoutingTable[Sender_index].StoredNodeMAC ! = Sender_MAC
then
          Mark SenderID as Route Table Falsification
        end
      end
    end
```

At step, 718-2, the method 718 includes checking whether the control packet or IPv6ICMP packet is a DIO packet. The received packet from a node 304 is examined, by the routing device 308 to identify if the packet 600 is the DIO packet. If the code field 604 in the RPL packet 600 is 0x01, the packet is the DIO packet and the step 718-2 in the method 718 proceeds to step 718-4. Otherwise, the method 718 proceeds to step 718-3 where the routing device 308 further checks whether the control packet is a DAO packet. If the code field 604 in the RPL packet 600 is 0x02, the packet is the DIO packet and the step 718-3 proceeds to step 718-15.

At step 718-15, the method 718 includes, checking, by the routing device 308, if the DAO packet is forwards to the intended parent node or not. In other words, the routing device 308 checks if the sender node 304 forwards the received DAO packet to another node 304 than its parent node. If the routing device 308 identifies that the DAO packet is not forwarded to the intended parent node, i.e. sender node 304 forwards the received DAO packet to another node 304 than its parent node, the step 718-15 in the method 718 proceeds to step 718-17. Otherwise, if the routing device 308 identifies that the DAO packet is only forwarded to the intended parent node, the step 718-15 in the method 718 proceeds to step 718-16.

At step 718-16, the method 718 includes, checking, by the routing device 308 if the outgoing IpV6 source address is equal to the sender IPv6 address. In other words, the routing device 308 checks if the sender node 304 alters the IP address of the source node 304 before forwarding the DAO packet to its parent node 304. If the routing device 308 identifies, by analyzing the global route table, that the outgoing IpV6 source address is equal to the sender IPv6 address, i.e. sender node 304 does not alter the IP address of the source node 304 before forwarding the DAO packet to its parent node 304, the routing device 308 notifies that absence of any attacker node and the method 718 stops at step 718-16. On the other side, if the routing device 308 identifies, by analyzing the global route table, that the outgoing IpV6 source address is not equal to the sender IPv6 address, i.e. the sender node 304 has altered the IP address of the source node 304 before forwarding the DAO packet to its parent node 304, the step 718-16 in the method 718 proceeds to step 718-17.

At step 718-17, the method 718 includes, marking a sender node 304 as an attacker node that is launching a route table falsification attack. Since, the sender node 304 seems to have forged or modified the DAO control messages by adding false routing entries in routing tables of neighbor nodes 304 and advertised fake routes to other nodes. Therefore, the routing device 308 marks the sender node 304 as the attacker node which is launching the route table falsification attack which clearly matches or resembles the RPL attack signature for the route table falsification attack stored in the taxonomy under the category of replying data packets attack. The routing device 308 at this time indicates the presence of the route table falsification attack in the IoT network 302 and invoke a solution as how to mitigate the route table falsification attack by the attacker node 304. This indication can be provided by the output device. After this step, the method 718 stops.

At step 718-4, the method 718 include determining if the incoming IPV6.ICMP rank is equal to the outgoing IPv6.ICMP rank. If the routing device 308 determines that the incoming IPv6.ICMP rank is not equal to the outgoing IPv6.ICMP rank, the routing device 308 identifies a presence of no potential attack and the method 718 ends after step 718-4. On the other hand, if the routing device 308 determines that the incoming IPv6.ICMP rank is equal to the outgoing IPv6.ICMP rank, the method 718 proceeds to step 718-5.

At step 718-5, the method 718 includes determining, by the routing device 308, if the ID of sender node 304 exists in the list of malicious neighbors or not. If the routing device 308 determine that the ID of sender node 304 exists in the list of malicious neighbors, the step 718-5 in method 718 proceeds to step 718-6. Otherwise, if the routing device 308 determine that the ID of sender node 304 does not exist in the list of malicious neighbors, the step 718-5 in method 718 proceeds to step 718-7.

At step 718-6, the method 718 includes increasing the reply counter and proceeding towards step 718-8 to store the sender ID in the list of malicious neighbor nodes. After the step 718-8, the method 718 ends.

At step 718-7, the method 718 includes storing the received time and the ID of the sender node and proceeding towards step 718-8 to store the received time and the ID of the sender node 304 in the list of malicious neighbors. The sender node 304 may be a malicious node. At the same time, the step 718-7 in the method 718 proceeds to step 718-9.

At step 718-9, the method 718 includes checking, by the routing device 308 whether incoming IPv6 address of the source node 304 is equal to outgoing address of the source node 304 or not. If the routing device 308 identifies that the incoming IPv6 address of the source node 304 is equal to outgoing address of the source node 304, the method 718 proceeds to step 718-10. Otherwise, if the routing device 308 identifies that the incoming IPv6 address of the source node 304 is not equal to outgoing address of the source node 304, the method 718 proceeds to step 718-13.

At step 718-13, the method 718 includes checking by the routing device 308, if the difference between the receiving time and the stored receiving time is below a minimum predefined interval RPL_DIO_INTERVAL_MIN. If the routing device 308 determines that the difference between the receiving time and the stored receiving time is below a minimum predefined interval RPL_DIO_INTERVAL_MIN, the method 718 proceeds to step 718-14. On the other side, if the routing device 308 determines that the difference between the receiving time and the stored receiving time is above the minimum predefined interval RPL_DIO_INTERVAL_MIN, the step 718-13 in the method 718 ends at this step and the routing device 308 indicates presence of no attack. Based upon the steps 718-9 and 718-13, the routing device 308 concludes that the sender node 304 node only replays the rank and continuously sends DIO messages within a period less than RPL_DIO_INTERVAL_MIN. This is a possible sign of attack.

At step 718-14, the method includes marking a sender node 304 as an attacker node that is launching a copycat attack. Since, the sender node 304 seems to have received one or more broadcasted messages from other legitimate nodes 304 and then the sender node 304 sends previously received DIO messages many times with a fixed replay interval. At this time, it is confirmed by the RPL signature of the sender node 304 that the sender node 304 appears to act like an attacker node. Therefore, the routing device 308 marks the sender node 304 as the attacker node which is launching the copycat attack which clearly matches or resembles the RPL attack signature for the copycat attack stored in the taxonomy under the category of replying data packet attack. The routing device 308 at this time indicates the presence of copycat attack in the IoT network 302 and invokes a solution as how to mitigate the copycat attack by the attacker node. This indication can be provided by the output device. After this step 718-16, the method 718 stops.

At step 718-10, the method 718 includes again checking by the routing device 308, if the difference between the receiving time and the stored receiving time is below a minimum predefined interval RPL_DIO_INTERVAL_MIN. If the routing device 308 determines that the difference between the receiving time and the stored receiving time is below a minimum predefined interval RPL_DIO_INTERVAL_MIN, the method 718 proceeds to step 718-12. On the other side, if the routing device 308 determines that the difference between the receiving time and the stored receiving time is above the minimum predefined interval RPL_DIO_INTERVAL_MIN, the step 718-10 in the method 718 proceeds to step 718-11. Combining one or more steps 718-4, 718-5, 718-6, 718-7, 718-8, 718-9 and 718-10, the routing device 308 concludes that sender node forwards a received DIO packets without adding its rank or its IP address. This shows a possibility of attack.

At step 718-11, the method includes marking a sender node 304 as an attacker node that is launching a neighbor attack. Since, the sender node 304 seems to have used a received DIO message and has forwarded the DIO message without any modification. This act leads to mislead neighbor nodes 304 by information in the sent DIO message. At this time, it is confirmed by the RPL signature of the sender node 304 that the sender node 304 appears to act like an attacker node. Therefore, the routing device 308 marks the sender node 304 as the attacker node which is launching the neighbor attack which clearly matches or resembles the RPL attack signature for the neighbor attack stored in the taxonomy under the category of replying data packet attack. The routing device 308 at this time indicates the presence of neighbor attack in the IoT network 302 and invokes a solution as how to mitigate the neighbor attack by the attacker node. This indication can be provided by the output device. After this step 718-11, the method 718 stops.

At step 718-12, the method includes marking a sender node 304 as an attacker node that is launching a DIO suppression attack. Since, the sender node 304 seems to have received a DIO message from one or more other legitimate nodes 304 and has replayed the DIO message many times within a fixed frequency. At this time, it is confirmed by the RPL signature of the sender node 304 that the sender node 304 appears to act like an attacker node. Therefore, the routing device 308 marks the sender node 304 as the attacker node which is launching the DIO suppression attack which clearly matches or resembles the RPL attack signature for the DIO suppression attack stored in the taxonomy under the category of replying data packet attack. The routing device 308 at this time indicates the presence of DIO suppression attack in the IoT network 302 and invokes a solution as how to mitigate the DIO suppression attack by the attacker node. This indication can be provided by the output device. After the step 718-12, the method 718 stops.

Figure 8A:
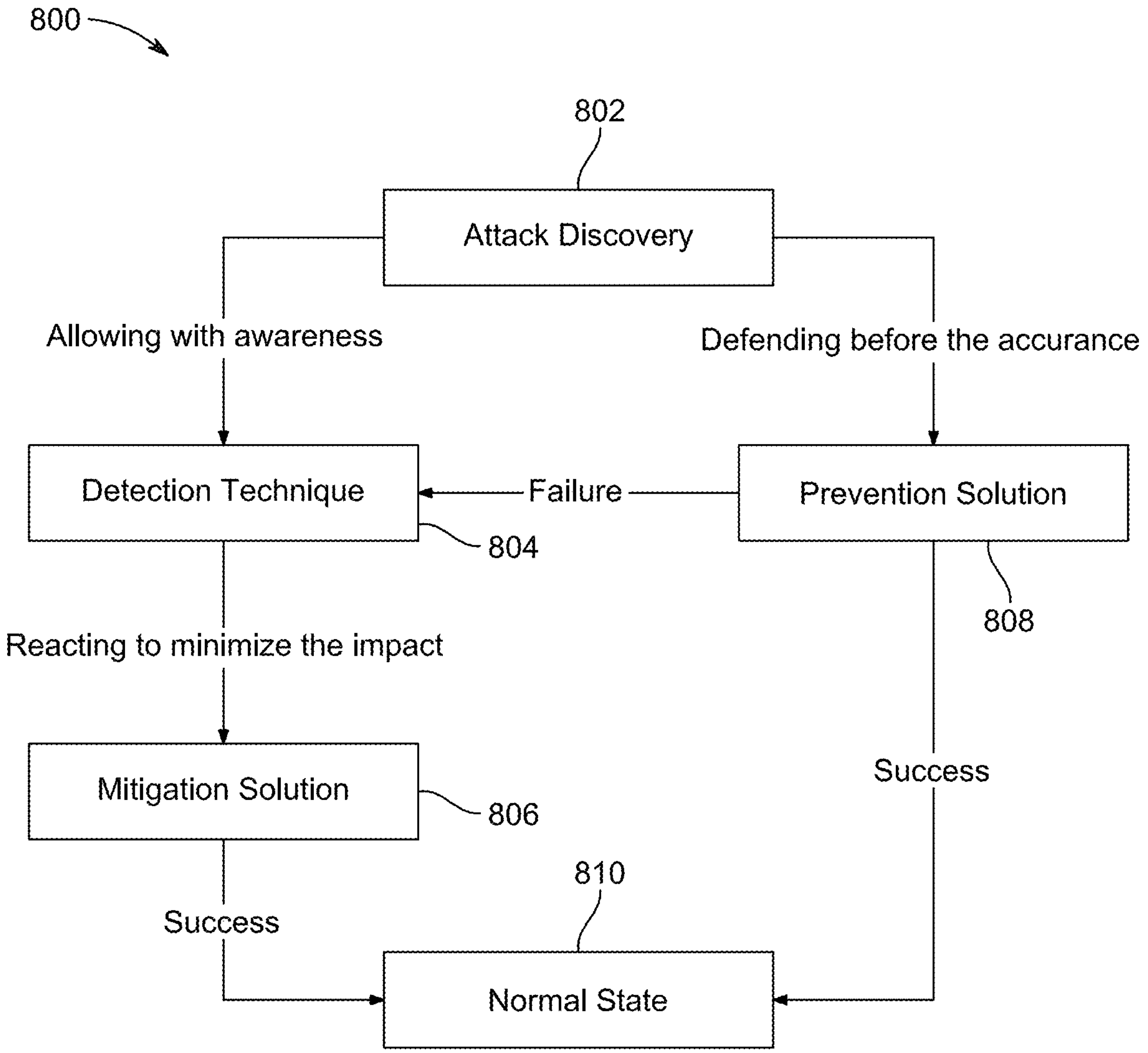
FIG. 8A illustrates a general flow diagram of techniques to defend security attacks against routing in IP networks, according to certain embodiments.

FIG. 8A illustrates a general flow diagram 800 of techniques to defend security attacks against routing in IP networks, according to certain embodiments. Security solutions for network attacks are divided into three main categories that include prevention solution 808, detection technique 804 and mitigation solution 806. After discovery of attack 802, prevention solution 808 aims for complete defense before an attack actually impacts the network, and employs techniques such as pre-installed keys, hashing, and digital signatures. Only after complete success, the entire system may return to a normal state 810. However, the prevention solution 808 may fail against insider attacks or prove computationally intensive. In wireless and heterogeneous IoT environment, the challenges of providing comprehensive prevention solutions is typically tough. The detection techniques 804, on the other hand, for network security usually identify suspicious behavior and triggers alarms during attacks. Detection techniques 804 are employed when prevention solution 804 fail or become resource-intensive. The mitigation solution 808 as a security solution, usually responds to attacks to minimize their impact on the network. Mitigation solution 808 begins with the detection of an attack, followed by a prompt and effective response. Unlike prevention solutions 808, the mitigation solution 806 acknowledges the existence of attacks and aims to reduce their harm to bring the network system into normal state 810 effectively.

Figure 8B:
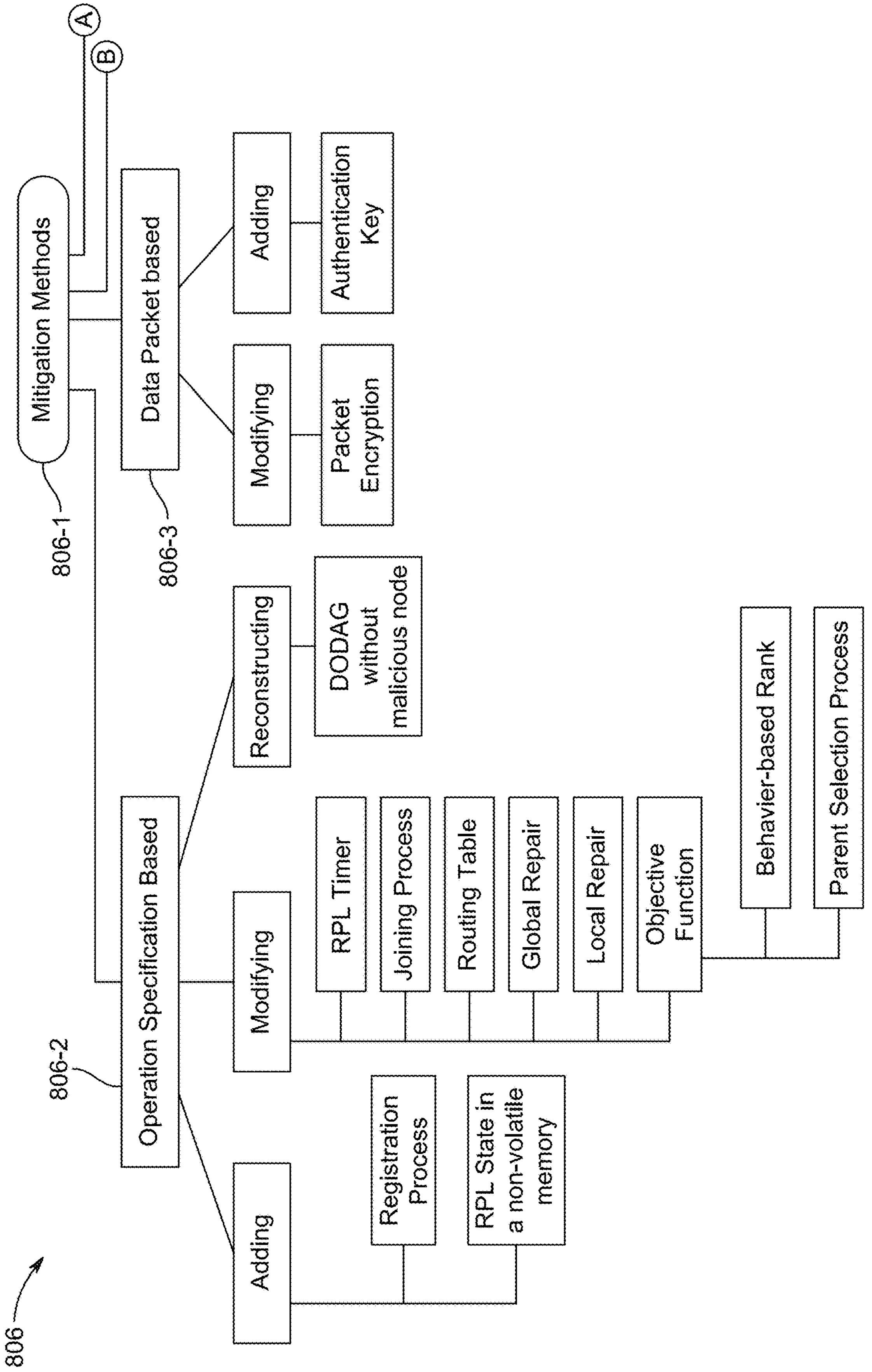
FIG. 8B illustrates a taxonomy of plurality of mitigation methods to combat RPL attacks, according to certain embodiments.
Figure 8B:
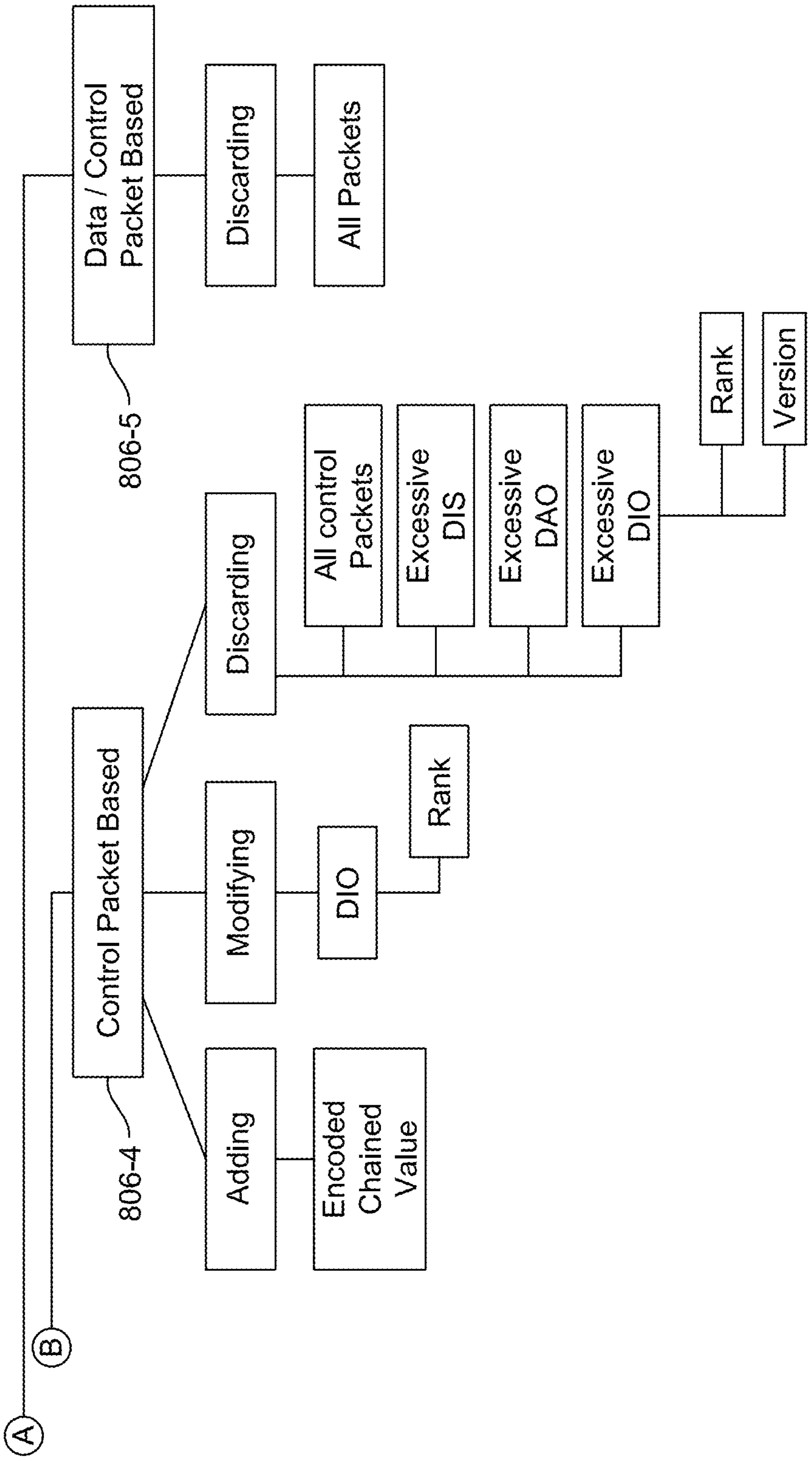

FIG. 8B illustrates a taxonomy of plurality of mitigation methods 806 to combat RPL attacks, according to certain embodiments. The taxonomy of mitigation methods 806 classifies the design of RPL security solutions based on an operation specification 806-2, control packets 806-4, data packets 806-3, or based on both of data and control packets 806-5, considering the fact that the security solutions mitigation method executes after occurrence of the attack. The network connection device 306 includes the taxonomy of mitigation solutions in its memory 320. Each of the mitigation solutions is classified based on attack location, including in the data packet, in the control packet, and in an RPL protocol level. The taxonomy includes mitigation solutions in a tree data structure with branches for operation specification. When a type of the attack is detected in a RPL packet or a non-RPL packet as described in attack detection methods, the routing device 308 invokes the solution to mitigate the attacker by the attacker node by fetching the taxonomy of mitigation methods 806 from the memory 320 of the network connection device 306. Based on the detected type of attack, the routing device 308 applies one or more mitigation methods.

Mitigation methods often focus on RPL operation specification-based mitigation 806-2, with proposals such as saving RPL state information in non-volatile memory for easier rejoining and addressing node reset or denial of energy attacks. Additional strategies involve a registration process with a security entity to mitigate various attacks like sinkhole, sybil, blackhole, and neighbor attacks. Some solutions also include modifying RPL specifications to counter specific attacks. A second approach to mitigation solutions, focuses on data packets. When the attack related to sybil and selective forwarder is detected, the routing device 308 applies data packet-based mitigation methods 806-3, such as by modification of the packet by applying random hash values and generating provisional identification values and group keys for each path. The solution could further be used to counter flooding, selective forwarding, and clone attacks. Using encryption of data packets, the data packet could be modified that could provide mitigation solution against sinkhole, sybil, blackhole, and neighbor attacks. A third approach to mitigation solutions specifically targets control packets 806-4. When one or more control packet attacks are detected, the routing device 308 could apply mitigation methods, such as adding fields, modifying field values, or discarding control packets to mitigate the impact of RPL attacks. This mitigation methods is used when counter rank attack, DIS flooding attack, sinkhole attack. The common strategy is to modify, add or discard malicious control messages. The final approach to mitigation solutions encompasses all packets, including both data and control packets 806-5. In this approach, the routing device 308 could discard all packets when both data packet and control packet attached are detected.

Figure 9:
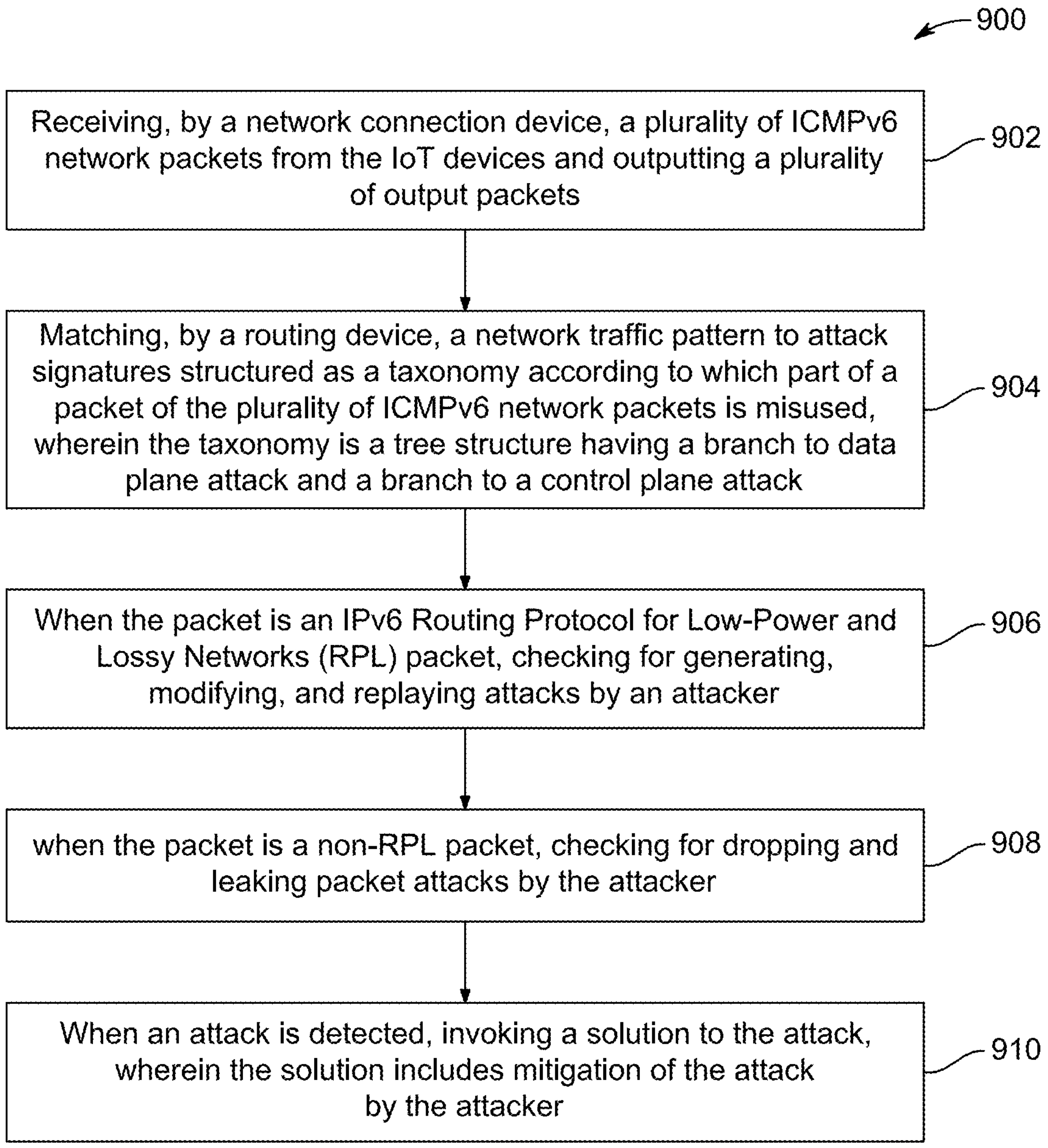
FIG. 9 illustrates a flowchart of a method to detect an attack on an Internet of Things (IoT) network, according to certain embodiments.

FIG. 9 illustrates a flowchart of a method 900 to detect an attack on an Internet of Things (IoT) network 302. The method is performed in the routing device 308 of the network connection device 306 as described in FIG. 3. In an embodiment, the method is performed in the routing device 308 of the network connection device 306 by using a computer implemented method for executing Algorithms 1-7. The method 900 is described in conjunction with FIGS. 3-8. Various steps of the method 900 are included through blocks in FIG. 9. One or more blocks may be combined or eliminated to achieve the method to detect the attack on the Internet of Things (IoT) network 302, without departing from the scope of the present disclosure. IoT devices 302 are interconnected via the Internet of Things (IoT) network 302.

At step 902, the method 900 includes, receiving, by a network connection device 306, ICMPv6 network packets 600 from IoT devices 302 and outputting output packets.

At step 904, the method 900 includes matching, by a routing device 308, a network traffic pattern to attack signatures structured as a taxonomy according to which part of a packet 600 of the ICMPv6 network packets 600 is misused. The taxonomy is a tree structure having a branch to data plane attack and a branch to a control plane attack.

At step 906, the method 900 includes when the packet is an IPV6 Routing Protocol for Low-Power and Lossy Networks (RPL) packet, checking for generating, modifying, and replaying attacks by an attacker.

At step 908, the method 900 includes when the packet is a non-RPL packet, checking for dropping and leaking packet attacks by the attacker.

At step 910, the method 900 includes when an attack is detected, invoking a solution to the attack. The solution includes mitigation of the attack by the attacker.

Figure 10:
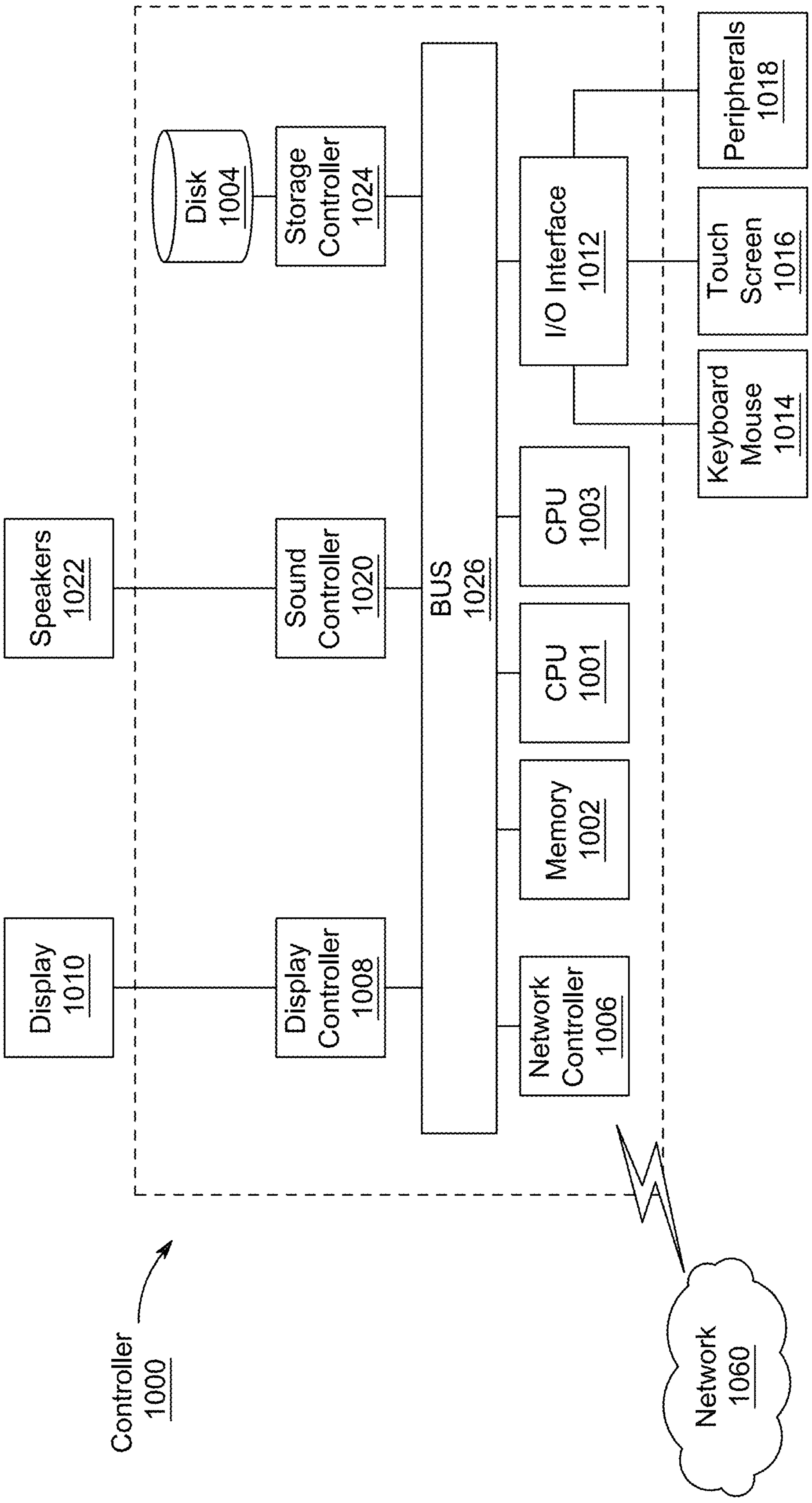
FIG. 10 is an illustration of a non-limiting example of details of computing hardware used in the computing system, according to certain embodiments.

Next, further details of the hardware description of the computing environment according to exemplary embodiments is described with reference to FIG. 10. In FIG. 10, a controller 1000 described is representative of the network connection device 306 configured to detect an attack on an Internet of Things (IoT) network 302 of FIG. 3 in which the controller 1000 is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the method is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the method may be provided as a utility application, background daemon, or component of an operating system, or combination thereof, executing in conjunction with CPU 1001, 1003 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 703 may be implemented on an FPGA, ASIC, PLD or using discrete logic circuits, as one of ordinary skill in the art would recognize. Further, CPU 1001, 703 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 1008, such as a NVIDIA GeForce GTX or Quadro graphics adaptor from NVIDIA Corporation of America for interfacing with display 710, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
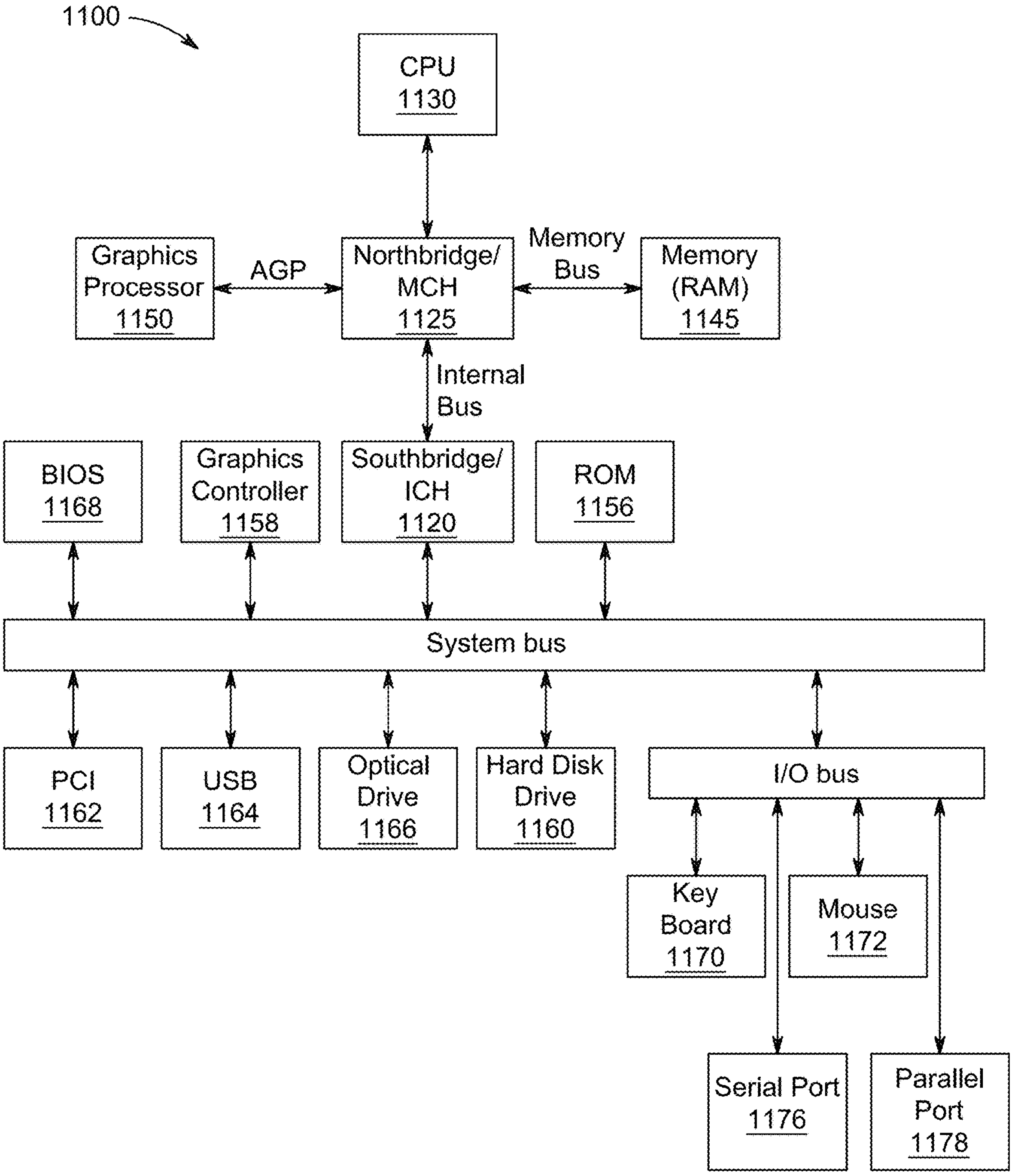
FIG. 11 is an exemplary schematic diagram of a data processing system used within the computing system, according to certain embodiments.

FIG. 11 shows a schematic diagram of a data processing system 1100, according to certain embodiments, for performing the functions of the exemplary embodiments. The data processing system 1100 is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
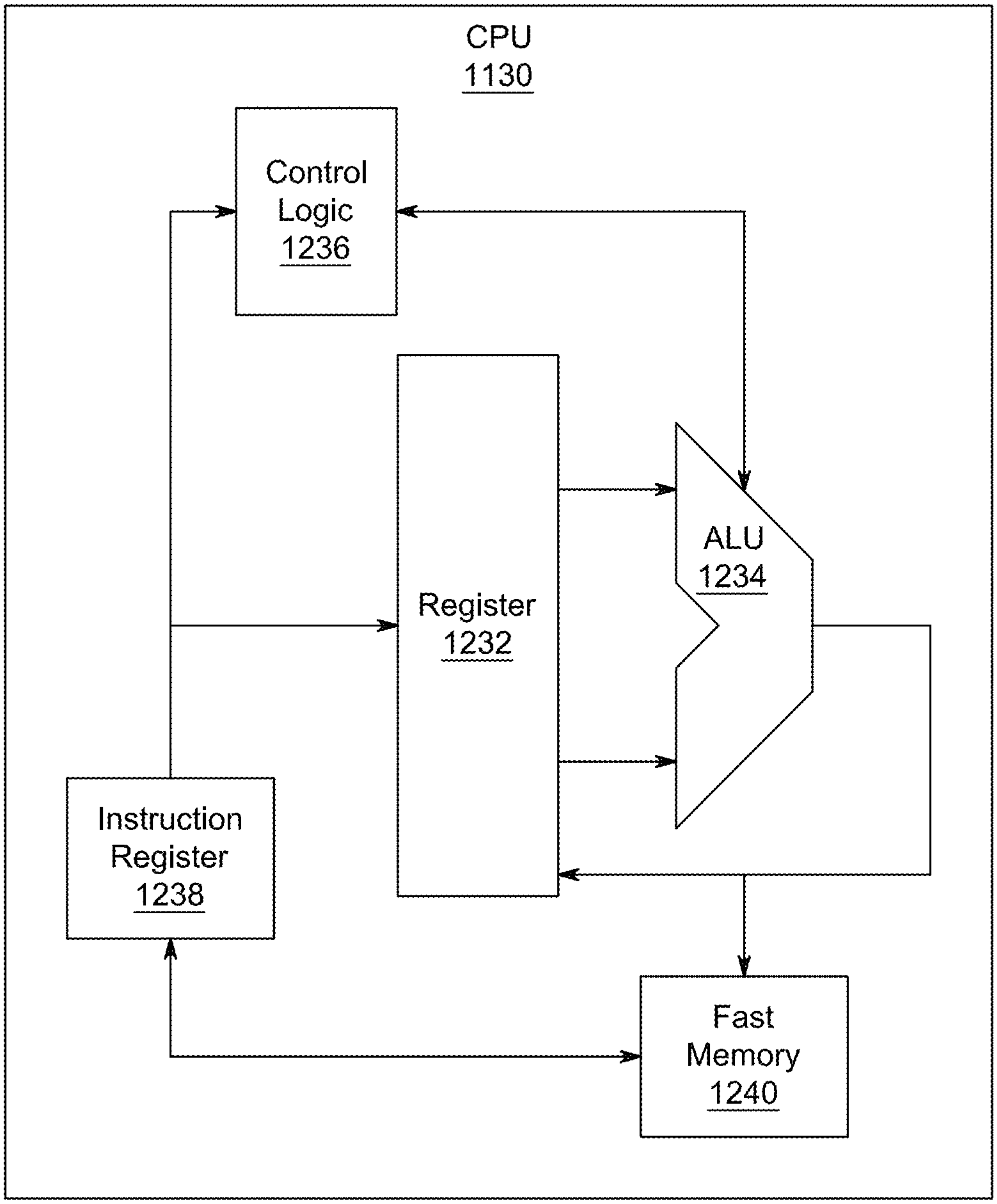
FIG. 12 is an exemplary schematic diagram of a processor used with the computing system, according to certain embodiments.

For example, FIG. 12 shows one implementation of CPU 1130, according to an embodiment. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 888 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
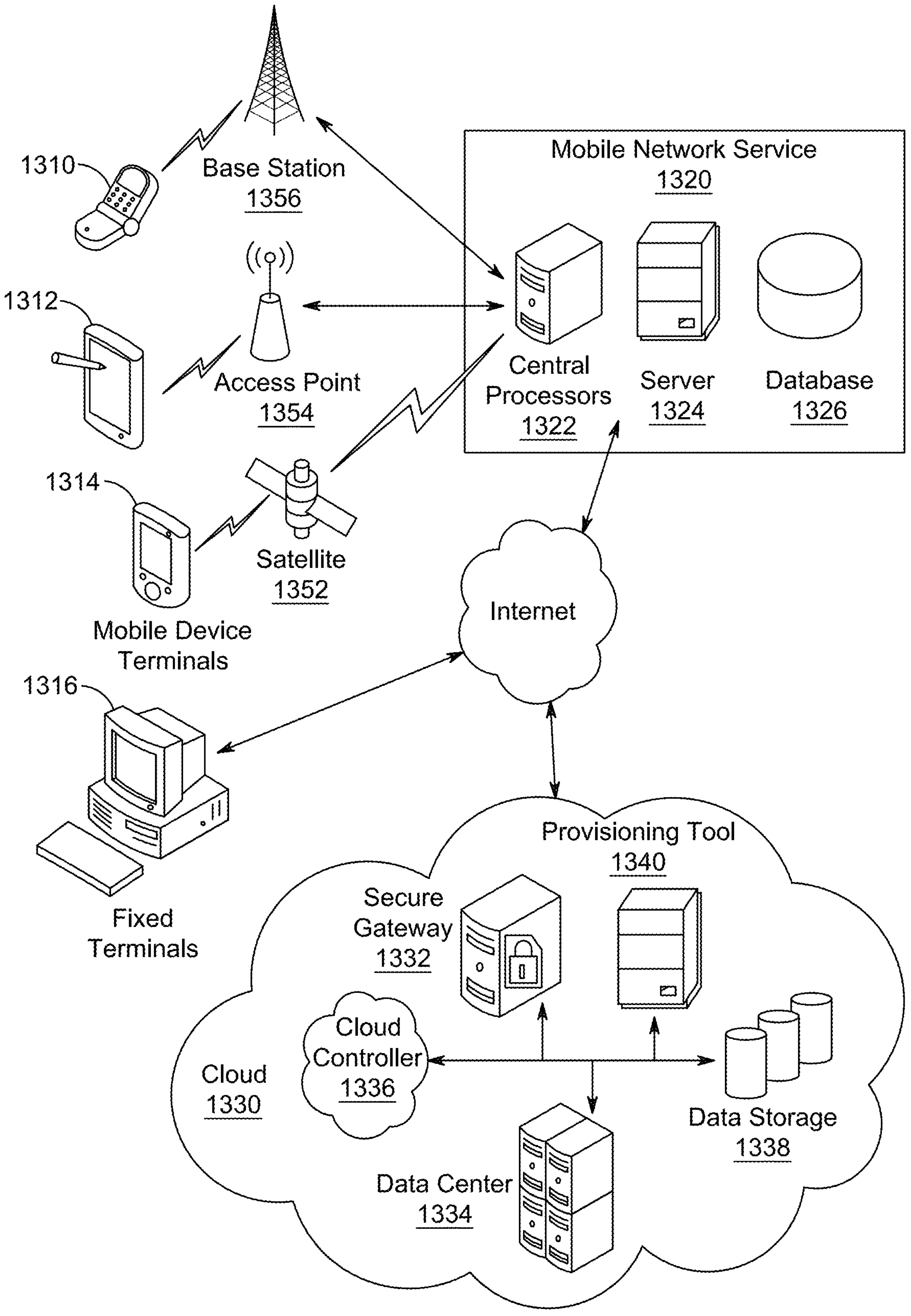
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An intrusion detection monitoring system (IDS) to detect an attack type on an Internet of Things (IoT) network, comprising:

a plurality of IoT devices interconnected via the Internet of Things (IoT) network;

a network connection device configured for receiving a plurality of ICMPv6 network packets from the plurality of IoT devices and for outputting a plurality of output packets;

a routing device, including circuitry configured to match a network traffic pattern to attack signatures structured as a taxonomy according to which part of a network packet of the plurality of ICMPv6 network packets is misused, wherein the taxonomy is a tree structure having a branch to data plane attack and a branch to a control plane attack, when the network packet is an IPV6 Routing Protocol for Low-Power and Lossy Networks (RPL) packet, check for generating, modifying, and replaying attacks as the match of the network traffic pattern for the control plane attack by an attacker;

when the network packet is a non-RPL packet, check for dropping and leaking packet attacks as the match of the network traffic pattern for the data plane attack by the attacker; and when the network traffic pattern for either of the data plane attack and the control plane attack is detected, invoke a solution to the either of the data plane attack and the control plane attack, wherein the solution includes mitigation of the data plane attack or the control plane attack by the attacker.

2. The system of claim 1, wherein the circuitry is further configured to:

check a difference between incoming packets and outgoing packets when checking for dropping packet attacks as the attack type;

indicate the attack type is a dropping attack when there is a significant loss of packets above a dropping threshold;

indicate that the attacker is performing a blackhole attack as the attack type, when all incoming packets are dropped, and there are no outgoing packets;

otherwise, indicate that the attacker is performing a selective forwarding attack as the attack type.

3. The system of claim 1, wherein the circuitry is further configured to identify the attack type as a wormhole when a data packet is forwarded to a node that is not a parent node, when checking for leaking packet attacks as the attack type.

4. The system of claim 1, wherein the circuitry is further configured to check a code field of the network packet of the plurality of ICMPv6 network packets, when checking for generating packet attacks, to determine a type of a control packet.

5. The system of claim 4, wherein the circuitry is further configured to check whether an identifier (ID) or media access control (MAC) of a sender node is previously stored in a probing list, when a node sends a directed acyclic graph (DAG) Information Solicitation (DIS) message;

indicate that the attacker is launching a clone-ID attack as the attack type, when the ID was previously stored with another MAC;

indicate that the attacker is launching a sybil attack as the attack type, when the MAC was previously stored with another ID;

indicate that the attack type is DIS flooding attack, when the sender node uses the ID and the MAC of the sender node but keeps sending DIS messages within short time periods less than a predefined time interval; and store a sender ID, sender MAC, and packet receiving time.

6. The system of claim 4, wherein when checking for a destination oriented directed acyclic graph (DODAG) Information Object (DIO) generating attacks, the circuitry is further configured to maintain a list of Neighbors for each node to store a sender identifier (ID) and a packet receiving time, when checking for DIO generating attacks;

check whether the sender ID is previously stored, when a node sends DIO message;

check a time difference between the packet receiving time and a packet stored time, when the sender ID exists in a neighbor list; and indicate that the attacker is launching a hello flood attack as the attack type, when the time difference is smaller than a predefined time interval.

7. The system of claim 4, wherein when checking for destination advertisement object (DAO) generating attacks, the circuitry is further configured to create a list of children nodes for each node to store a sender identifier (ID) and a number of received DAO messages, when checking for DAO generating attacks;

check whether the sender ID is previously stored, when a node sends DAO message;

check a number of sent DAO messages, when the sender ID exists in a children node list; and indicate that the attacker is launching a DAO insider attack as the attack type, when a number of received DAO messages exceeds a determined maximum DAO messages per child.

8. The system of claim 4, wherein the circuitry is further configured to, when checking for modifying packet attacks, check flag fields in an option header of sent packets;

increase an inconsistent packet counter, when a forwarding error 'F' flag is set;

mark a sender node as the attacker launching an destination advertisement object (DAO) inconsistency attack, when a number of inconsistent packets exceeds a maximum allowed inconsistent packets;

increase the inconsistent packet counter, when a sending 'O' flag is set to 1, indicating sending the network packet, and the sender node is a child of a receiver node;

increase the inconsistent packet counter, when the sending 'O' flag equals 0, indicating not sending the network packet, and a receiver node is a child of the sender node; and mark the sender node as the attacker launching a destination oriented directed acyclic graph (DODAG) inconsistency attack as the attack type, when a number of inconsistent packets exceeds a maximum allowed inconsistent packets.

9. The system of claim 8, wherein the circuitry is further configured to, when DODAG Information Object (DIO) packets are examined for additional modifying packets attacks, increase a local repair request counter, when the sender node sends DIO packets with a different DODAG-ID field or with an infinite rank from a DODAG root;

identify the sender node as the attacker launching a local repair attack as the attack type, when a local repair counter request exceeds a maximum allowed local repair counter request; and indicate that the sender node is the attacker performing a version attack as the attack type, when the sender node sends a DIO packet with a value in version number that differs from a version value that is sent by a root node.

10. The system of claim 8, wherein the circuitry is further configured to, when checking for modifying packet attacks, mark the sender node as a sinkhole attack, when the sender node sends a DODAG Information Object (DIO) packet with a rank that is lower than the sender node's parent rank;

mark the sender node as an increased rank attack, when the sender node sends a DIO packet with a rank that is higher than the sender node's children rank;

store prospective parents of each sender node and the prospective parents' ranks, to detect a worst parent attack; and determine that the sender node is launching the worst parent attack as the attack type, when the sender node selects a parent with a rank that is not a minimum rank among the prospective parents.

11. The system of claim 4, wherein the circuitry is further configured to, when checking for replaying packet attacks, check whether the control packet is DODAG Information Object (DIO) packet or destination advertisement object (DAO) packet;

determine, for DIO packets, that the attacker is launching a neighbor attack as the attack type, when a sender node forwards a received DIO packet without adding the sender node's rank or the sender node's internet protocol (IP) address;

at a same time as the neighbor attack is being determined, store an identifier (ID) of the attacker and a packet receiving time in a malicious neighbor list whenever a neighbor forwards a received rank;

classify the sender node as the attacker that is launching a DIO suppression attack as the attack type, when the sender node replays the IP address and the received rank frequently by sending DIO messages within a time period less than a predefined time interval;

classify the sender node as the attacker that is launching a copycat attack as the attack type, when the sender node only replays the rank and continuously sends DIO messages within a period less than the predefined time interval; and determine that the attack type is a route table falsification attack as the attack node, when replaying attacks resulting from replaying DAO packet happens when the sender node forwards a received DAO packet to another node than the sender node's parent, or when the sender node alters an IP address of a source node before forwarding the DAO packet to the sender node's parent.

12. The system of claim 1, wherein the circuitry is further configured to determine mitigation of the attack type based on a taxonomy of mitigation solutions that are classified according attack location, including in a data packet, in a control packet, and in an RPL protocol level.

13. The system of claim 12, wherein the circuitry is further configured to determine the mitigation of the attack type based on a taxonomy of mitigation solutions in a tree data structure with branches for operation specification based mitigation, data packet based mitigation, control packet based mitigation, and packet based mitigation for both control packet and data packet.

14. A method to detect an attack type on an Internet of Things (IoT) network, wherein a plurality of IoT devices is interconnected via the Internet of Things (IoT) network, the method comprising:

receiving, by a network connection device, a plurality of ICMPv6 network packets from the plurality of IoT devices and outputting a plurality of output packets;

matching, by a routing device, a network traffic pattern to attack signatures structured as a taxonomy according to which part of a network packet of the plurality of ICMPv6 network packets is misused, wherein the taxonomy is a tree structure having a branch to data plane attack and a branch to a control plane attack;

when the network packet is an IPV6 Routing Protocol for Low-Power and Lossy Networks (RPL) packet, checking for generating, modifying, and replaying attacks as the match of the network traffic pattern for the control plane attack by an attacker;

when the network packet is a non-RPL packet, checking for dropping and leaking packet attacks as the match of the network traffic pattern for the data plane attack by the attacker; and when the network traffic pattern for either of the data plane attack and the control plane attack is detected, invoking a solution to the either of the data plane attack and the control plane attack, wherein the solution includes mitigation of the data plane attack or the control plane attack by the attacker.

15. The method of claim 14, further comprising checking, by the routing device, a difference between incoming packets and outgoing packets when checking for a dropping packet attack;

indicating the attack type is a dropping attack when there is a significant loss of packets above a dropping threshold;

indicating that the attacker is performing a blackhole attack as the attack type, when all incoming packets are dropped, and there are no outgoing packets;

otherwise, indicating that the attacker is performing a selective forwarding attack as the attack type.

16. The method of claim 14, further comprising identifying the attack type as a wormhole when a data packet is forwarded to a node that is not a parent node, when checking for leaking packet attacks.

17. The method of claim 14, further comprising checking, by the routing device, a code field of a network packet of the plurality of ICMPv6 network packets, when checking for generating packet attacks, to determine a type of a control packet.

18. The method of claim 17, further comprising, when checking for modifying packet attacks by the routing device, checking flag fields in an option header of sent packets;

increasing an inconsistent packet counter, when a forwarding error ‘F’ flag is set;

marking a sender node as the attacker launching an destination advertisement object (DAO) inconsistency attack, when a number of inconsistent packets exceeds a maximum allowed inconsistent packets;

increasing the inconsistent packet counter, when a send ‘O’ flag is set and a sender is a child of a receiver node;

increasing the inconsistent packet counter, when the send ‘O’ flag equals 0 and a receiver node is a child of the sender node; and marking the sender node as the attacker launching a destination oriented directed acyclic graph (DODAG) inconsistency attack, when a number of inconsistent packets exceeds a maximum allowed inconsistent packets.

19. The method of claim 14, further comprising determining, by the routing device, the mitigation of the attack type based on a taxonomy of mitigation solutions that are classified according attack location, including in a data packet, in a control packet, and in an RPL protocol level.

20. The method of claim 19, further comprising determining, by the routing device, the mitigation of the attack type based on a taxonomy of mitigation solutions in a tree data structure with branches for operation specification based mitigation, data packet based mitigation, control packet based mitigation, and packet based mitigation for both control packet and data packet.

* * * * *